United States Patent
Liu et al.

(10) Patent No.: US 12,063,573 B2
(45) Date of Patent: Aug. 13, 2024

(54) METHOD AND DEVICE IN COMMUNICATION NODES FOR WIRELESS COMMUNICATION

(71) Applicants: Jin Liu, Shanghai (CN); Xiaobo Zhang, Shanghai (CN)

(72) Inventors: Jin Liu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 22 days.

(21) Appl. No.: 18/093,819

(22) Filed: Jan. 6, 2023

(65) Prior Publication Data
US 2023/0156432 A1 May 18, 2023

Related U.S. Application Data

(63) Continuation of application No. 17/394,415, filed on Aug. 5, 2021, now Pat. No. 11,582,584.

(30) Foreign Application Priority Data

Aug. 12, 2020 (CN) .......................... 202010805410.9
Aug. 31, 2020 (CN) .......................... 202010894939.2

(51) Int. Cl.
*H04W 4/029* (2018.01)
*H04L 5/00* (2006.01)
*H04W 72/044* (2023.01)

(52) U.S. Cl.
CPC ........... *H04W 4/029* (2018.02); *H04L 5/0048* (2013.01); *H04W 72/044* (2013.01)

(58) Field of Classification Search
CPC ... H04W 4/023; H04W 4/029; H04W 72/044; H04W 64/00; H04L 5/0007;
(Continued)

(56) References Cited

U.S. PATENT DOCUMENTS 11,582,584 B2 * 2/2023 Liu .................. H04W 4/029
2018/0367289 A1 * 12/2018 Kim .................. H04L 5/0078
(Continued)

FOREIGN PATENT DOCUMENTS

CN 106662634 A 5/2017
CN 107872818 A 4/2018
(Continued)

OTHER PUBLICATIONS

First Office Action of Chinese patent application No. CN202010805410.9 dated Feb. 3, 2024.
(Continued)

*Primary Examiner* — Siu M Lee

(57) ABSTRACT

Method and device in a node used for wireless communications. A first node receives first configuration information; transmits a first positioning reference signal on a first time-frequency resource block, transmits a second positioning reference signal on a second time-frequency resource block, and transmits a first information set; the first configuration information is used for indicating a first reference set, and any two time-frequency resource blocks in the first resource set employ a same positioning-related parameter; the first time-frequency resource block is earlier than the second time-frequency resource block in time domain; the first information set comprises a first distance, and the first distance refers to a distance from a first geographical position and a second geographical position, wherein the first geographical position is where the first node is located when transmitting the first positioning reference signal. The pres-
(Continued)

ent disclosure provides an effective solution to the issue of sidelink positioning.

12 Claims, 10 Drawing Sheets

(58) Field of Classification Search
CPC ....... H04L 5/0048; G01S 5/0284; G01S 5/08; G01S 5/10; G01S 1/042; G01S 1/0428
See application file for complete search history.

(56) References Cited

U.S. PATENT DOCUMENTS

| | | | |
|---|---|---|---|
| 2019/0037558 A1* | 1/2019 | Zhang | ............... H04L 5/003 |
| 2019/0069240 A1* | 2/2019 | Jiang | ............ H04W 52/0235 |
| 2020/0145132 A1 | 5/2020 | Jiang et al. | |
| 2020/0145975 A1 | 5/2020 | Zhang et al. | |

FOREIGN PATENT DOCUMENTS

| | | |
|---|---|---|
| CN | 110062457 A | 7/2019 |
| CN | 111295914 A | 6/2020 |
| CN | 111343579 A | 6/2020 |
| WO | 2018228522 A1 | 12/2018 |
| WO | 2019109345 A1 | 6/2019 |
| WO | 2020061950 A1 | 4/2020 |
| WO | 2020124353 A1 | 6/2020 |

OTHER PUBLICATIONS

First Search Report of Chinese patent application No. CN202010805410.9 dated Feb. 1, 2024.
First Office Action of Chinese patent application No. CN202010894939.2 dated Feb. 17, 2024.
First Search Report of Chinese patent application No. CN202010894939.2 dated Feb. 16, 2024.
Vivo"Remaining Issues on Resource Selection in 2-step RACH" 3GPP TSG-RAN WG2 Meeting #109bis-electronic R2-2002585 Apr. 10, 2020.
Samsung "NR Positioning Evaluation Methodology" 3GPP TSG RAN WG1 Meeting #94bis R1-1810854 Oct. 12, 2018.

* cited by examiner

METHOD AND DEVICE IN COMMUNICATION NODES FOR WIRELESS COMMUNICATION

CROSS REFERENCE TO RELATED APPLICATIONS

This application is the continuation of the U.S. patent application Ser. No. 17/394,415, filed on Aug. 5, 2021, which claims the priority benefit of Chinese Patent Application No. 202010805410.9, filed on 12 Aug. 2020 and the priority benefit of Chinese Patent Application No. 202010894939.2, filed on 31 Aug. 2020, the full disclosure of which is incorporated herein by reference.

BACKGROUND

Technical Field

The present disclosure relates to transmission methods and devices in wireless communication systems, and in particular to a Sidelink-related transmission scheme and device in wireless communications.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary session decided to conduct the study of New Radio (NR), or what is called fifth Generation (5G). The work Item (WI) of NR was approved at the 3GPP RAN #75 plenary session to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPPRAN #80 Plenary Session, the technical Study Item (SI) of NR V2X has already been started.

SUMMARY

In NR V2X system, when confronting scenarios out of coverage, in tunnels or lacking network signal, the Sidelink (SL) can be utilized for provision of positioning with wider coverage, less latency and higher precision. But the difficulty lies in the fact that due to the mobility of vehicles, it will be hard to find transmitting nodes sharing the same crystal oscillation, radio frequency and center frequency that can be used for three-point positioning.

To address the above problem, a method for SL positioning is disclosed by the present disclosure to construct a three-point-position scenario by associating positioning reference signals sent by a same communication node in different geographical positions and the moving distances for notifying the communication node. It should be noted that the embodiments of the UE of the present disclosure and the characteristics in the embodiments may be applied to a base station if no conflict is incurred, and vice versa. In the case of no conflict, the embodiments of the present disclosure and the characteristics in the embodiments may be combined with each other arbitrarily. Furthermore, though originally targeted at SL, the present disclosure is also applicable to Uplink (UL), and although originally targeted at single-carrier communications, the present disclosure is also applicable to multicarrier communications; also, the present disclosure only applies to single-antenna communications but also to multi-antenna communications. The present disclosure is targeted at V2X scenarios and applies to other scenarios like terminal-base station, terminal-relay or relay-base station communications, where technical effects similar to those in the V2X scenarios will be achieved. Additionally, the adoption of a unified solution for various scenarios (including but not limited to V2X scenario and terminal-base station communications) contributes to the reduction of hardcore complexity and costs.

Particularly, for interpretations of the terminology in the present disclosure, refer to definitions given in TS36 series, TS38 series and TS37 series of 3GPP specifications, as well as in the specification protocols of the Institute of Electrical and Electronics Engineers (IEEE).

The present disclosure provides a method in a first node for wireless communications, comprising:

receiving first configuration information; and transmitting a first positioning reference signal on a first time-frequency resource block, transmitting a second positioning reference signal on a second time-frequency resource block, and transmitting a first information set;

herein, the first configuration information is used to indicate a first resource set, the first resource set comprises more than one time-frequency resource block, and any two time-frequency resource blocks comprised by the first resource set adopt same positioning-related parameters; the first time-frequency resource block and the second time-frequency resource block are two time-frequency resource blocks in the first resource set, and the first time-frequency resource block is earlier than the second time-frequency resource block in time domain; the first information set comprises a first distance, and the first distance is a distance from a first geographical position to a second geographical position, of which the first geographical position is where the first node is located when transmitting the first positioning reference signal, and the second geographical position is where the first node is located when transmitting the second positioning reference signal.

In one embodiment, a problem to be solved in the present disclosure is the issue of positioning confronting relative positions between moving UEs.

In one embodiment, a method offered in the present disclosure is to make a same communication node send positioning reference signals in different geographical positions.

In one embodiment, a method offered in the present disclosure is to associate measurements on multiple positioning reference signals with a moving distance of the first node.

In one embodiment, a method offered in the present disclosure is to associate measurements on multiple positioning reference signals with a moving direction of the first node.

In one embodiment, a method offered in the present disclosure is to associate the first node's position with the second node's position.

In one embodiment, the above method is characterized in taking advantage of the mobility of a same communication node to send positioning reference signals for multiple times in different geographical positions.

In one embodiment, an advantage of the above method is that positioning reference signals sent from the same communication node are featured by passing a same radio frequency unit.

According to one aspect of the present disclosure, the above method is characterized in that the first information set also comprises a first angle, the first angle including an angle formed between a line from the first geographical position to the second geographical position and a reference direction.

According to one aspect of the present disclosure, the above method is characterized in comprising:
receiving a first signal;
herein, the first signal is used to trigger transmission of the first positioning reference signal and transmission of the second positioning reference signal; the first resource set comprises at least one resource pool, and any time-frequency resource block in the first resource set belongs to one resource pool of the at least one resource pool comprised by the first resource set; the first signal is used to determine a resource pool to which the first time-frequency resource block belongs and a resource pool to which the second time-frequency resource block belongs in the first resource set.

According to one aspect of the present disclosure, the above method is characterized in comprising:
receiving second configuration information;
herein, the second configuration information is used to indicate a first resource pool list, the first resource pool list comprising at least one resource pool; the at least one resource pool comprised by the first resource set belongs to the first resource pool list.

According to one aspect of the present disclosure, the above method is characterized in comprising:
generating a first candidate resource pool;
herein, the first candidate resource pool is generated by (respectively) sensing a positive integer number of positioning reference signal group(s) in the positive integer number of resource pool(s) comprised by the first resource set, and the first candidate resource pool comprises a positive integer number of time-frequency resource blocks, and both the first time-frequency resource block and the second time-frequency resource block belong to the first candidate resource pool.

According to one aspect of the present disclosure, the above method is characterized in that the first node is a UE.

According to one aspect of the present disclosure, the above method is characterized in that the first node is a relay node.

According to one aspect of the present disclosure, the above method is characterized in that the first node is a base station.

The present disclosure provides a method in a second node for wireless communications, comprising:
transmitting first configuration information; and
receiving a first positioning reference signal on a first time-frequency resource block, receiving a second positioning reference signal on a second time-frequency resource block, and receiving a first information set;
herein, the first configuration information is used to indicate a first resource set, the first resource set comprises more than one time-frequency resource block, and any two time-frequency resource blocks comprised by the first resource set adopt same positioning-related parameters; the first time-frequency resource block and the second time-frequency resource block are respectively two time-frequency resource blocks in the first resource set, and the first time-frequency resource block is earlier than the second time-frequency resource block in time domain; the first information set comprises a first distance, and the first distance is a distance from a first geographical position to a second geographical position, of which the first geographical position is where a transmitter of the first positioning reference signal is located when transmitting the first positioning reference signal, and the second geographical position is where a transmitter of the second positioning reference signal is located when transmitting the second positioning reference signal, the transmitter of the first positioning reference signal and the transmitter of the second positioning reference signal being one and the same.

According to one aspect of the present disclosure, the above method is characterized in that the first information set also comprises a first angle, the first angle including an angle formed between a line from the first geographical position to the second geographical position and a reference direction.

According to one aspect of the present disclosure, the above method is characterized in comprising:
transmitting a first signal;
herein, the first signal is used to trigger transmission of the first positioning reference signal and transmission of the second positioning reference signal by a receiver of the first signal; the first resource set comprises at least one resource pool, and any time-frequency resource block in the first resource set belongs to one resource pool of the at least one resource pool comprised by the first resource set; the first signal is used to determine a resource pool to which the first time-frequency resource block belongs and a resource pool to which the second time-frequency resource block belongs in the first resource set.

According to one aspect of the present disclosure, the above method is characterized in comprising:
receiving second configuration information;
herein, the second configuration information is used to indicate a first resource pool list, the first resource pool list comprising at least one resource pool; the at least one resource pool comprised by the first resource set belongs to the first resource pool list.

According to one aspect of the present disclosure, the above method is characterized in comprising:
determining relative positions of the second node and the first node;
herein, the first candidate resource pool is generated by the first node sensing at least one positioning reference signal group (respectively) in the at least one resource pool comprised by the first resource set, and the first candidate resource pool comprises a positive integer number of time-frequency resource blocks, the first time-frequency resource block and the second time-frequency resource block belonging to the first candidate resource pool; a measurement on the first positioning reference signal, a measurement on the second positioning reference signal and the first information set are jointly used to determine relative positions of the second node and the first node.

According to one aspect of the present disclosure, the above method is characterized in that the second node is a base station.

According to one aspect of the present disclosure, the above method is characterized in that the second node is a relay node.

According to one aspect of the present disclosure, the above method is characterized in that the second node is a UE.

The present disclosure provides a first node for wireless communications, comprising:
- a first receiver, receiving first configuration information; and
- a first transmitter, transmitting a first positioning reference signal on a first time-frequency resource block, transmitting a second positioning reference signal on a second time-frequency resource block, and transmitting a first information set;
- herein, the first configuration information is used to indicate a first resource set, the first resource set comprises more than one time-frequency resource block, and any two time-frequency resource blocks comprised by the first resource set adopt same positioning-related parameters; the first time-frequency resource block and the second time-frequency resource block are two time-frequency resource blocks in the first resource set, and the first time-frequency resource block is earlier than the second time-frequency resource block in time domain; the first information set comprises a first distance, and the first distance is a distance from a first geographical position to a second geographical position, of which the first geographical position is where the first node is located when transmitting the first positioning reference signal, and the second geographical position is where the first node is located when transmitting the second positioning reference signal.

The present disclosure provides a second node for wireless communications, comprising:
- a second transmitter, transmitting first configuration information; and
- a second receiver, receiving a first positioning reference signal on a first time-frequency resource block, receiving a second positioning reference signal on a second time-frequency resource block, and receiving a first information set;
- herein, the first configuration information is used to indicate a first resource set, the first resource set comprises more than one time-frequency resource block, and any two time-frequency resource blocks comprised by the first resource set adopt same positioning-related parameters; the first time-frequency resource block and the second time-frequency resource block are respectively two time-frequency resource blocks in the first resource set, and the first time-frequency resource block is earlier than the second time-frequency resource block in time domain; the first information set comprises a first distance, and the first distance is a distance from a first geographical position to a second geographical position, of which the first geographical position is where a transmitter of the first positioning reference signal is located when transmitting the first positioning reference signal, and the second geographical position is where a transmitter of the second positioning reference signal is located when transmitting the second positioning reference signal, the transmitter of the first positioning reference signal and the transmitter of the second positioning reference signal being one and the same.

In one embodiment, the present disclosure has the following advantages:
- The present disclosure is aimed at addressing the positioning issue that lies in relative positions of moving UEs;
- the present disclosure enables a same communication node to transmit positioning reference signals when in different geographical positions;
- the present disclosure creates an association between measurements on multiple positioning reference signals and a moving distance of the first node;
- the present disclosure creates an association between measurements on multiple positioning reference signals and a moving direction of the first node;
- the present disclosure creates an association between the first node's position and the second node's position;
- in the present disclosure, the mobility of a same communication node is used for transmitting positioning reference signals for multiple times in different geographical positions;
- in the present disclosure, different positioning reference signals sent by the same communication node will pass a same radio frequency unit.

In an NR V2X system, when scenarios of communications are out of coverage, in tunnels or other places lacking in network signals, SideLink (SL) can be applied to provide more precise positioning with larger coverage and lower latency. Generally, the positioning method means transmitting multiple positioning reference signals by multiple communication nodes to realize three-point positioning. However, due to the sensing-based resource allocation mode of SL, when transmitting a positioning reference signal in SL, a V2X User has to sense available time-frequency resources in the first place.

To address the above problem, considering the mute state, the transmission period, the graph and other characters of the positioning reference signal, the present disclosure provides a method of sensing resources for SL positioning reference signal. It should be noted that if no conflict is incurred, the embodiments of a UE in the present disclosure and the characteristics of the embodiments can be applied to a base station, and vice versa. And the embodiments in the present disclosure and the characteristics of the embodiments can be arbitrarily combined if there is no conflict. Furthermore, through originally targeted at SL, this disclosure is also applicable to UpLink (UL) transmissions; though originally targeted at single-carrier communications, this disclosure is also applicable to multicarrier communications. The present disclosure not only applies to single-antenna communications, but also multi-antenna communications. Though originally targeted at V2X communications, the disclosure is also applicable to terminal-base station communications, terminal-relay communications, and relay-base station communications, where similar technical effects can be achieved. Additionally, the adoption of a unified solution for various scenarios (including but not limited to V2X and terminal-base station communications) contributes to the reduction of hardcore complexity and costs.

The present disclosure provides a method in a first node for wireless communications, comprising:
- receiving a first signaling; and
- transmitting a target positioning reference signal on a target time-frequency resource set, the target time-frequency resource set comprising multiple resource units;
- herein, the first signaling is used to indicate occupancy of a first time-frequency resource set, the first time-frequency resource set comprising multiple resource units; parameters of the target positioning reference signal and the occupancy of the first time-frequency resource set are jointly used to determine a target threshold; the occupancy of the first time-frequency resource set comprises at least one of whether the first time-frequency resource set is occupied or a type of a signal occupying the first time-frequency resource set; the target time-frequency resource set belongs to a first candidate resource pool, and the first time-frequency resource set is associated with a second time-frequency resource set, the second time-frequency resource set comprising multiple resource units; the target threshold is used to determine whether the second time-frequency resource set belongs to the first candidate resource pool.

In one embodiment, a problem to be solved in the present disclosure is the issue of resources allocation for a moving User when transmitting positioning reference signals.

In one embodiment, a method offered in the present disclosure is to associate parameters of a target positioning reference signal with a target threshold.

In one embodiment, a method offered in the present disclosure is to associate the occupancy of a first time-frequency resource set with a target threshold.

In one embodiment, a method offered in the present disclosure is to associate whether a positioning reference signal in the first time-frequency resource set is muted with resource sensing.

In one embodiment, a method offered in the present disclosure is to associate a type of a signal in the first time-frequency resource set with resource sensing.

In one embodiment, the above method is characterized in determining a target threshold jointly according to parameters of a target positioning reference signal and the occupancy of a first time-frequency resource set, and then determining a first candidate resource pool by the target threshold.

In one embodiment, an advantage of the above method is that the type of signal on the time-frequency resource and whether a positioning reference signal is mute are both introduced in the procedure of resources sensing, thus avoiding interference with transmission of SL positioning reference signals.

According to one aspect of the present disclosure, the above method is characterized in that when the first time-frequency resource set is occupied, the target threshold is a first threshold; when the first time-frequency resource set is unoccupied, the target threshold is a second threshold; the first threshold is greater than the second threshold.

According to one aspect of the present disclosure, the above method is characterized in that the first time-frequency resource set is occupied; when the type of the signal occupying the first time-frequency resource set includes positioning reference signal, the target threshold is a third threshold; when the type of the signal occupying the first time-frequency resource set includes non-positioning reference signal, the target threshold is a fourth threshold; the third threshold is less than the fourth threshold.

According to one aspect of the present disclosure, the above method is characterized in that when the first time-frequency resource set is occupied, and the type of the signal occupying the first time-frequency resource set includes positioning reference signal, the target threshold is a first threshold; when the first time-frequency resource set is unoccupied, and is instead reserved for a positioning reference signal, the target threshold is a second threshold.

According to one aspect of the present disclosure, the above method is characterized in comprising:

monitoring the first time-frequency resource set in a first sensing window; and determining whether the second time-frequency resource set belongs to the first candidate resource pool;

herein, the first time-frequency resource set belongs to a first resource pool; the first sensing window comprises multiple time-domain resource units, and each time-domain resource unit comprised by the first time-frequency resource set belongs to the multiple time-domain resource units comprised by the first sensing window; when a measurement on the first time-frequency resource set is larger than the target threshold, the second time-frequency resource set does not belong to the first candidate resource pool; when a measurement on the first time-frequency resource set is smaller than the target threshold, the second time-frequency resource set belongs to the first candidate resource pool.

According to one aspect of the present disclosure, the above method is characterized in comprising:

transmitting a target signaling;

herein, the target signaling is used to indicate that a signal occupying the target time-frequency resource set is the target positioning reference signal.

According to one aspect of the present disclosure, the above method is characterized in that the first node is a UE.

According to one aspect of the present disclosure, the above method is characterized in that the first node is a relay node.

According to one aspect of the present disclosure, the above method is characterized in that the first node is a base station.

The present disclosure provides a method in a second node for wireless communications, comprising:

transmitting a first signaling;

herein, the first signaling is used to indicate occupancy of a first time-frequency resource set, the first time-frequency resource set comprising multiple resource units; the occupancy of the first time-frequency resource set is used by a receiver of the first signaling to determine a target threshold; the occupancy of the first time-frequency resource set comprises at least one of whether the first time-frequency resource set is occupied or a type of a signal occupying the first time-frequency resource set; the first time-frequency resource set is associated with a second time-frequency resource set, the second time-frequency resource set comprising multiple resource units; the target threshold is used by a receiver of the first signaling to determine whether the second time-frequency resource set belongs to the first candidate resource pool.

According to one aspect of the present disclosure, the above method is characterized in that when the first time-frequency resource set is occupied, the target threshold is a first threshold; when the first time-frequency resource set is unoccupied, the target threshold is a second threshold; the first threshold is greater than the second threshold.

According to one aspect of the present disclosure, the above method is characterized in that the first time-frequency resource set is occupied; when the type of the signal occupying the first time-frequency resource set includes positioning reference signal, the target threshold is a third threshold; when the type of the signal occupying the first time-frequency resource set includes non-positioning reference signal, the target threshold is a fourth threshold; the third threshold is less than the fourth threshold.

According to one aspect of the present disclosure, the above method is characterized in that when the first time-frequency resource set is occupied, and the type of the signal occupying the first time-frequency resource set includes positioning reference signal, the target threshold is a first threshold; when the first time-frequency resource set is unoccupied, and is instead reserved for a positioning reference signal, the target threshold is a second threshold.

According to one aspect of the present disclosure, the above method is characterized in comprising:
transmitting a first signal or dropping transmission of the first signal in the first time-frequency resource set;
herein, the first sensing window comprises multiple time-domain resource units, and each time-domain resource unit comprised by the first time-frequency resource set belongs to the multiple time-domain resource units comprised by the first sensing window; the first time-frequency resource set belongs to a first resource pool; when the first signal is transmitted, the first signal is the signal occupying the first time-frequency resource set; when the transmission of the first signal is dropped, the first time-frequency resource set is not occupied.

According to one aspect of the present disclosure, the above method is characterized in that the second node is a base station.

According to one aspect of the present disclosure, the above method is characterized in that the second node is a relay node.

According to one aspect of the present disclosure, the above method is characterized in that the second node is a UE.

The present disclosure provides a method in a third node for wireless communications, comprising:
receiving a target signaling; and
receiving a target positioning reference signal in a target time-frequency resource set, the target time-frequency resource set comprising multiple resource units;
herein, the target signaling is used to indicate occupancy of a target time-frequency resource set; the occupancy of the target time-frequency resource set comprises that a signal occupying the target time-frequency resource set is the target positioning reference signal; the target time-frequency resource set belongs to a first candidate resource pool; the target positioning reference signal is used to determine a position of the third node.

According to one aspect of the present disclosure, the above method is characterized in that the third node is a UE.

According to one aspect of the present disclosure, the above method is characterized in that the third node is a relay node.

According to one aspect of the present disclosure, the above method is characterized in that the third node is a base station.

The present disclosure provides a first node for wireless communications, comprising:
a first receiver, receiving a first signaling; and
a first transmitter, transmitting a target positioning reference signal on a target time-frequency resource set, the target time-frequency resource set comprising multiple resource units;
herein, the first signaling is used to indicate occupancy of a first time-frequency resource set, the first time-frequency resource set comprising multiple resource units; parameters of the target positioning reference signal and the occupancy of the first time-frequency resource set are jointly used to determine a target threshold; the occupancy of the first time-frequency resource set comprises at least one of whether the first time-frequency resource set is occupied or a type of a signal occupying the first time-frequency resource set; the target time-frequency resource set belongs to a first candidate resource pool, and the first time-frequency resource set is associated with a second time-frequency resource set, the second time-frequency resource set comprising multiple resource units; the target threshold is used to determine whether the second time-frequency resource set belongs to the first candidate resource pool.

The present disclosure provides a second node for wireless communications, comprising:
a second transmitter, transmitting a first signaling;
herein, the first signaling is used to indicate occupancy of a first time-frequency resource set, the first time-frequency resource set comprising multiple resource units; the occupancy of the first time-frequency resource set is used by a receiver of the first signaling to determine a target threshold; the occupancy of the first time-frequency resource set comprises at least one of whether the first time-frequency resource set is occupied or a type of a signal occupying the first time-frequency resource set; the first time-frequency resource set is associated with a second time-frequency resource set, the second time-frequency resource set comprising multiple resource units; the target threshold is used by a receiver of the first signaling to determine whether the second time-frequency resource set belongs to the first candidate resource pool.

The present disclosure provides a third node for wireless communications, comprising:
a second receiver, receiving a target signaling;
the second receiver, receiving a target positioning reference signal in a target time-frequency resource set, the target time-frequency resource set comprising multiple resource units;
herein, the target signaling is used to indicate that a signal occupying the target time-frequency resource set is the target positioning reference signal; the target time-frequency resource set belongs to a first candidate resource pool; the target positioning reference signal is used to determine a position of the third node.

In one embodiment, the present disclosure has the following advantages:
The present disclosure is aimed at addressing the issue of resources allocation for a moving User transmitting a positioning reference signal;
the present disclosure creates an association between parameters of a target positioning reference signal and a target threshold;
the present disclosure creates an association between occupancy of a first time-frequency resource set and a target threshold;
the present disclosure creates an association between whether a positioning reference signal in a first time-frequency resource set is muted and resource sensing;
the present disclosure creates an association between the type of a signal in a first time-frequency resource set and resource sensing;
in the present disclosure, parameters of a target positioning reference signal and the occupancy of a first time-frequency resource set are jointly used to determine a target threshold, which in turn is used to determine a first candidate resource pool;
the present disclosure introduces the type of signal in time-frequency resources and whether a positioning reference signal is muted in the procedure of resource sensing, thereby avoiding interference to the transmission of SL positioning reference signal.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1A

Figure 1A:
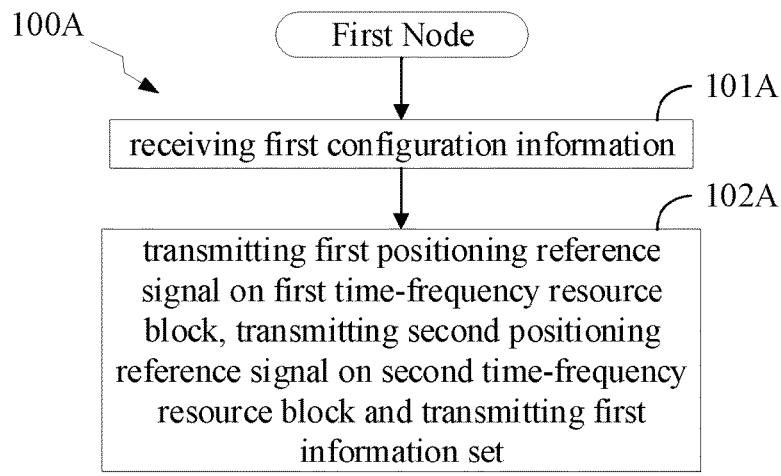
FIG. 1A illustrates a flowchart of processing of a first node according to one embodiment of the present disclosure.

Embodiment 1A illustrates a flowchart of processing of a first node according to one embodiment of the present disclosure, as shown in FIG. 1A. In FIG. 1A, each box represents a step.

In Embodiment 1A, the first node in the present disclosure first implements step 101A, to receive first configuration information; and then implements step 102A, to transmit a first positioning reference signal on a first time-frequency resource block, transmit a second positioning reference signal on a second time-frequency resource block and transmit a first information set; the first configuration information is used to indicate a first resource set, the first resource set comprises more than one time-frequency resource block, and any two time-frequency resource blocks comprised by the first resource set adopt same positioning-related parameters; the first time-frequency resource block and the second time-frequency resource block are respectively two time-frequency resource blocks in the first resource set, and the first time-frequency resource block is earlier than the second time-frequency resource block in time domain; the first information set comprises a first distance, and the first distance is a distance from a first geographical position to a second geographical position, of which the first geographical position is where a transmitter of the first positioning reference signal is located when transmitting the first positioning reference signal, and the second geographical position is where a transmitter of the second positioning reference signal is located when transmitting the second positioning reference signal.

In one embodiment, the first resource set comprises more than one time-frequency resource block.

In one embodiment, the first resource set comprises Q time-frequency resource blocks, Q being a positive integer greater than 1.

In one embodiment, the first resource set comprises more than one time-domain resource block.

In one embodiment, the first resource set comprises Q1 time-domain resource blocks in time domain, Q1 being a positive integer greater than 1.

In one embodiment, the first resource set comprises Q1 time-domain resource blocks in time domain, and comprises Q2 frequency-domain resource block(s) in frequency domain, Q1 being a positive integer greater than 1 and Q2 being a positive integer.

In one embodiment, Q2 is equal to 1.

In one embodiment, Q2 is a positive integer greater than 1.

In one embodiment, any time-frequency resource block of the more than one time-frequency resource block comprised by the first resource set comprises a positive integer number (more than one) of Resource Elements (REs).

In one embodiment, any of the positive integer number of REs comprised by any time-frequency resource block comprised by the first resource set occupies a multicarrier symbol in time domain and a subcarrier in frequency domain.

In one embodiment, any time-frequency resource block of the more than one time-frequency resource block comprised by the first resource set occupies a positive integer number of slot(s) in time domain.

In one embodiment, any time-frequency resource block of the more than one time-frequency resource block comprised by the first resource set occupies a positive integer number of multicarrier symbol(s) in time domain.

In one embodiment, any time-frequency resource block of the more than one time-frequency resource block comprised by the first resource set occupies a positive integer number of subchannel(s) in frequency domain.

In one embodiment, any time-frequency resource block of the more than one time-frequency resource block comprised by the first resource set occupies a positive integer number of Physical Resource Block(s) (PRB(s)) in frequency domain.

In one embodiment, any time-frequency resource block of the more than one time-frequency resource block comprised by the first resource set occupies a positive integer number of subcarrier(s) in frequency domain.

In one embodiment, any time-frequency resource block of the more than one time-frequency resource block comprised by the first resource set occupies a positive integer number of slot(s) in time domain and a positive integer number of subchannel(s) in frequency domain.

In one embodiment, any time-frequency resource block of the more than one time-frequency resource block comprised by the first resource set occupies a positive integer number of slot(s) in time domain and a positive integer number of PRB(s) in frequency domain.

In one embodiment, any time-frequency resource block of the more than one time-frequency resource block comprised by the first resource set occupies a positive integer number of slot(s) in time domain and a positive integer number of subcarrier(s) in frequency domain.

In one embodiment, any time-frequency resource block of the more than one time-frequency resource block comprised by the first resource set occupies a positive integer number of multicarrier symbol(s) in time domain and a positive integer number of subchannel(s) in frequency domain.

In one embodiment, any time-frequency resource block of the more than one time-frequency resource block comprised by the first resource set occupies a positive integer number of multicarrier symbol(s) in time domain and a positive integer number of PRB(s) in frequency domain.

In one embodiment, any time-frequency resource block of the more than one time-frequency resource block comprised by the first resource set occupies a positive integer number of multicarrier symbol(s) in time domain and a positive integer number of subcarrier(s) in frequency domain.

In one embodiment, any of the positive integer number of multicarrier symbol(s) is a Single-Carrier Frequency Division Multiple Access (SC-FDMA) symbol.

In one embodiment, any of the positive integer number of multicarrier symbol(s) is a Discrete Fourier Transform Spread Orthogonal Frequency Division Multiplexing (DFT-S-OFDM) symbol.

In one embodiment, any of the positive integer number of multicarrier symbol(s) is a Frequency Division Multiple Access (FDMA) symbol.

In one embodiment, any of the positive integer number of multicarrier symbol(s) is a Filter Bank Multi-Carrier (FBMC) symbol.

In one embodiment, any of the positive integer number of multicarrier symbol(s) is an Interleaved Frequency Division Multiple Access (IFDMA) symbol.

In one embodiment, any two time-frequency resource blocks of the more than one time-frequency resource block comprised by the first resource set adopt the same positioning-related parameters.

In one embodiment, any two time-frequency resource blocks of the Q time-frequency resource blocks comprised by the first resource set adopt the same positioning-related parameters.

In one embodiment, positioning-related parameters adopted by any time-frequency resource block in the first resource set comprise one or more than one of a Subcarrier Spacing (SCS), a Cyclic Prefix type (CP type), a Center Frequency, a frequency-domain reference Point A, an Absolute Frequency Point A or an Absolute Radio Frequency Channel Number (ARFCN).

In one embodiment, any two time-frequency resource blocks of the more than one time-frequency resource block comprised by the first resource set share a same one or a plurality of the adopted SCS, CP type, a Center Frequency, frequency-domain reference Point A, Absolute Frequency Point A or Absolute Radio Frequency Channel Number (ARFCN).

In one embodiment, SCSs of subcarriers respectively occupied by any two time-frequency resource blocks of the more than one time-frequency resource block comprised by the first resource set in frequency domain are the same.

In one embodiment, symbol lengths of multicarrier symbols respectively occupied by any two time-frequency resource blocks of the more than one time-frequency resource block comprised by the first resource set in time domain are the same.

In one embodiment, any two time-frequency resource blocks of the more than one time-frequency resource block comprised by the first resource set share the same CP type.

In one embodiment, any two time-frequency resource blocks of the more than one time-frequency resource block comprised by the first resource set share the same center frequency.

In one embodiment, any two time-frequency resource blocks of the more than one time-frequency resource block comprised by the first resource set share the same frequency-domain reference Point A.

In one embodiment, any two time-frequency resource blocks of the more than one time-frequency resource block comprised by the first resource set share the same Absolute Frequency Point A.

In one embodiment, any two time-frequency resource blocks of the more than one time-frequency resource block comprised by the first resource set share the same Absolute Radio Frequency Channel Number.

In one embodiment, any two time-frequency resource blocks of the more than one time-frequency resource block comprised by the first resource set adopt the same SCS and CP type.

In one embodiment, any two time-frequency resource blocks of the more than one time-frequency resource block comprised by the first resource set adopt the same SCS, CP type and center frequency.

In one embodiment, any two time-frequency resource blocks of the more than one time-frequency resource block comprised by the first resource set adopt the same SCS, CP type and frequency-domain reference Point A.

In one embodiment, any two time-frequency resource blocks of the more than one time-frequency resource block comprised by the first resource set adopt the same SCS, CP type and Absolute Radio Frequency Channel Number.

In one embodiment, symbol lengths of multicarrier symbols respectively occupied by any two time-frequency resource blocks of the more than one time-frequency resource block comprised by the first resource set in time domain are the same, SCSs of subcarriers respectively occupied by any two time-frequency resource blocks of the more than one time-frequency resource block comprised by the first resource set in frequency domain are the same, and any two time-frequency resource blocks of the more than one time-frequency resource block comprised by the first resource set adopt the same CP type and center frequency.

In one embodiment, symbol lengths of multicarrier symbols respectively occupied by any two time-frequency resource blocks of the more than one time-frequency resource block comprised by the first resource set in time domain are the same, SCSs of subcarriers respectively occupied by any two time-frequency resource blocks of the more than one time-frequency resource block comprised by the first resource set in frequency domain are the same, and any two time-frequency resource blocks of the more than one time-frequency resource block comprised by the first resource set adopt the same CP type and Absolute Frequency Point A.

In one embodiment, the first resource set comprises a Positioning Frequency Layer.

In one embodiment, the first resource set comprises a Sidelink Positioning Frequency Layer.

In one embodiment, the first resource set is a Positioning Frequency Layer.

In one embodiment, the first resource set is a Sidelink Positioning Frequency Layer.

In one embodiment, the first resource set comprises a Physical Sidelink Control Channel (PSCCH).

In one embodiment, the first resource set comprises a Physical Sidelink Shared Channel (PSSCH).

In one embodiment, the first resource set comprises a Physical Sidelink Feedback Channel (PSFCH).

In one embodiment, the first resource set comprises a Physical Uplink Control Channel (PUCCH).

In one embodiment, the first resource set comprises a Physical Uplink Shared Channel (PUSCH).

In one embodiment, the first resource set is used for transmitting Sidelink Control Information (SCI).

In one embodiment, the first resource set is used for transmitting data in a Sidelink Shared Channel (SL-SCH).

In one embodiment, the first resource set is used for transmitting a Reference Signal (RS).

In one embodiment, the first resource set is used for transmitting a Sidelink Reference Signal (SL RS).

In one embodiment, the first resource set is used for transmitting a Positioning Reference Signal (PRS).

In one embodiment, the first resource set is used for transmitting a Sidelink Positioning Reference Signal (SL PRS).

In one embodiment, the first resource set is used for transmitting a Channel State Information-Reference Signal (CSI-RS).

In one embodiment, the first resource set is used for transmitting a Sidelink Channel State Information-Reference Signal (SL CSI-RS).

In one embodiment, the first resource set is used for transmitting a Sidelink Demodulation Reference Signal (SL DMRS).

In one embodiment, the first configuration information is used to indicate the first resource set.

In one embodiment, the first configuration information indicates the more than one time-frequency resource block comprised by the first resource set.

In one embodiment, the first configuration information indicates the Q1 time-domain resource blocks comprised by the first resource set.

In one embodiment, the first configuration information indicates the Q2 frequency-domain resource block(s) comprised by the first resource set.

In one embodiment, the first configuration information indicates a first time-frequency resource block out of the more than one time-frequency resource block comprised by the first resource set.

In one embodiment, the first configuration information indicates a time-frequency resource block which is earliest in time domain out of the more than one time-frequency resource block comprised by the first resource set.

In one embodiment, the first configuration information indicates a time-frequency resource block which is lowest in frequency domain out of the more than one time-frequency resource block comprised by the first resource set.

In one embodiment, the first configuration information indicates an earliest time-domain resource block out of the Q1 time-domain resource blocks comprised by the first resource set.

In one embodiment, the first configuration information indicates a frequency-domain resource block which is lowest in frequency domain out of the Q2 frequency-domain resource blocks comprised by the first resource set.

In one embodiment, the first configuration information indicates an SCS of subcarriers occupied by any of the more than one time-frequency resource block comprised by the first resource set in frequency domain.

In one embodiment, the first configuration information indicates a symbol length of multicarrier symbols occupied by any of the more than one time-frequency resource block comprised by the first resource set in time domain.

In one embodiment, the first configuration information indicates a CP type of multicarrier symbols occupied by any of the more than one time-frequency resource block comprised by the first resource set in time domain.

In one embodiment, the first configuration information indicates a center frequency of the more than one time-frequency resource block comprised by the first resource set in frequency domain.

In one embodiment, the first configuration information indicates a reference Point A of the more than one time-frequency resource block comprised by the first resource set in frequency domain.

In one embodiment, the first configuration information indicates an Absolute Frequency Point A of the more than one time-frequency resource block comprised by the first resource set in frequency domain.

In one embodiment, the first configuration information indicates an Absolute Radio Frequency Channel Number of the more than one time-frequency resource block comprised by the first resource set in frequency domain.

In one embodiment, the first configuration information comprises parameters of a Positioning Frequency Layer.

In one embodiment, the first configuration information comprises Positioning Assistance Data.

In one embodiment, the first configuration information comprises Carrier Frequency.

In one embodiment, the first configuration information comprises an Absolute Radio Frequency Channel Number (ARFCN).

In one embodiment, the first configuration information comprises an SL-ARFCN.

In one embodiment, the first configuration information comprises a subcarrier spacing of a frequency-domain resource occupied by the first positioning reference signal.

In one embodiment, the first configuration information comprises a subcarrier spacing of a frequency-domain resource occupied by the second positioning reference signal.

In one embodiment, the first configuration information comprises a subcarrier spacing of a frequency-domain resource occupied by the first positioning reference signal and a subcarrier spacing of a frequency-domain resource occupied by the second positioning reference signal.

In one embodiment, a frequency-domain resource occupied by the first positioning reference signal comprises a positive integer number of subcarrier(s).

In one embodiment, a frequency-domain resource occupied by the first positioning reference signal comprises a positive integer number of PRB(s).

In one embodiment, a frequency-domain resource occupied by the first positioning reference signal comprises a positive integer number of subchannel(s).

In one embodiment, a frequency-domain resource occupied by the second positioning reference signal comprises a positive integer number of subcarrier(s).

In one embodiment, a frequency-domain resource occupied by the second positioning reference signal comprises a positive integer number of PRB(s).

In one embodiment, a frequency-domain resource occupied by the second positioning reference signal comprises a positive integer number of subchannel(s).

In one embodiment, the first configuration information comprises a symbol length of multicarrier symbols in a time-domain resource occupied by the first positioning reference signal.

In one embodiment, the first configuration information comprises a symbol length of multicarrier symbols in a time-domain resource occupied by the second positioning reference signal.

In one embodiment, the first configuration information comprises a symbol length of multicarrier symbols in a time-domain resource occupied by the first positioning reference signal and a symbol length of multicarrier symbols in a time-domain resource occupied by the second positioning reference signal.

In one embodiment, the first configuration information comprises a cyclic prefix (CP) type of slots in a time-domain resource occupied by the first positioning reference signal.

In one embodiment, the first configuration information comprises a CP type of slots in a time-domain resource occupied by the second positioning reference signal.

In one embodiment, the first configuration information comprises a CP type of slots in a time-domain resource occupied by the first positioning reference signal and a CP type of slots in a time-domain resource occupied by the second positioning reference signal.

In one embodiment, the first configuration information comprises all or part of a Higher Layer signaling.

In one embodiment, the first configuration information comprises all or part of a Radio Resource Control (RRC) layer signaling.

In one embodiment, the first configuration information comprises one or more fields in an RRC Information Element (IE).

In one embodiment, the first configuration information is transmitted on a PC5 interface.

In one embodiment, the first configuration information comprises a PC5-RRC signaling.

In one embodiment, the first configuration information comprises one or more fields in a PC5-RRC signaling.

In one embodiment, the first configuration information comprises a System Information Block (SIB).

In one embodiment, the first configuration information comprises Positioning System Information.

In one embodiment, the first configuration information comprises Sidelink Positioning System Information.

In one embodiment, the first configuration information comprises a Positioning System Information Block (PosSIB).

In one embodiment, the first configuration information comprises a Sidelink Positioning System Information Block (SL-PosSIB).

In one embodiment, the first configuration information comprises all or part of a Multimedia Access Control (MAC) layer signal.

In one embodiment, the first configuration information comprises a MAC Control Element (CE).

In one embodiment, the first configuration information comprises one or more fields in a MAC CE.

In one embodiment, the first configuration information comprises one or more fields in a Physical (PHY) Layer signaling.

In one embodiment, a channel occupied by the first configuration information includes a Physical Sidelink Control Channel (PSCCH).

In one embodiment, a channel occupied by the first configuration information includes a Physical Sidelink Shared Channel (PSSCH).

In one embodiment, a channel occupied by the first configuration information includes a Physical Downlink Control Channel (PDCCH).

In one embodiment, a channel occupied by the first configuration information includes a Physical Downlink Shared Channel (PDSCH).

In one embodiment, a transmitter of the first configuration information is the second node in the present disclosure.

In one embodiment, a transmitter of the first configuration information is a higher layer of the first node in the present disclosure.

In one embodiment, the first configuration information is transmitted from a higher layer of the first node to a physical layer of the first node.

In one embodiment, the first time-frequency resource block and the second time-frequency resource block are respectively two time-frequency resource blocks of the positive integer number of time-frequency resource blocks comprised by the first resource set.

In one embodiment, the first time-frequency resource block and the second time-frequency resource block are respectively two time-frequency resource blocks of the Q time-frequency resource blocks comprised by the first resource set, Q being a positive integer greater than 1.

In one embodiment, the first time-frequency resource block comprises a positive integer number of RE(s).

In one embodiment, the second time-frequency resource block comprises a positive integer number of RE(s).

In one embodiment, the first time-frequency resource block comprises a positive integer number (more than one) of REs.

In one embodiment, the second time-frequency resource block comprises a positive integer number (more than one) of REs.

In one embodiment, the first time-frequency resource block and the second time-frequency resource block are orthogonal.

In one embodiment, the first time-frequency resource block and the second time-frequency resource block are orthogonal in time domain, and the first time-frequency resource block and the second time-frequency resource block are the same in frequency domain.

In one embodiment, the first time-frequency resource block and the second time-frequency resource block are orthogonal in time domain, and the first time-frequency resource block and the second time-frequency resource block are also orthogonal in frequency domain.

In one embodiment, the first time-frequency resource block and the second time-frequency resource block are two time-frequency resource blocks which are Time Division Multiplexing (TDM) in the first resource set.

In one embodiment, the first time-frequency resource block is earlier than the second time-frequency resource block in time domain.

In one embodiment, the first time-frequency resource block and the second time-frequency resource block are two time-frequency resource blocks which are TDM in the first resource set, and the first time-frequency resource block is earlier than the second time-frequency resource block in time domain.

In one embodiment, a last multicarrier symbol occupied by the first time-frequency resource block is before a first multicarrier symbol occupied by the second time-frequency resource block.

In one embodiment, a last multicarrier symbol occupied by the first time-frequency resource block is earlier than a first multicarrier symbol occupied by the second time-frequency resource block in time domain.

In one embodiment, the first time-frequency resource block comprises a PSCCH.

In one embodiment, the second time-frequency resource block comprises a PSSCH.

In one embodiment, the first time-frequency resource block comprises a PSCCH.

In one embodiment, the second time-frequency resource block comprises a PSSCH.

In one embodiment, the first time-frequency resource block is used for transmitting an SL PRS.

In one embodiment, the first time-frequency resource block is used for transmitting an SL CSI-RS.

In one embodiment, the first time-frequency resource block is used for transmitting an SL DMRS.

In one embodiment, the second time-frequency resource block is used for transmitting an SL PRS.

In one embodiment, the second time-frequency resource block is used for transmitting an SL CSI-RS.

In one embodiment, the second time-frequency resource block is used for transmitting an SL DMRS.

In one embodiment, the first time-frequency resource block comprises a PSSCH, and the second time-frequency resource block comprises a PSSCH.

In one embodiment, the first time-frequency resource block is used for transmitting an SL PRS, and the second time-frequency resource block is used for transmitting an SL PRS.

In one embodiment, positioning-related parameters adopted by the first time-frequency resource block are identical to positioning-related parameters adopted by the second time-frequency resource block.

In one embodiment, a subcarrier spacing and a CP type adopted by the first time-frequency resource block are respectively identical to a subcarrier spacing and a CP type adopted by the second time-frequency resource block.

In one embodiment, a subcarrier spacing, a CP type and a center frequency adopted by the first time-frequency resource block are respectively identical to a subcarrier spacing, a CP type and a center frequency adopted by the second time-frequency resource block.

In one embodiment, a subcarrier spacing, a CP type, a center frequency and a frequency-domain reference point A adopted by the first time-frequency resource block are respectively identical to a subcarrier spacing, a CP type, a center frequency and a frequency-domain reference point A adopted by the second time-frequency resource block.

In one embodiment, a subcarrier spacing, a CP type, a center frequency and an absolute frequency point A adopted by the first time-frequency resource block are respectively identical to a subcarrier spacing, a CP type, a center frequency and an absolute frequency point A adopted by the second time-frequency resource block.

In one embodiment, a subcarrier spacing, a CP type, a center frequency and an Absolute Radio Frequency Channel Number adopted by the first time-frequency resource block are respectively identical to a subcarrier spacing, a CP type, a center frequency and an Absolute Radio Frequency Channel Number adopted by the second time-frequency resource block.

In one embodiment, a transmitter of the first positioning reference signal and a transmitter of the second positioning reference signal are a same communication node.

In one embodiment, a transmitter of the first positioning reference signal and a transmitter of the second positioning reference signal are a same UE.

In one embodiment, a transmitter of the first positioning reference signal and a transmitter of the second positioning reference signal are a same base station.

In one embodiment, the first positioning reference signal is transmitted on the first time-frequency resource block, and the second positioning reference signal is transmitted on the second time-frequency resource block.

In one embodiment, the first positioning reference signal is transmitted on the first time-frequency resource block, and the second positioning reference signal is transmitted on the second time-frequency resource block, the first time-frequency resource block and the second time-frequency resource block being TDM.

In one embodiment, the first positioning reference signal comprises a first sequence, and the second positioning reference signal comprises a second sequence.

In one embodiment, a first sequence is used for generating the first positioning reference signal, and a second sequence is used for generating the second positioning reference signal.

In one embodiment, the first sequence and the second sequence are both Pseudo-Random Sequences.

In one embodiment, the first sequence and the second sequence are both Low-Peak to Average Power Ratio Sequences (Low-PAPR Sequences).

In one embodiment, the first sequence and the second sequence are both Gold sequences.

In one embodiment, the first sequence and the second sequence are both M sequences.

In one embodiment, the first sequence and the second sequence are both Zadeoff-Chu (ZC) sequences.

In one embodiment, the first positioning reference signal is obtained by the first sequence sequentially through Sequence Generation, Discrete Fourier Transform (DFT), Modulation and Resource Element Mapping, and Wideband Symbol Generation.

In one embodiment, the second positioning reference signal is obtained by the second sequence sequentially through Sequence Generation, Discrete Fourier Transform (DFT), Modulation and Resource Element Mapping, and Wideband Symbol Generation.

In one embodiment, the first sequence is mapped to a positive integer number of RE(s) in the first time-frequency resource block.

In one embodiment, the second sequence is mapped to a positive integer number of RE(s) in the second time-frequency resource block.

In one embodiment, the first positioning reference signal comprises a Positioning Reference Signal (PRS), and the second positioning reference signal comprises a PRS.

In one embodiment, the first positioning reference signal comprises an SL PRS, and the second positioning reference signal comprises an SL PRS.

In one embodiment, the first positioning reference signal comprises a Downlink Positioning Reference Signal (DL PRS), and the second positioning reference signal comprises an SL PRS.

In one embodiment, the first positioning reference signal comprises an SL PRS, and the second positioning reference signal comprises a DL PRS.

In one embodiment, the first positioning reference signal comprises a CSI-RS, and the second positioning reference signal comprises a CSI-RS.

In one embodiment, the first positioning reference signal comprises an SL CSI-RS, and the second positioning reference signal comprises an SL CSI-RS.

In one embodiment, the first positioning reference signal comprises an SL PRS, and the second positioning reference signal comprises an SL CSI-RS.

In one embodiment, the first positioning reference signal comprises an SL CSI-RS, and the second positioning reference signal comprises an SL PRS.

In one embodiment, the first positioning reference signal comprises a Demodulation Reference Signal (DMRS), and the second positioning reference signal comprises a DMRS.

In one embodiment, the first positioning reference signal comprises an SL DMRS, and the second positioning reference signal comprises an SL DMRS.

In one embodiment, the first positioning reference signal comprises an SL PRS, and the second positioning reference signal comprises an SL DMRS.

In one embodiment, the first positioning reference signal comprises an Uplink Sounding Reference Signal (UL SRS), and the second positioning reference signal comprises a UL SRS.

In one embodiment, the first positioning reference signal comprises an SL PRS, and the second positioning reference signal comprises a UL SRS.

In one embodiment, the first positioning reference signal comprises a UL SRS, and the second positioning reference signal comprises an SL PRS.

In one embodiment, the first positioning reference signal comprises a Synchronization Signal/Physical Broadcast Channel Block (SS/PBCH Block), and the second positioning reference signal comprises a SS/PBCH Block.

In one embodiment, the first positioning reference signal comprises a Sidelink Synchronization Signal/Physical Sidelink Broadcast Channel Block (S-SS/PSBCH Block), and the second positioning reference signal comprises a SS/PSBCH Block.

In one embodiment, the first positioning reference signal comprises a S-SS/PSBCH Block, and the second positioning reference signal comprises an SL PRS.

In one embodiment, the first positioning reference signal comprises an SL PRS, and the second positioning reference signal comprises a S-SS/PSBCH Block.

In one embodiment, a target receiver of the first information set includes a UE.

In one embodiment, a target receiver of the first information set includes a base station.

In one embodiment, a target receiver of the first information set includes a core network.

In one embodiment, a target receiver of the first information set is a Serving Mobile Location Centre (SMLC).

In one embodiment, a target receiver of the first information set is an Enhanced Serving Mobile Location Centre (E-SMLC).

In one embodiment, a target receiver of the first information set is a Secure User Plane Location Platform (SLP).

In one embodiment, the first information set is transmitted through a User Plane.

In one embodiment, the first information set is transmitted through a Control Plane.

In one embodiment, the first information set comprises all or part of a Higher Layer signaling.

In one embodiment, the first information set comprises all or part of an RRC layer signaling.

In one embodiment, the first information set comprises one or more fields in an RRC IE.

In one embodiment, the first information set comprises a PC5-RRC signaling.

In one embodiment, the first information set comprises one or more fields in a PC5-RRC signaling.

In one embodiment, the first information set comprises all or part of a MAC layer signal.

In one embodiment, the first information set comprises one or more fields in a MAC CE.

In one embodiment, the first information set comprises one or more fields in a PHY layer signaling.

In one embodiment, the first information set comprises one or more fields in a piece of SCI.

In one embodiment, the first information set comprises a piece of SCI.

In one embodiment, a channel occupied by the first information set includes a PSCCH.

In one embodiment, a channel occupied by the first information set includes a PSSCH.

In one embodiment, the first information set comprises a first distance.

In one embodiment, the first information set indicates the first distance.

In one embodiment, the first information set comprises a positive integer number of piece(s) of sub-information, and the first distance is one of the positive integer number of piece(s) of sub-information comprised by the first information set.

In one embodiment, the first information set comprises a positive integer number of field(s), and the first distance is one of the positive integer number of field(s) comprised by the first information set.

In one embodiment, the first distance is used for generating the first information set.

In one embodiment, the first information set comprises a first bit block, the first bit block comprises a positive integer number of bit(s), and the positive integer number of bit(s) comprised by the first bit block is(are) used for indicating the first distance.

In one embodiment, a first bit block comprises a positive integer number of bit(s), and the positive integer number of bit(s) comprised by the first bit block is(are) used for indicating the first distance, and all or part of the positive integer number of bit(s) comprised by the first bit block is(are) used for generating the first information set.

In one embodiment, the first distance is used for scrambling the first information set.

In one embodiment, the first distance is used for generating a scrambling sequence for the first information set.

In one embodiment, at least one of the positive integer number of piece(s) of sub-information comprised by the first information set is a PC5-RRC signaling.

In one embodiment, at least one of the positive integer number of piece(s) of sub-information comprised by the first information set is SCI.

In one embodiment, each of the positive integer number of piece(s) of sub-information comprised by the first information set is a PC5-RRC signaling.

In one embodiment, each of the positive integer number of piece(s) of sub-information comprised by the first information set is SCI.

In one embodiment, at least one of the positive integer number of pieces of sub-information comprised by the first information set is a PC5-RRC signaling, and at least one of the positive integer number of pieces of sub-information comprised by the first information set is SCI.

Embodiment 1B

Figure 1B:
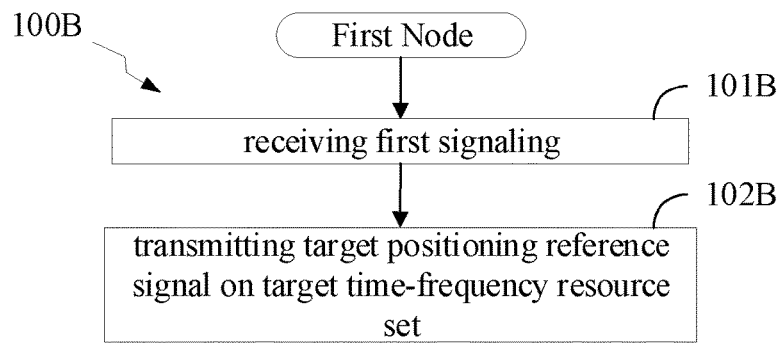
FIG. 1B illustrates a flowchart of processing of a first node according to one embodiment of the present disclosure.

Embodiment 1B illustrates a flowchart of processing of a first node according to one embodiment of the present disclosure, as shown in FIG. 1B. In FIG. 1B, each step represents a step.

In Embodiment 1B, the first node in the present disclosure first implements step 101B to receive a first signaling; and then implements step 102B, to transmit a target positioning reference signal on a target time-frequency resource set; the first signaling is used to indicate occupancy of a first time-frequency resource set, the first time-frequency resource set comprising multiple resource units; parameters of the target positioning reference signal and the occupancy of the first time-frequency resource set are jointly used to determine a target threshold; the occupancy of the first time-frequency resource set comprises at least one of whether the first time-frequency resource set is occupied or a type of a signal occupying the first time-frequency resource set; the target time-frequency resource set belongs to a first candidate resource pool, and the first time-frequency resource set is associated with a second time-frequency resource set, the second time-frequency resource set comprising multiple resource units; the target threshold is used to determine whether the second time-frequency resource set belongs to the first candidate resource pool.

In one embodiment, a target receiver of the first signaling includes a UE.

In one embodiment, a target receiver of the first signaling includes a base station.

In one embodiment, a target receiver of the first signaling includes a core network.

In one embodiment, a target receiver of the first signaling is a SMLC.

In one embodiment, a target receiver of the first signaling is an E-SMLC.

In one embodiment, a target receiver of the first signaling is a SLP.

In one embodiment, the first signaling is transmitted through a User Plane.

In one embodiment, the first signaling is transmitted through a Control Plane.

In one embodiment, the first signaling comprises all or part of a higher layer signaling.

In one embodiment, the first signaling comprises all or part of an RRC layer signaling.

In one embodiment, the first signaling comprises one or more fields in an RRC IE.

In one embodiment, the first signaling comprises a PC5-RRC signaling.

In one embodiment, the first signaling comprises one or more fields in a PC5-RRC signaling.

In one embodiment, the first signaling comprises all or part of a MAC layer signal.

In one embodiment, the first signaling comprises one or more fields in a MAC CE.

In one embodiment, the first signaling comprises one or more fields in a PHY layer signaling.

In one embodiment, the first signaling comprises one or more fields in a piece of SCI.

In one embodiment, the first signaling comprises a piece of SCI.

In one embodiment, a channel occupied by the first signaling includes a PSCCH.

In one embodiment, a channel occupied by the first signaling includes a PSSCH.

In one embodiment, the first signaling comprises a positive integer number of sub-signaling(s), and at least one of the positive integer number of sub-signaling(s) is a PC5-RRC signaling.

In one embodiment, the first signaling comprises a positive integer number of sub-signaling(s), and at least one of the positive integer number of sub-signaling(s) is SCI.

In one embodiment, each of the positive integer number of sub-signaling(s) comprised by the first signaling is a PC5-RRC signaling.

In one embodiment, each of the positive integer number of sub-signaling(s) comprised by the first signaling is SCI.

In one embodiment, at least one of the positive integer number of sub-signalings comprised by the first signaling is a PC5-RRC signaling, and at least one of the positive integer number of sub-signalings comprised by the first signaling is SCI.

In one embodiment, the first signaling comprises the occupancy of the first time-frequency resource set.

In one embodiment, the first signaling indicates the occupancy of the first time-frequency resource set.

In one embodiment, the first signaling comprises a positive integer number of sub-signaling(s), and the occupancy of the first time-frequency resource set is one of the positive integer number of sub-signaling(s) comprised by the first signaling.

In one embodiment, the first signaling comprises a positive integer number of field(s), and the occupancy of the first time-frequency resource set is one of the positive integer number of field(s) comprised by the first signaling.

In one embodiment, the occupancy of the first time-frequency resource set is used for generating the first signaling.

In one embodiment, the first signaling comprises a first bit block, the first bit block comprises a positive integer number of bit(s), and the positive integer number of bit(s) in the first bit block is(are) used to indicate the occupancy of the first time-frequency resource set.

In one embodiment, a first bit block comprises a positive integer number of bit(s), and the positive integer number of bit(s) in the first bit block is(are) used to indicate the occupancy of the first time-frequency resource set, and all or part of the positive integer number of bit(s) comprised by the first bit block is(are) used for generating the first signaling.

In one embodiment, the first signaling comprises a first bitmap, the first bitmap comprising a positive integer number of binary bits.

In one embodiment, the positive integer number of binary bits comprised by the first bitmap in the first signaling respectively correspond to the multiple resource units comprised by the first time-frequency resource set.

In one embodiment, any binary bit in the first bitmap comprised by the first signaling indicates whether one of the multiple resource units comprised by the first time-frequency resource set is occupied.

In one embodiment, a first bit is any binary bit of the positive integer number of binary bits comprised by the first bitmap; when the first bit is "1", one of the multiple resource units comprised by the first time-frequency resource set corresponding to the first bit is occupied; when the first bit is "0", one of the multiple resource units comprised by the first time-frequency resource set corresponding to the first bit is unoccupied.

In one embodiment, the occupancy of the first time-frequency resource set is used for scrambling the first signaling.

In one embodiment, the occupancy of the first time-frequency resource set is used for generating a scrambling sequence for the first signaling.

In one embodiment, a first resource pool comprises multiple time-frequency resource sets, and any one of the multiple time-frequency resource sets comprised by the first resource pool comprises multiple resource units.

In one embodiment, the first resource pool comprises an SL Resource Pool.

In one embodiment, the first resource pool comprises an SL Transmit Resource Pool.

In one embodiment, the first resource pool comprises an SL Reception Resource Pool.

In one embodiment, any one of the multiple time-frequency resource sets comprised by the first resource pool comprises multiple REs.

In one embodiment, any one of the multiple time-frequency resource sets comprised by the first resource pool comprises a positive integer number of multicarrier symbol(s) in time domain.

In one embodiment, any one of the multiple time-frequency resource sets comprised by the first resource pool comprises a positive integer number of slot(s) in time domain.

In one embodiment, any one of the multiple time-frequency resource sets comprised by the first resource pool comprises a positive integer number of subcarrier(s) in frequency domain.

In one embodiment, any one of the multiple time-frequency resource sets comprised by the first resource pool comprises a positive integer number of PRB(s) in frequency domain.

In one embodiment, any one of the multiple time-frequency resource sets comprised by the first resource pool comprises a positive integer number of subchannel(s) in frequency domain.

In one embodiment, the first resource pool is configured by a Higher Layer Signaling.

In one embodiment, the first resource pool is configured by an RRC layer signaling.

In one embodiment, the first resource pool is preconfigured.

In one embodiment, the multiple resource units comprised by any one of the multiple time-frequency resource sets comprised by the first resource pool respectively comprise multiple REs.

In one embodiment, the multiple resource units comprised by any one of the multiple time-frequency resource sets comprised by the first resource pool are multiple REs respectively.

In one embodiment, positioning-related parameters respectively adopted by any two time-frequency resource sets of the multiple time-frequency resource sets comprised by the first resource pool are the same.

In one embodiment, positioning-related parameters adopted by any time-frequency resource set in the first resource pool comprise one or more than one of a Subcarrier Spacing (SCS), a Cyclic Prefix type (CP type), a Center Frequency, a frequency-domain reference Point A, an Absolute Frequency Point A or an Absolute Radio Frequency Channel Number (ARFCN).

In one embodiment, any two time-frequency resource sets of the multiple time-frequency resource sets comprised by the first resource pool share a same one or a plurality of the adopted SCS, CP type, a Center Frequency, frequency-domain reference Point A, Absolute Frequency Point A or Absolute Radio Frequency Channel Number (ARFCN).

In one embodiment, the first time-frequency resource set is one of the multiple time-frequency resource sets comprised by the first resource pool.

In one embodiment, the first time-frequency resource set comprises multiple resource units.

In one embodiment, the multiple resource units comprised by the first time-frequency resource set are multiple REs respectively.

In one embodiment, any of the multiple resource units comprised by the first time-frequency resource set occupies a positive integer number of multicarrier symbol(s) in time domain.

In one embodiment, any of the multiple resource units comprised by the first time-frequency resource set occupies a multicarrier symbol in time domain.

In one embodiment, any of the multiple resource units comprised by the first time-frequency resource set occupies multiple multicarrier symbols in time domain.

In one embodiment, any of the multiple resource units comprised by the first time-frequency resource set occupies a positive integer number of slot(s) in time domain.

In one embodiment, any of the multiple resource units comprised by the first time-frequency resource set occupies a positive integer number of subcarrier(s) in frequency domain.

In one embodiment, any of the multiple resource units comprised by the first time-frequency resource set occupies a subcarrier in frequency domain.

In one embodiment, any of the multiple resource units comprised by the first time-frequency resource set occupies multiple subcarriers in frequency domain.

In one embodiment, any of the multiple resource units comprised by the first time-frequency resource set occupies a positive integer number of PRB(s) in frequency domain.

In one embodiment, any of the multiple resource units comprised by the first time-frequency resource set occupies a positive integer number of subchannel(s) in frequency domain.

In one embodiment, any of the multiple resource units comprised by the first time-frequency resource set occupies multiple multicarrier symbols in time domain, and a subchannel in frequency domain.

In one embodiment, the first time-frequency resource set comprises a PSCCH.

In one embodiment, the first time-frequency resource set comprises a PSSCH.

In one embodiment, the first time-frequency resource set is used for transmitting a Sidelink Positioning Reference Signal (SL PRS).

In one embodiment, the first time-frequency resource set is used for transmitting a Sidelink Channel State Information Reference Signal (SL CSI-RS).

In one embodiment, the first time-frequency resource set is used for transmitting a PSCCH Demodulation Reference Signal (DMRS).

In one embodiment, the first time-frequency resource set is used for transmitting a PSSCH DMRS.

In one embodiment, the first time-frequency resource set and the second time-frequency resource set are two time-frequency resource sets of the multiple time-frequency resource sets comprised by the first resource pool.

In one embodiment, the multiple resource units comprised by the second time-frequency resource set are multiple REs respectively.

In one embodiment, any of the multiple resource units comprised by the second time-frequency resource set occupies a positive integer number of multicarrier symbol(s) in time domain.

In one embodiment, any of the multiple resource units comprised by the second time-frequency resource set occupies a positive integer number of slot(s) in time domain.

In one embodiment, any of the multiple resource units comprised by the second time-frequency resource set occupies a positive integer number of subcarrier(s) in frequency domain.

In one embodiment, any of the multiple resource units comprised by the second time-frequency resource set occupies a positive integer number of PRB(s) in frequency domain.

In one embodiment, any of the multiple resource units comprised by the second time-frequency resource set occupies a positive integer number of subchannel(s) in frequency domain.

In one embodiment, any of the multiple resource units comprised by the second time-frequency resource set occupies multiple multicarrier symbols in time domain, and a subchannel in frequency domain.

In one embodiment, the second time-frequency resource set comprises a PSCCH.

In one embodiment, the second time-frequency resource set comprises a PSSCH.

In one embodiment, the second time-frequency resource set is used for transmitting an SL PRS.

In one embodiment, the second time-frequency resource set is used for transmitting an SL CSI-RS.

In one embodiment, the second time-frequency resource set is used for transmitting a PSCCH DMRS.

In one embodiment, the second time-frequency resource set is used for transmitting a PSSCH DMRS.

In one embodiment, the first time-frequency resource set is associated with the second time-frequency resource set.

In one embodiment, the first time-frequency resource set and the second time-frequency resource set are two time-frequency resource sets of the multiple time-frequency resource sets comprised by the first resource pool, and the first time-frequency resource set is associated with the second time-frequency resource set.

In one embodiment, the first time-frequency resource set and the second time-frequency resource set are orthogonal.

In one embodiment, the first time-frequency resource set and the second time-frequency resource set are orthogonal in time domain, and the first time-frequency resource set and the second time-frequency resource set are the same in frequency domain.

In one embodiment, the first time-frequency resource set and the second time-frequency resource set are orthogonal in time domain, and the positive integer number of subcarrier(s) occupied by the first time-frequency resource set in frequency domain is(are) the same as the positive integer number of subcarrier(s) occupied by the second time-frequency resource set in frequency domain.

In one embodiment, the first time-frequency resource set and the second time-frequency resource set are orthogonal in time domain, and the first time-frequency resource set and the second time-frequency resource set are also orthogonal in frequency domain.

In one embodiment, the first time-frequency resource set and the second time-frequency resource set are two time-frequency resource sets that are TDM in the first resource pool.

In one embodiment, the first time-frequency resource set is earlier than the second time-frequency resource set in time domain.

In one embodiment, the first time-frequency resource set and the second time-frequency resource set are two time-frequency resource sets that are TDM in the first resource pool, and the first time-frequency resource set is earlier than the second time-frequency resource set in time domain.

In one embodiment, a last multicarrier symbol occupied by the first time-frequency resource set is before a first multicarrier symbol occupied by the second time-frequency resource set.

In one embodiment, a last multicarrier symbol occupied by the first time-frequency resource set is earlier than a first multicarrier symbol occupied by the second time-frequency resource set in time domain.

In one embodiment, a first time-frequency resource set group comprises multiple time-frequency resource sets, and any two adjacent time-frequency resource sets of the multiple time-frequency resource sets comprised by the first time-frequency resource set group are spaced by an equal interval in time domain.

In one embodiment, the first time-frequency resource set is one of the multiple time-frequency resource sets comprised by the first time-frequency resource set group, and the second time-frequency resource set is a time-frequency resource set other than the multiple time-frequency resource sets comprised by the first time-frequency resource set group; an interval between the second time-frequency resource set and a last time-frequency resource set comprised in the first time-frequency resource set group in time domain is equal to an interval between any two adjacent time-frequency resource sets of the multiple time-frequency resource sets comprised by the first time-frequency resource set group in time domain.

In one embodiment, the interval between any two adjacent time-frequency resource sets of the multiple time-frequency resource sets comprised by the first time-frequency resource set group in time domain comprises a positive integer number of multicarrier symbol(s).

In one embodiment, the interval between any two adjacent time-frequency resource sets of the multiple time-frequency resource sets comprised by the first time-frequency resource set group in time domain comprises a positive integer number of slot(s).

In one embodiment, the interval between the second time-frequency resource set and a last time-frequency resource set comprised in the first time-frequency resource set group in time domain comprises a positive integer number of multicarrier symbol(s).

In one embodiment, the interval between the second time-frequency resource set and a last time-frequency resource set comprised in the first time-frequency resource set group in time domain comprises a positive integer number of slot(s).

In one embodiment, a first candidate resource pool comprises a positive integer number of time-frequency resource set(s), and any of the positive integer number of time-frequency resource set(s) comprised by the first candidate resource pool comprises multiple resource units.

In one embodiment, the positive integer number of time-frequency resource set(s) comprised by the first candidate resource pool belongs (belong) to the first resource pool.

In one embodiment, the multiple time-frequency resource sets comprised by the first resource pool comprise the positive integer number of time-frequency resource set(s) comprised by the first candidate resource pool.

In one embodiment, any of the positive integer number of time-frequency resource set(s) comprised by the first candidate resource pool is one of the multiple time-frequency resource sets comprised by the first resource pool.

In one embodiment, any of the positive integer number of time-frequency resource set(s) comprised by the first candidate resource pool comprises multiple REs.

In one embodiment, the multiple resource units comprised by any of the positive integer number of time-frequency resource set(s) comprised by the first candidate resource pool are multiple REs respectively.

In one embodiment, the second time-frequency resource set belongs to the first candidate resource pool.

In one embodiment, the second time-frequency resource set is one of the positive integer number of time-frequency resource set(s) comprised by the first candidate resource pool.

In one embodiment, the second time-frequency resource set does not belong to the first candidate resource pool.

In one embodiment, the second time-frequency resource set is different from any of the positive integer number of time-frequency resource set(s) comprised by the first candidate resource pool.

In one embodiment, the first candidate resource pool comprises the target time-frequency resource set.

In one embodiment, the target time-frequency resource set is one of the positive integer number of time-frequency resource set(s) comprised by the first candidate resource pool.

In one embodiment, the target time-frequency resource set comprises multiple resource units.

In one embodiment, the multiple resource units comprised by the target time-frequency resource set are multiple REs respectively.

In one embodiment, any one of the multiple resource units comprised by the target time-frequency resource set occupies a positive integer number of multicarrier symbol(s) in time domain.

In one embodiment, any one of the multiple resource units comprised by the target time-frequency resource set occupies a positive integer number of slot(s) in time domain.

In one embodiment, any one of the multiple resource units comprised by the target time-frequency resource set occupies a positive integer number of subcarrier(s) in frequency domain.

In one embodiment, any one of the multiple resource units comprised by the target time-frequency resource set occupies a positive integer number of PRB(s) in frequency domain.

In one embodiment, any one of the multiple resource units comprised by the target time-frequency resource set occupies a positive integer number of subchannel(s) in frequency domain.

In one embodiment, any one of the multiple resource units comprised by the target time-frequency resource set occupies multiple multicarrier symbols in time domain, and occupies a subchannel in frequency domain.

In one embodiment, the target time-frequency resource set comprises a PSCCH.

In one embodiment, the target time-frequency resource set comprises a PSSCH.

In one embodiment, the target time-frequency resource set is used for transmitting an SL PRS.

In one embodiment, the target time-frequency resource set is used for transmitting an SL CSI-RS.

In one embodiment, the target time-frequency resource set is used for transmitting a PSCCH DMRS.

In one embodiment, the target time-frequency resource set is used for transmitting a PSSCH DMRS.

In one embodiment, the target time-frequency resource set comprises multiple REs, the target time-frequency resource set is used for transmission of a positioning reference signal, and the target time-frequency resource set occupies multiple consecutive multicarrier symbols and PRBs.

In one embodiment, the target time-frequency resource set comprises multiple REs, the target time-frequency resource set is used for transmission of the target positioning reference signal, and the target time-frequency resource set occupies multiple consecutive multicarrier symbols and PRBs.

In one embodiment, the first node autonomously selects the target time-frequency resource set from the positive integer number of time-frequency resource sets comprised by the first candidate resource pool.

In one embodiment, the first node autonomously determines the target time-frequency resource set out of the positive integer number of time-frequency resource sets comprised by the first candidate resource pool.

In one embodiment, the target time-frequency resource set is indicated.

In one embodiment, the target time-frequency resource set is indicated by Downlink Control Information (DCI).

In one embodiment, the target positioning reference signal comprises a first sequence.

In one embodiment, a first sequence is used for generating the target positioning reference signal.

In one embodiment, the first sequence is a Pseudo-Random Sequence.

In one embodiment, the first sequence is a Low-PAPR Sequence.

In one embodiment, the first sequence is a Gold sequence.

In one embodiment, the first sequence is a M sequence.

In one embodiment, the first sequence is a Zadeoff-Chu (ZC) sequence.

In one embodiment, the target positioning reference signal is obtained by the first sequence sequentially through Sequence Generation, Discrete Fourier Transform (DFT), Modulation and Resource Element Mapping, and Wideband Symbol Generation.

In one embodiment, the target positioning reference signal is obtained by the first sequence sequentially through Sequence Generation, Resource Element Mapping and Wideband Symbol Generation.

In one embodiment, the first sequence is mapped to a positive integer number of RE(s).

In one embodiment, the target positioning reference signal comprises an SL PRS.

In one embodiment, the target positioning reference signal comprises a DL PRS.

In one embodiment, the target positioning reference signal comprises a UL PRS.

In one embodiment, the target positioning reference signal comprises an SL CSI-RS.

In one embodiment, the target positioning reference signal comprises a PSCCH DMRS.

In one embodiment, the target positioning reference signal comprises a PSSCH DMRS.

In one embodiment, the target positioning reference signal comprises a UL SRS.

In one embodiment, the target positioning reference signal comprises an S-SS/PSBCH Block.

In one embodiment, the target positioning reference signal is Unicast.

In one embodiment, the target positioning reference signal is Groupcast.

In one embodiment, the target positioning reference signal is Broadcast.

In one embodiment, the parameters of the target positioning reference signal comprise at least one of a period of the target positioning reference signal, a number of time-domain resources occupied by the target positioning reference signal, a number of frequency-domain resources occupied by the target positioning reference signal, or a priority of the target positioning reference signal.

In one embodiment, the parameters of the target positioning reference signal comprise the priority of the target positioning reference signal.

In one embodiment, the parameters of the target positioning reference signal comprise a Transmitting (Tx) power of the target positioning reference signal.

In one embodiment, the parameters of the target positioning reference signal comprise a target receiver of the target positioning reference signal.

In one embodiment, the parameters of the target positioning reference signal comprise an identifier of a target receiver of the target positioning reference signal.

In one embodiment, the parameters of the target positioning reference signal comprise a transmitter of the target positioning reference signal.

In one embodiment, the parameters of the target positioning reference signal comprise an identifier of a transmitter of the target positioning reference signal.

In one embodiment, the parameters of the target positioning reference signal comprise a Destination Identity (Destination ID).

In one embodiment, the parameters of the target positioning reference signal comprise a Source Identity (Source ID).

In one embodiment, the parameters of the target positioning reference signal comprise one of the target positioning reference signal being broadcast, the target positioning reference signal being groupcast or the target positioning reference signal being unicast.

In one embodiment, the parameters of the target positioning reference signal comprise density of a time-frequency resource occupied by the target positioning reference signal.

In one embodiment, the parameters of the target positioning reference signal comprise the number of the multiple resource units comprised by the target time-frequency resource set.

In one embodiment, the parameters of the target positioning reference signal comprise a number of time-domain resources occupied by the target time-frequency resource set.

In one embodiment, the parameters of the target positioning reference signal comprise a number of frequency-domain resources occupied by the target time-frequency resource set.

In one embodiment, the parameters of the target positioning reference signal comprise a total number of subcarriers occupied by the multiple resource units comprised by the target time-frequency resource set in frequency domain.

In one embodiment, the parameters of the target positioning reference signal comprise a total number of PRBs occupied by the multiple resource units comprised by the target time-frequency resource set in frequency domain.

In one embodiment, the parameters of the target positioning reference signal comprise a total number of subchannels occupied by the multiple resource units comprised by the target time-frequency resource set in frequency domain.

In one embodiment, the parameters of the target positioning reference signal comprise a total number of multicarrier symbols occupied by the multiple resource units comprised by the target time-frequency resource set in time domain.

In one embodiment, the parameters of the target positioning reference signal comprise a total number of slots occupied by the multiple resource units comprised by the target time-frequency resource set in time domain.

In one embodiment, parameters of the target positioning reference signal and the occupancy of the first time-frequency resource set are jointly used to determine the target threshold.

In one embodiment, a first threshold list comprises multiple thresholds, and the target threshold is one of the multiple thresholds comprised by the first threshold list.

In one embodiment, parameters of the target positioning reference signal and the occupancy of the first time-frequency resource set are jointly used to determine an index of the target threshold in the first threshold list.

In one embodiment, an index of the target threshold in the first threshold list is equal to C times the priority of the target positioning reference signal added by the priority of a signal occupying the first time-frequency resource set and then by 1, C being a positive integer.

In one embodiment, the type of a signal occupying the first time-frequency resource set is used to determine a priority of the signal occupying the first time-frequency resource set.

In one embodiment, an index of the target threshold in the first threshold list is equal to C times the priority of a signal occupying the first time-frequency resource set added by the priority of the target positioning reference signal and then by 1, C being a positive integer.

In one embodiment, C is equal to 8.

In one embodiment, C is equal to 10.

In one embodiment, the first threshold list is configured by a higher layer signaling.

In one embodiment, the first threshold list comprises 67 thresholds.

In one embodiment, a first threshold in the first threshold list is minus infinity dBm.

In one embodiment, a last threshold in the first threshold list is infinity dBm.

In one embodiment, the first threshold list comprises [−128 dBm, −126 dBm . . . , 0 dBm].

In one embodiment, the first threshold list comprises [−infinity dBm, −128 dBm, −126 dBm, . . . , 0 dBm, infinity dBm].

In one embodiment, there is a difference of 2 dB between any two adjacent thresholds in the first thresholds list other than the first threshold and the last threshold.

In one embodiment, any of the multiple thresholds comprised by the first threshold list is measured in dBm.

In one embodiment, any of the multiple thresholds comprised by the first threshold list is measured in dB.

In one embodiment, any of the multiple thresholds comprised by the first threshold list is measured in W.

In one embodiment, any of the multiple thresholds comprised by the first threshold list is measured in mW.

In one embodiment, the target threshold is a threshold in [−infinity dBm, −128 dBm, −126 dBm . . . , 0 dBm, infinity dBm].

In one embodiment, the target threshold is equal to (−128+(n−1)*2) dBm, where n is an index of the target threshold in the first threshold list, n being a positive integer between 1 and 65.

In one embodiment, the target threshold is measured in dBm.

In one embodiment, the target threshold is measured in dB.

In one embodiment, the target threshold is measured in W.

In one embodiment, the target threshold is measured in mW.

In one embodiment, the multicarrier symbol is an SC-FDMA symbol.

In one embodiment, the multicarrier symbol is a DFT-S-OFDM symbol.

In one embodiment, the multicarrier symbol is a FDMA symbol.

In one embodiment, the multicarrier symbol is a FBMC symbol.

In one embodiment, the multicarrier symbol is an IFDMA symbol.

Embodiment 2

Figure 2:
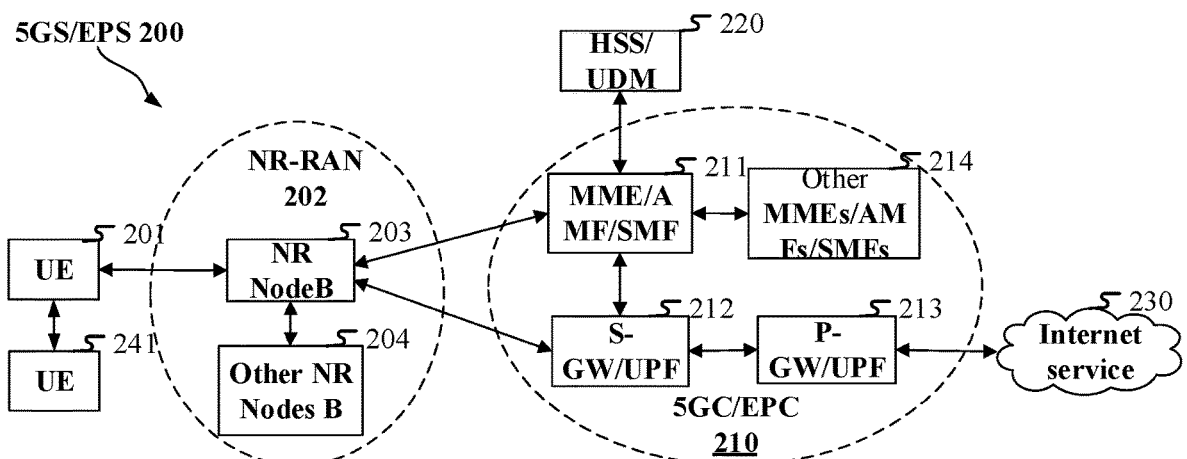
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200. The 5GS/EPS 200 may comprise one or more UEs 201, a UE241 in sidelink communication with UE(s) 201, an NG-RAN 202, a 5G-CoreNetwork/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services. The NG-RAN 202 comprises a New Radio (NR) node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, Global Positioning System (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobile, vehicle or some other appropriate terms. The gNB 203 is connected with the 5GC/EPC 210 via an S1/NG interface. The 5GC/EPC 210 comprises a Mobility Management Entity (MME)/Authentication Management Field (AMF)/Session Management Function (SMF) 211, other MMEs//AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212; the S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching Streaming Services.

In one embodiment, the first node in the present disclosure comprises the UE 201.

In one embodiment, the second node in the present disclosure comprises the UE 241.

In one embodiment, the UE in the present disclosure comprises the UE 201.

In one embodiment, the UE in the present disclosure comprises the UE 241.

In one embodiment, the base station in the present disclosure comprises the gNB203.

In one embodiment, the receiver of the second configuration information in the present disclosure comprises the UE 201.

In one embodiment, the receiver of the second configuration information in the present disclosure comprises the UE 241.

In one embodiment, the transmitter of the second configuration information in the present disclosure comprises the gNB203.

In one embodiment, the receiver of the first configuration information in the present disclosure comprises the UE 201.

In one embodiment, the transmitter of the first configuration information in the present disclosure comprises the UE 241.

In one embodiment, the receiver of the first signal in the present disclosure comprises the UE 201.

In one embodiment, the transmitter of the first signal in the present disclosure comprises the UE 241.

In one embodiment, the transmitter of the first positioning reference signal in the present disclosure comprises the UE 201.

In one embodiment, the receiver of the first positioning reference signal in the present disclosure comprises the UE 241.

In one embodiment, the transmitter of the second positioning reference signal in the present disclosure comprises the UE 201.

In one embodiment, the receiver of the second positioning reference signal in the present disclosure comprises the UE 241.

In one embodiment, the transmitter of the first information set in the present disclosure comprises the UE 201.

In one embodiment, the receiver of the first information set in the present disclosure comprises the UE 241.

In one embodiment, the third node in the present disclosure comprises the UE 241.

In one embodiment, the receiver of the first signaling in the present disclosure comprises the UE 201.

In one embodiment, the transmitter of the first signaling in the present disclosure comprises the UE 241.

In one embodiment, the receiver of the first signal in the present disclosure comprises the UE 201.

In one embodiment, the transmitter of the first signal in the present disclosure comprises the UE 241.

In one embodiment, the transmitter of the target positioning reference signal in the present disclosure comprises the UE 201.

In one embodiment, the receiver of the target positioning reference signal in the present disclosure comprises the UE 241.

In one embodiment, the transmitter of the target signaling in the present disclosure comprises the UE 201.

In one embodiment, the receiver of the target signaling in the present disclosure comprises the UE 241.

Embodiment 3

Figure 3:
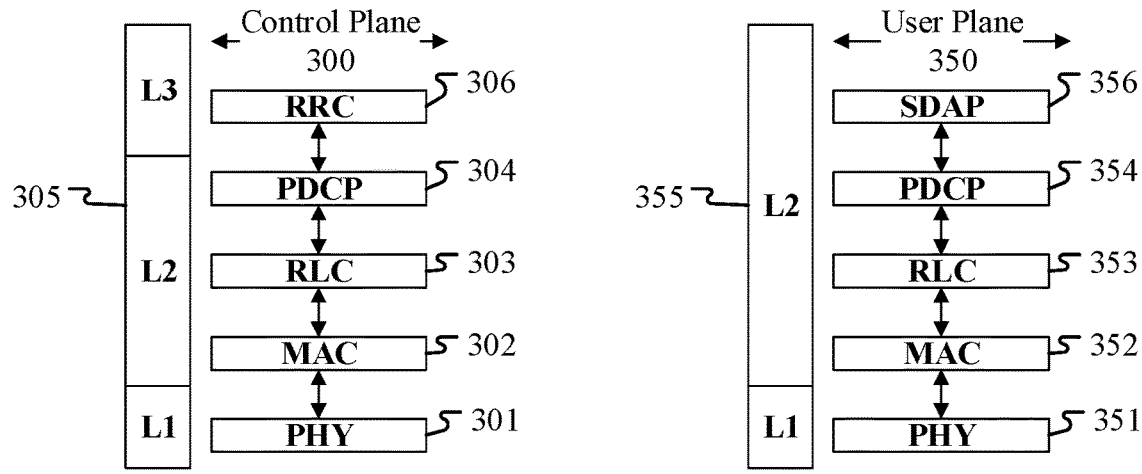
FIG. 3 illustrates a schematic diagram of a radio protocol architecture of a user plane and a control plane according to one embodiment of the present disclosure.

Embodiment 3 illustrates a schematic diagram of one embodiment of a radio protocol architecture of a user plane and a control plane according to the present disclosure, as shown in FIG. 3. FIG. 3 is a schematic diagram illustrating an example of a radio protocol architecture of a user plane 350 and a control plane 300. In FIG. 3, the radio protocol architecture for a control plane 300 between a first node (UE or RSU in V2X, or vehicle-mounted equipment or vehicle-mounted communication modules) and a second node (gNB, UE, or RSU in V2X, or vehicle-mounted equipment or vehicle-mounted communication modules), or between two UEs is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first node and the second node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes of the network side. The PDCP sublayer 304 provides data encryption and integrity protection, and also provides support for handover of a second node between first nodes. The RLC sublayer 303 provides segmentation and reassembling of a packet, retransmission of a lost packet through ARQ, and detection of duplicate packets and protocol errors. The MAC sublayer 302 provides mapping between a logical channel and a transport channel as well as multiplexing between logical channels. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS flows and a Data Radio Bearer (DRB), so as to support diversified traffics. Although not described in FIG. 3, the first node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the second configuration information in the present disclosure is generated by the RRC sublayer 306.

In one embodiment, the second configuration information in the present disclosure is transmitted from the MAC sublayer 302 to the PHY 301.

In one embodiment, the first configuration information in the present disclosure is generated by the RRC sublayer 306.

In one embodiment, the first configuration information in the present disclosure is transmitted from the MAC sublayer 302 to the PHY 301.

In one embodiment, the first signal in the present disclosure is generated by the PHY 301.

In one embodiment, the first signal in the present disclosure is generated by the MAC sublayer 302.

In one embodiment, the first positioning reference signal in the present disclosure is generated by the PHY 301.

In one embodiment, the second positioning reference signal in the present disclosure is generated by the PHY 301.

In one embodiment, the first information set in the present disclosure is generated by the RRC sublayer 306.

In one embodiment, the first information set in the present disclosure is transmitted from the MAC sublayer 302 to the PHY 301.

In one embodiment, the first information set in the present disclosure is generated by the MAC sublayer 302.

In one embodiment, the first information set in the present disclosure is generated by the PHY 301.

In one embodiment, the radio protocol architecture in FIG. 3 is applicable to the third node in the present disclosure.

In one embodiment, the first signaling in the present disclosure is generated by the RRC sublayer 306.

In one embodiment, the first signaling in the present disclosure is transmitted from the MAC sublayer 302 to the PHY 301.

In one embodiment, the first signaling in the present disclosure is generated by the MAC sublayer 302.

In one embodiment, the first signaling in the present disclosure is generated by the PHY 301.

In one embodiment, the target positioning reference signal in the present disclosure is generated by the PHY 301.

In one embodiment, the target signaling in the present disclosure is generated by the RRC sublayer 306.

In one embodiment, the target signaling in the present disclosure is transmitted from the MAC sublayer 302 to the PHY 301.

In one embodiment, the target signaling in the present disclosure is generated by the MAC sublayer 302.

In one embodiment, the target signaling in the present disclosure is generated by the PHY 301.

Embodiment 4

Figure 4:
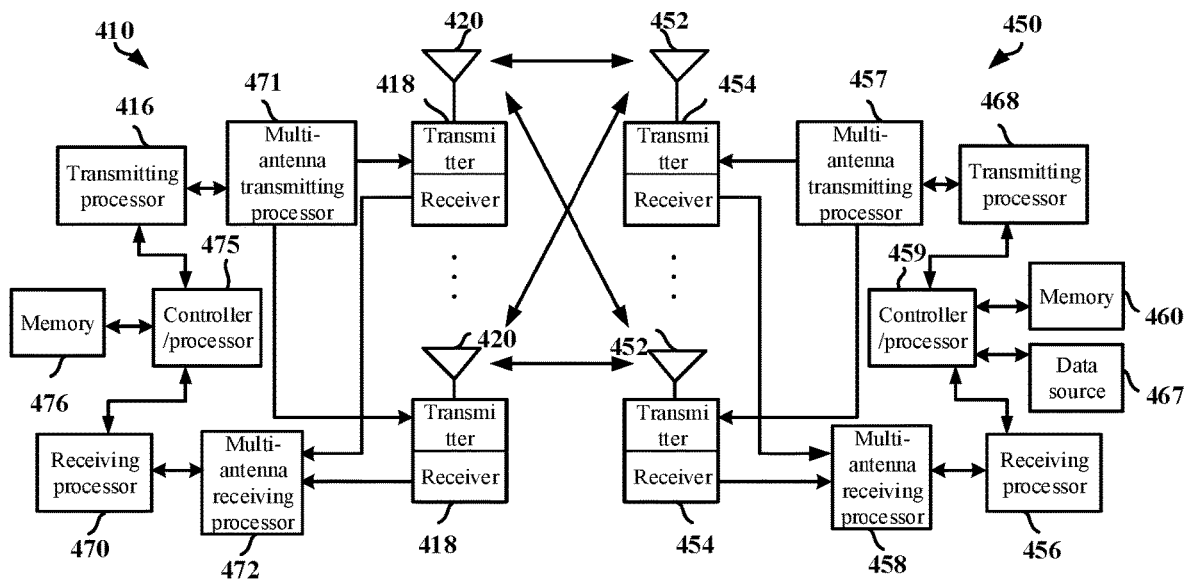
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. The controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In a transmission between the first communication device 410 and the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device (UE) 450. The higher-layer packet coming from the controller/processor 475 may be provided to the core network.

In one embodiment, the first node in the present disclosure includes the second communication device 450, and the second node in the present disclosure includes the first communication device 410.

In one subembodiment, the first node is a UE, and the second node is a UE.

In one subembodiment, the first node is a UE, and the second node is a relay node.

In one subembodiment, the first node is a relay node, and the second node is a base station.

In one embodiment, the first node in the present disclosure includes the second communication device 450, and the third node in the present disclosure includes the first communication device 410.

In one embodiment, the first node in the present disclosure includes the second communication device 450, the second node in the present disclosure includes the first communication device 410, and the third node in the present disclosure includes the first communication device 410.

In one subembodiment, the first node is a UE, and the second node is a UE.

In one subembodiment, the first node is a UE, and the third node is a UE.

In one subembodiment, the first node is a UE, the second node is a UE, and the third node is a UE.

In one subembodiment, the first node is a UE, and the second node is a relay node.

In one subembodiment, the first node is a UE, and the third node is a relay node.

In one subembodiment, the first node is a UE, the second node is a relay node, and the third node is a relay node.

In one subembodiment, the first node is a UE, the second node is a relay node, and the third node is a UE.

In one subembodiment, the first node is a relay node, and the second node is a base station.

In one subembodiment, the first node is a relay node, and the third node is a base station.

In one subembodiment, the first node is a relay node, the second node is a base station, and the third node is a base station.

In one subembodiment, the first node is a relay node, the second node is a base station, and the third node is a UE.

In one subembodiment, the second communication device 450 comprises at least one controller/processor, and the at least one controller/processor is in charge of HARQ operations.

In one subembodiment, the first communication device 410 comprises at least one controller/processor, and the at least one controller/processor is in charge of HARQ operations.

In one subembodiment, the first communication device 410 comprises at least one controller/processor, and the at least one controller/processor is in charge of using ACK/NACK protocols for error detection as a way to support HARQ operations.

In one embodiment, the second communication device 450 comprises at least one processor and at least one memory, the at least one memory comprises computer program codes; the at least one memory and the computer program codes are configured to be used in collaboration with the at least one processor, the second communication device 450 at least receives first configuration information; and transmits a first positioning reference signal on a first time-frequency resource block, transmits a second positioning reference signal on a second time-frequency resource block, and transmits a first information set; the first configuration information is used to indicate a first resource set, the first resource set comprises more than one time-frequency resource block, and any two time-frequency resource blocks comprised by the first resource set adopt same positioning-related parameters; the first time-frequency resource block and the second time-frequency resource block are two time-frequency resource blocks in the first resource set, and the first time-frequency resource block is earlier than the second time-frequency resource block in time domain; the first information set comprises a first distance, and the first distance is a distance from a first geographical position to a second geographical position, of which the first geographical position is where the first node is located when transmitting the first positioning reference signal, and the second geographical position is where the first node is located when transmitting the second positioning reference signal.

In one embodiment, the second communication device 450 comprises a memory that stores computer readable instruction program, the computer readable instruction program generates actions when executed by at least one processor, which include: receiving first configuration information; and transmitting a first positioning reference signal on a first time-frequency resource block, transmitting a second positioning reference signal on a second time-frequency resource block, and transmitting a first information set; the first configuration information is used to indicate a first resource set, the first resource set comprises more than one time-frequency resource block, and any two time-frequency resource blocks comprised by the first resource set adopt same positioning-related parameters; the first time-frequency resource block and the second time-frequency resource block are two time-frequency resource blocks in the first resource set, and the first time-frequency resource block is earlier than the second time-frequency resource block in time domain; the first information set comprises a first distance, and the first distance is a distance from a first geographical position to a second geographical position, of which the first geographical position is where the first node is located when transmitting the first positioning reference signal, and the second geographical position is where the first node is located when transmitting the second positioning reference signal.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits first configuration information; receives a first positioning reference signal on a first time-frequency resource block, receives a second positioning reference signal on a second time-frequency resource block, and receives a first information set; the first configuration information is used to indicate a first resource set, the first resource set comprises more than one time-frequency resource block, and any two time-frequency resource blocks comprised by the first resource set adopt same positioning-related parameters; the first time-frequency resource block and the second time-frequency resource block are respectively two time-frequency resource blocks in the first resource set, and the first time-frequency resource block is earlier than the second time-frequency resource block in time domain; the first information set comprises a first distance, and the first distance is a distance from a first geographical position to a second geographical position, of which the first geographical position is where a transmitter of the first positioning reference signal is located when transmitting the first positioning reference signal, and the second geographical position is where a transmitter of the second positioning reference signal is located when transmitting the second positioning reference signal, the transmitter of the first positioning reference signal and the transmitter of the second positioning reference signal being one and the same.

In one embodiment, the first communication device 410 comprises a memory that stores computer readable instruction program, the computer readable instruction program generates actions when executed by at least one processor, which include: transmitting first configuration information; receiving a first positioning reference signal on a first time-frequency resource block, receiving a second positioning reference signal on a second time-frequency resource block, and receiving a first information set; the first configuration information is used to indicate a first resource set, the first resource set comprises more than one time-frequency resource block, and any two time-frequency resource blocks comprised by the first resource set adopt same positioning-related parameters; the first time-frequency resource block and the second time-frequency resource block are respectively two time-frequency resource blocks in the first resource set, and the first time-frequency resource block is earlier than the second time-frequency resource block in time domain; the first information set comprises a first distance, and the first distance is a distance from a first geographical position to a second geographical position, of which the first geographical position is where a transmitter of the first positioning reference signal is located when transmitting the first positioning reference signal, and the second geographical position is where a transmitter of the second positioning reference signal is located when transmitting the second positioning reference signal, the transmitter of the first positioning reference signal and the transmitter of the second positioning reference signal being one and the same.

In one embodiment, at least one of the antenna 452, the receiver 454, the multi-antenna receiving processor 458, the receiving processor 456, the controller/processor 459, the memory 460 or the data source 467 is used for receiving the second configuration information in the present disclosure.

In one embodiment, at least one of the antenna 452, the receiver 454, the multi-antenna receiving processor 458, the receiving processor 456, the controller/processor 459, the memory 460 or the data source 467 is used for receiving the first configuration information in the present disclosure.

In one embodiment, at least one of the antenna 452, the receiver 454, the multi-antenna receiving processor 458, the receiving processor 456, the controller/processor 459, the memory 460 or the data source 467 is used for receiving the first signal in the present disclosure.

In one embodiment, at least one of the antenna 452, the transmitter 454, the multi-antenna transmitting processor 458, the transmitting processor 468, the controller/processor 459, the memory 460 or the data source 467 is used for transmitting the first positioning reference signal on the first time-frequency resource block in the present disclosure.

In one embodiment, at least one of the antenna 452, the transmitter 454, the multi-antenna transmitting processor 458, the transmitting processor 468, the controller/processor 459, the memory 460 or the data source 467 is used for transmitting the second positioning reference signal on the second time-frequency resource block in the present disclosure.

In one embodiment, at least one of the antenna 452, the transmitter 454, the multi-antenna transmitting processor 458, the transmitting processor 468, the controller/processor 459, the memory 460 or the data source 467 is used for transmitting the first information set on the first time-frequency resource block in the present disclosure.

In one embodiment, at least one of the antenna 420, the receiver 418, the multi-antenna receiving processor 472, the receiving processor 470, the controller/processor 475 or the memory 476 is used for receiving the second configuration information in the present disclosure.

In one embodiment, at least one of the antenna 420, the transmitter 418, the multi-antenna transmitting processor 471, the transmitting processor 416, the controller/processor 475 or the memory 476 is used for transmitting the first configuration information in the present disclosure.

In one embodiment, at least one of the antenna 420, the transmitter 418, the multi-antenna transmitting processor 471, the transmitting processor 416, the controller/processor 475 or the memory 476 is used for transmitting the first signal in the present disclosure.

In one embodiment, at least one of the antenna 420, the receiver 418, the multi-antenna receiving processor 472, the receiving processor 470, the controller/processor 475 or the memory 476 is used for receiving the first positioning reference signal on the first time-frequency resource block in the present disclosure.

In one embodiment, at least one of the antenna 420, the receiver 418, the multi-antenna receiving processor 472, the receiving processor 470, the controller/processor 475 or the memory 476 is used for receiving the second positioning reference signal on the second time-frequency resource block in the present disclosure.

In one embodiment, at least one of the antenna 420, the receiver 418, the multi-antenna receiving processor 472, the receiving processor 470, the controller/processor 475 or the memory 476 is used for receiving the first information set in the present disclosure.

In one embodiment, the second communication device 450 comprises at least one processor and at least one memory, the at least one memory comprises computer program codes; the at least one memory and the computer program codes are configured to be used in collaboration with the at least one processor, the second communication device 450 at least receives a first signaling; and transmits a target positioning reference signal on a target time-frequency resource set, the target time-frequency resource set comprising multiple resource units; the first signaling is used to indicate occupancy of a first time-frequency resource set, the first time-frequency resource set comprising multiple resource units; parameters of the target positioning reference signal and the occupancy of the first time-frequency resource set are jointly used to determine a target threshold; the occupancy of the first time-frequency resource set comprises at least one of whether the first time-frequency resource set is occupied or a type of a signal occupying the first time-frequency resource set; the target time-frequency resource set belongs to a first candidate resource pool, and the first time-frequency resource set is associated with a second time-frequency resource set, the second time-frequency resource set comprising multiple resource units; the target threshold is used to determine whether the second time-frequency resource set belongs to the first candidate resource pool.

In one embodiment, the second communication device 450 comprises a memory that stores computer readable instruction program, the computer readable instruction program generates actions when executed by at least one processor, which include: receiving a first signaling; and transmitting a target positioning reference signal on a target time-frequency resource set, the target time-frequency resource set comprising multiple resource units; the first signaling is used to indicate occupancy of a first time-frequency resource set, the first time-frequency resource set comprising multiple resource units; parameters of the target positioning reference signal and the occupancy of the first time-frequency resource set are jointly used to determine a target threshold; the occupancy of the first time-frequency resource set comprises at least one of whether the first time-frequency resource set is occupied or a type of a signal occupying the first time-frequency resource set; the target time-frequency resource set belongs to a first candidate resource pool, and the first time-frequency resource set is associated with a second time-frequency resource set, the second time-frequency resource set comprising multiple resource units; the target threshold is used to determine whether the second time-frequency resource set belongs to the first candidate resource pool.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits a first signaling; the first signaling is used to indicate occupancy of a first time-frequency resource set, the first time-frequency resource set comprising multiple resource units; the occupancy of the first time-frequency resource set is used by a receiver of the first signaling to determine a target threshold; the occupancy of the first time-frequency resource set comprises at least one of whether the first time-frequency resource set is occupied or a type of a signal occupying the first time-frequency resource set; the first time-frequency resource set is associated with a second time-frequency resource set, the second time-frequency resource set comprising multiple resource units; the target threshold is used by a receiver of the first signaling to determine whether the second time-frequency resource set belongs to the first candidate resource pool.

In one embodiment, the first communication device 410 comprises a memory that stores computer readable instruction program, the computer readable instruction program generates an action when executed by at least one processor, which includes: transmitting a first signaling; the first signaling is used to indicate occupancy of a first time-frequency resource set, the first time-frequency resource set comprising multiple resource units; the occupancy of the first time-frequency resource set is used by a receiver of the first signaling to determine a target threshold; the occupancy of the first time-frequency resource set comprises at least one of whether the first time-frequency resource set is occupied or a type of a signal occupying the first time-frequency resource set; the first time-frequency resource set is associated with a second time-frequency resource set, the second time-frequency resource set comprising multiple resource units; the target threshold is used by a receiver of the first signaling to determine whether the second time-frequency resource set belongs to the first candidate resource pool.

In one embodiment, the first communication device 410 comprises at least one processor and at least one memory, the at least one memory comprises computer program codes; the at least one memory and the computer program codes are configured to be used in collaboration with the at least one processor. The first communication device 410 at least receives a target signaling; and receives a target positioning reference signal in a target time-frequency resource set, the target time-frequency resource set comprising multiple resource units; the target signaling is used to indicate occupancy of a target time-frequency resource set; the occupancy of the target time-frequency resource set comprises that a signal occupying the target time-frequency resource set is the target positioning reference signal; the target time-frequency resource set belongs to a first candidate resource pool; the target positioning reference signal is used to determine a position of the third node.

In one embodiment, the first communication device 410 comprises a memory that stores computer readable instruction program, the computer readable instruction program generates actions when executed by at least one processor, which include: receiving a target signaling; and receiving a target positioning reference signal in a target time-frequency resource set, the target time-frequency resource set comprising multiple resource units; the target signaling is used to indicate occupancy of a target time-frequency resource set; the occupancy of the target time-frequency resource set comprises that a signal occupying the target time-frequency resource set is the target positioning reference signal; the target time-frequency resource set belongs to a first candidate resource pool; the target positioning reference signal is used to determine a position of the third node.

In one embodiment, at least one of the antenna 452, the receiver 454, the multi-antenna receiving processor 458, the receiving processor 456, the controller/processor 459, the memory 460 or the data source 467 is used for receiving the first signaling in the present disclosure.

In one embodiment, at least one of the antenna 452, the receiver 454, the multi-antenna receiving processor 458, the receiving processor 456, the controller/processor 459, the memory 460 or the data source 467 is used for monitoring the first time-frequency resource set in the first sensing window in the present disclosure.

In one embodiment, at least one of the antenna 452, the receiver 454, the multi-antenna receiving processor 458, the receiving processor 456, the controller/processor 459, the memory 460 or the data source 467 is used for determining whether the second time-frequency resource set belongs to the first candidate resource pool in the present disclosure.

In one embodiment, at least one of the antenna 452, the transmitter 454, the multi-antenna transmitting processor 458, the transmitting processor 468, the controller/processor 459, the memory 460 or the data source 467 is used for transmitting the target signaling in the present disclosure.

In one embodiment, at least one of the antenna 452, the transmitter 454, the multi-antenna transmitting processor 458, the transmitting processor 468, the controller/processor 459, the memory 460 or the data source 467 is used for transmitting the target positioning reference signal on the target time-frequency resource block in the present disclosure.

In one embodiment, at least one of the antenna 420, the transmitter 418, the multi-antenna transmitting processor 471, the transmitting processor 416, the controller/processor 475 or the memory 476 is used for transmitting the first signaling in the present disclosure.

In one embodiment, at least one of the antenna 420, the transmitter 418, the multi-antenna transmitting processor 471, the transmitting processor 416, the controller/processor 475 or the memory 476 is used for transmitting the first signal in the first time-frequency resource set in the present disclosure.

In one embodiment, at least one of the antenna 420, the receiver 418, the multi-antenna receiving processor 472, the receiving processor 470, the controller/processor 475 or the memory 476 is used for receiving the target signaling in the present disclosure.

In one embodiment, at least one of the antenna 420, the receiver 418, the multi-antenna receiving processor 472, the receiving processor 470, the controller/processor 475 or the memory 476 is used for receiving the target positioning reference signal on the target time-frequency resource block in the present disclosure.

Embodiment 5A

Figure 5A:
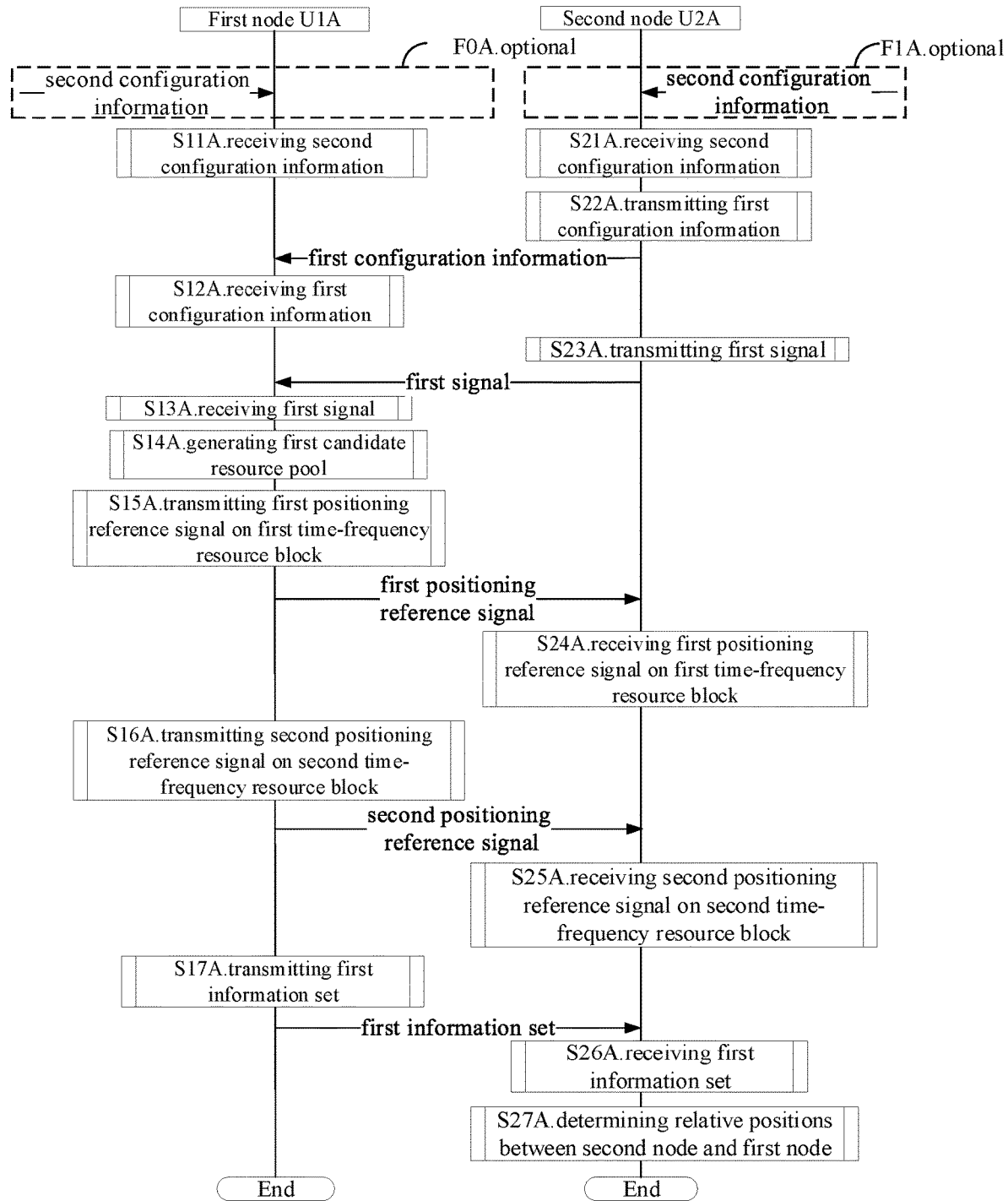
FIG. 5A illustrates a flowchart of a radio signal transmission according to one embodiment of the present disclosure.

Embodiment 5A illustrates a flowchart of a radio signal transmission according to one embodiment of the present disclosure, as shown in FIG. 5A. In FIG. 5A, a first node U1A and a second node U2A are in communication via an air interface. Steps marked by the box F0A and the box F1A are optional, respectively.

The first node U1A receives second configuration information in step S11A; and receives first configuration information in step S12A; receives a first signal in step S13A; and generates a first candidate resource pool in step S14A; transmits a first positioning reference signal on a first time-frequency resource block in step S15A; transmits a second positioning reference signal on a second time-frequency resource block in step S16A; and transmits a first information set in step S17A.

The second node U2A receives second configuration information in step S21A; and transmits first configuration information in step S22A; transmits a first signal in step S23A; and receives a first positioning reference signal on a first time-frequency resource block in step S24A; receives a second positioning reference signal on a second time-frequency resource block in step S25A; and receives a first information set in step S26A; and determines relative positions of the second node U2A and the first node U1A in step S27A.

In Embodiment 5A, the second configuration information is used to indicate a first resource pool list, the first resource pool list comprising at least one resource pool; the first configuration information is used to indicate a first resource set, the first resource set comprises more than one time-frequency resource block, and any two time-frequency resource blocks comprised by the first resource set adopt same positioning-related parameters; the first resource set comprises at least one resource pool, and any time-frequency resource block in the first resource set belongs to one resource pool of the at least one resource pool comprised by the first resource set; the at least one resource pool comprised by the first resource set belongs to the first resource pool list; the first signal is used to trigger transmission of the first positioning reference signal and transmission of the second positioning reference signal; the first candidate resource pool is generated by sensing at least one positioning reference signal in the at least one resource pool comprised by the first resource set, and the first candidate resource pool comprises a positive integer number of time-frequency resource blocks, the first time-frequency resource block and the second time-frequency resource block belonging to the first candidate resource pool; the first time-frequency resource block and the second time-frequency resource block are two time-frequency resource blocks in the first resource set, and the first time-frequency resource block is earlier than the second time-frequency resource block in time domain; the first information set comprises a first distance, and the first distance is a distance from a first geographical position to a second geographical position, of which the first geographical position is where the first node is located when transmitting the first positioning reference signal, and the second geographical position is where the first node is located when transmitting the second positioning reference signal; the first information set also comprises a first angle, the first angle including an angle formed between a line from the first geographical position to the second geographical position and a reference direction; a measurement on the first positioning reference signal, a measurement on the second positioning reference signal and the first information set are jointly used to determine relative positions of the second node U2A and the first node U1A.

In one embodiment, the first node U1A and the second node U2A are in communication via a PC5 interface.

In one embodiment, the step marked by the box F0A in FIG. 5A exists.

In one embodiment, the step marked by the box F0A in FIG. 5A does not exist.

In one embodiment, the step marked by the box F1A in FIG. 5A exists.

In one embodiment, the step marked by the box F1A in FIG. 5A does not exist.

In one embodiment, when the second configuration information is transmitted from a higher layer of the first node U1A to a physical layer of the first node U1A, the step marked by the box F0A in FIG. 5A does not exist.

In one embodiment, when the second configuration information is transmitted from a MAC sublayer of the first node U1A to a PHY layer of the first node U1A, the step marked by the box F0A in FIG. 5A does not exist.

In one embodiment, when the second configuration information is transmitted from a higher layer of the second node U2A to a physical layer of the second node U2A, the step marked by the box F1A in FIG. 5A does not exist.

In one embodiment, when the second configuration information is transmitted from a MAC sublayer of the second node U2A to a PHY layer of the second node U2A, the step marked by the box F1A in FIG. 5A does not exist.

In one embodiment, the phrase of "receiving second configuration information" comprises receiving the second configuration information transmitted through a Uu interface.

In one embodiment, the phrase of "receiving second configuration information" comprises receiving the second configuration information transmitted through a PC5 interface.

In one embodiment, a transmitter of the second configuration information includes the base station.

In one embodiment, a transmitter of the second configuration information includes a UE.

In one embodiment, a transmitter of the second configuration information includes a higher layer of the first node U1A.

In one embodiment, a transmitter of the second configuration information includes a higher layer of the second node U2A.

In one embodiment, the first signal is a baseband signal.

In one embodiment, the first signal is a radio frequency signal.

In one embodiment, the first signal is a radio signal.

In one embodiment, the first signal is transmitted on a SL-SCH.

In one embodiment, the first signal is transmitted on a PSCCH.

In one embodiment, the first signal is transmitted on a PSSCH.

In one embodiment, the first signal is transmitted on a PUSCH.

In one embodiment, the first signal comprises all or part of a higher layer signaling.

In one embodiment, the first signal comprises all or part of a MAC layer signal.

In one embodiment, the first signal comprises a MAC CE.

In one embodiment, the first signal comprises one or more fields in a MAC CE.

In one embodiment, the first signal comprises all or part of an RRC layer signal.

In one embodiment, the first signal comprises one or more fields in an RRC IE.

In one embodiment, the first signal comprises one or more fields in a PHY layer signaling.

In one embodiment, the first signal comprises a piece of SCI.

In one embodiment, the first signal is a piece of SCI.

In one embodiment, the first signal is used for triggering transmission of the first positioning reference signal and transmission of the second positioning reference signal.

In one embodiment, the first node U1A receives the first signal, transmits the first positioning reference signal on the first time-frequency resource block, and transmits the second positioning reference signal on the second time-frequency resource block.

In one embodiment, when receiving the first signal, the first node U1A transmits the first positioning reference signal on the first time-frequency resource block, and transmits the second positioning reference signal on the second time-frequency resource block; when not receiving the first signal, the first node U1A drops transmitting the first positioning reference signal on the first time-frequency resource bock, and drops transmitting the second positioning reference signal on the second time-frequency resource block.

In one embodiment, the second node U2A transmits the first signal, monitors the first positioning reference signal, and monitors the second positioning reference signal.

In one embodiment, the second node U2A transmits the first signal, monitors the first positioning reference signal on the first time-frequency resource block, and monitors the second positioning reference signal on the second time-frequency resource block.

In one embodiment, the second node U2A transmits the first signal, receives the first positioning reference signal on the first time-frequency resource block, and receives the second positioning reference signal on the second time-frequency resource block.

In one embodiment, when transmitting the first signal, the second node U2A monitors the first positioning reference signal, and monitors the second positioning reference signal; when not transmitting the first signal, the second node U2A drops monitoring the first positioning reference signal, and drops monitoring the second positioning reference signal.

In one embodiment, the first signal comprises a second bit block, the second bit block comprising a positive integer number of bit(s).

In one embodiment, a second bit block is used for generating the first signal, the second bit block comprising a positive integer number of bit(s).

In one embodiment, the second bit block comprises a positive integer number of bit(s), and all or part of bits in the positive integer number of bit(s) comprised by the second bit block are used for generating the first signal.

In one embodiment, the second bit block comprises one Codeword (CW).

In one embodiment, the second bit block comprises one Code Block (CB).

In one embodiment, the second bit block comprises one Code Block Group (CBG).

In one embodiment, the second bit block comprises one Transport Block (TB).

In one embodiment, the first signal is obtained by all or part of bits in the second bit block sequentially through TB-level Cyclic Redundancy Check (CRC) Attachment, Code Block Segmentation, CB-level CRC Attachment, Channel Coding, and Rate Matching, Code Block Concatenation, scrambling, Modulation, Layer Mapping, Antenna Port Mapping and Mapping to Physical Resource Blocks, Baseband Signal Generation, and Modulation and Upconversion.

In one embodiment, the first signal is an output by the second bit block sequentially through a Modulation Mapper, a Layer Mapper, Precoding, a Resource Element Mapper and Multicarrier Symbol Generation.

In one embodiment, the Channel Coding is based on a polar code.

In one embodiment, the Channel Coding is based on a Low-density Parity-Check (LDPC) code.

In one embodiment, the first signal comprises a third sequence.

In one embodiment, the third sequence is used for generating the first signal.

In one embodiment, the third sequence is a pseudo-random sequence.

In one embodiment, the third sequence is a low-PAPR sequence.

In one embodiment, the third sequence is a Gold sequence.

In one embodiment, the third sequence is an M sequence.

In one embodiment, the third sequence is a ZC sequence.

In one embodiment, the first signal is obtained by the third sequence through Sequence Generation, Discrete Fourier Transform (DFT), Modulation and Resource Element Mapping, and Wideband Symbol Generation.

In one embodiment, monitoring the first positioning reference signal on the first time-frequency resource block refers to receiving based on blind detection, namely, the second node U2A receives a signal on the first time-frequency resource block and performs decoding, when the decoding is determined to be correct according to a CRC bit, it is determined that the first positioning reference signal is successfully received on the first time-frequency resource block; otherwise, it is determined that the first positioning reference signal isn't successfully detected on the first time-frequency resource block.

In one embodiment, monitoring the second positioning reference signal on the second time-frequency resource block refers to receiving based on blind detection, namely, the second node U2A receives a signal on the second time-frequency resource block and performs decoding, when the decoding is determined to be correct according to a CRC bit, it is determined that the second positioning reference signal is successfully received on the second time-frequency resource block; otherwise, it is determined that the second positioning reference signal isn't successfully detected on the second time-frequency resource block.

In one embodiment, monitoring the first positioning reference signal on the first time-frequency resource block refers to receiving based on coherent detection, namely, the second node U2A uses the first sequence of the first positioning reference signal to perform coherent reception on a radio signal on the first time-frequency resource block, and then measures energy of a signal obtained by the coherent reception; if the energy of the signal obtained is greater than a first given threshold, it is determined that the first positioning reference signal is successfully received on the first time-frequency resource block; otherwise, it is determined that the first positioning reference signal isn't successfully detected on the first time-frequency resource block.

In one embodiment, monitoring the second positioning reference signal on the second time-frequency resource block refers to receiving based on coherent detection, namely, the second node U2A uses the second sequence of the second positioning reference signal to perform coherent reception on a radio signal on the second time-frequency resource block, and then measures energy of a signal obtained by the coherent reception; if the energy of the signal obtained is greater than a first given threshold, it is determined that the second positioning reference signal is successfully received on the second time-frequency resource block; otherwise, it is determined that the second positioning reference signal isn't successfully detected on the second time-frequency resource block.

In one embodiment, monitoring the first positioning reference signal on the first time-frequency resource block refers to receiving based on energy detection, namely, the second node U2A senses energy of a radio signal on the first time-frequency resource block and averages in time to acquire a received energy; if the received energy is greater than a second given threshold, it is determined that the first positioning reference signal is successfully received on the first time-frequency resource block; otherwise, it is determined that the first positioning reference signal isn't successfully detected on the first time-frequency resource block.

In one embodiment, monitoring the second positioning reference signal on the second time-frequency resource block refers to receiving based on energy detection, namely, the second node U2A senses energy of a radio signal on the first time-frequency resource block and averages in time to acquire a received energy; if the received energy is greater than a second given threshold, it is determined that the second positioning reference signal is successfully received on the second time-frequency resource block; otherwise, it is determined that the second positioning reference signal isn't successfully detected on the second time-frequency resource block.

In one embodiment, the first positioning reference signal being detected means that after the first positioning reference signal is received based on coherent detection, the energy of a signal obtained is greater than a first given threshold.

In one embodiment, the second positioning reference signal being detected means that after the second positioning reference signal is received based on coherent detection, the energy of a signal obtained is greater than a first given threshold.

In one embodiment, a measurement on the first positioning reference signal, a measurement on the second positioning reference signal and the first distance comprised in the first information set are jointly used to determine a positive integer number of time length(s).

In one embodiment, the positive integer number of time lengths at least comprise two different time lengths.

In one embodiment, of the positive integer number of time length(s) only one time length is comprised.

In one embodiment, any of the positive integer number of time length(s) is measured in microseconds (s).

In one embodiment, any of the positive integer number of time length(s) is measured in milliseconds (µs).

In one embodiment, a measurement on the first positioning reference signal is used to determine a time-domain resource comprised by the first time-frequency resource block.

In one embodiment, a measurement on the second positioning reference signal is used to determine a time-domain resource comprised by the second time-frequency resource block.

In one embodiment, a measurement on the first positioning reference signal is used to determine a time-domain resource occupied by the first positioning reference signal.

In one embodiment, a measurement on the second positioning reference signal is used to determine a time-domain resource occupied by the second positioning reference signal.

In one embodiment, a measurement on the first positioning reference signal comprises a Sidelink Signal to Noise Ratio ((SL SNR).

In one embodiment, a measurement on the first positioning reference signal comprises an SL Signal to Interference plus Noise Ratio (SINR).

In one embodiment, a measurement on the first positioning reference signal comprises an SL Reference Signal Receiving Power (RSRP).

In one embodiment, a measurement on the first positioning reference signal comprises an SL Reference Signal Receiving Quality (RSRQ).

In one embodiment, a measurement on the first positioning reference signal comprises an SL Received Signal Strength Indication (RSSI).

In one embodiment, a measurement on the first positioning reference signal comprises an SL Channel Quality Indicator (CQI).

In one embodiment, a measurement on the second positioning reference signal comprises an SL SNR.

In one embodiment, a measurement on the second positioning reference signal comprises an SL RSRP.

In one embodiment, a measurement on the second positioning reference signal comprises an SL RSRQ.

In one embodiment, a measurement on the second positioning reference signal comprises an SL RSSI.

In one embodiment, a measurement on the second positioning reference signal comprises an SL CQI.

In one embodiment, a measurement on the first positioning reference signal, a measurement on the second positioning reference signal and the first distance comprised by the first information set are jointly used to determine relative positions of the second node U2A and the first node U1A.

In one embodiment, a measurement on the first positioning reference signal, a measurement on the second positioning reference signal, and the first distance and the first angle comprised by the first information set are jointly used to determine relative positions of the second node U2A and the first node U1A.

In one embodiment, a measurement on the first positioning reference signal, a measurement on the second positioning reference signal and the first distance comprised by the first information set are used to infer a time difference of signal arrival, and to acquire relative positions of the second node U2A and the first node U1A through the positioning method of Observed Time Difference Of Arrival (OTDOA).

In one embodiment, a measurement on the first positioning reference signal, a measurement on the second positioning reference signal, and the first distance and the first angle comprised by the first information set are used to infer a time difference of signal arrival, and to acquire relative positions of the second node U2A and the first node U1A through the positioning method of OTDOA.

In one embodiment, a measurement on the first positioning reference signal, a measurement on the second positioning reference signal and the first distance comprised by the first information set are used to acquire relative positions of the second node U2A and the first node U1A through the positioning method of Sidelink Time Difference Of Arrival (SL-TDOA).

In one embodiment, a measurement on the first positioning reference signal, a measurement on the second positioning reference signal, and the first distance and the first angle comprised by the first information set are used to acquire relative positions of the second node U2A and the first node U1A through the positioning method of Angle-of-Departure (SL AoD).

In one embodiment, a measurement on the first positioning reference signal, a measurement on the second positioning reference signal, and the first distance and the first angle comprised by the first information set are used to acquire relative positions of the second node U2A and the first node U1A through the positioning method of Angle-of-Arrival (SL AoA).

In one embodiment, the relative positions of the second node U2A and the first node U1A comprise a straight-line distance between the second node U2A and the first node U1A.

In one embodiment, the relative positions of the second node U2A and the first node U1A comprise a geographical distance between the second node U2A and the first node U1A.

In one embodiment, the relative positions of the second node U2A and the first node U1A comprise a straight-line distance between the second node U2A and the first node U1A and an angle formed between a line from the second node U2A to the first node U1A and the reference direction.

In one embodiment, the relative positions of the second node U2A and the first node U1A comprise a geographical distance between the second node U2A and the first node U1A and an angle formed between a line from the second node U2A to the first node U1A and the reference direction.

Embodiment 5B

Figure 5B:
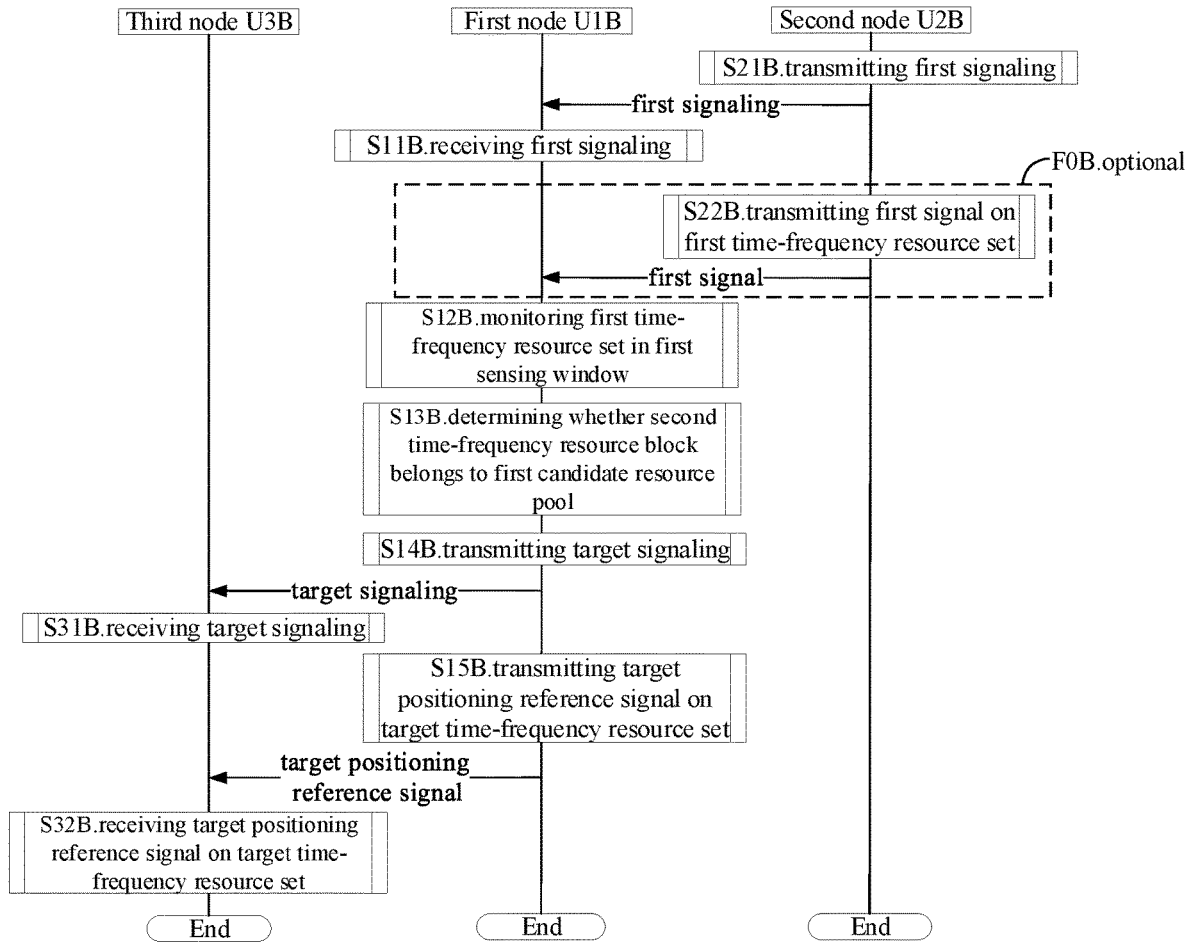
FIG. 5B illustrates a flowchart of a radio signal transmission according to one embodiment of the present disclosure.

Embodiment 5B illustrates a flowchart of a radio signal transmission according to one embodiment of the present disclosure, as shown in FIG. 5B. In FIG. 5B, communications between a first node U1B and a second node U2B, and between the first node U1B and a third node U3B are performed via air interfaces; and the step marked by the box F0B in FIG. 5B is optional.

The first node U1B receives a first signaling in step S11B; and monitors a first time-frequency resource set in a first sensing window in step S12B; determines in step S13B whether a second time-frequency resource block belongs to a first candidate resource pool; transmits a target signaling in step S14B; and transmits a target positioning reference signal on a target time-frequency resource set in step S15B.

The second node U2B transmits a first signaling in step S21B; and transmits a first signal or drops transmitting the first signal on a first time-frequency resource set in step S22B.

The third node U3B receives a target signaling in step S31B; and receives a target positioning reference signal on a target time-frequency resource set in step S32B.

In Embodiment 5B, the first signaling is used by the second node U2B for indicating the occupancy of a first time-frequency resource set, the first time-frequency resource set comprising multiple resource units; parameters of the target positioning reference signal and the occupancy of the first time-frequency resource set are jointly used by the first node U1B for determining a target threshold; the occupancy of the first time-frequency resource set comprises at least one of whether the first time-frequency resource set is occupied by the second node U2B or a type of a signal occupying the first time-frequency resource set; the target time-frequency resource set belongs to a first candidate resource pool, the target time-frequency resource set comprising multiple resource units; and the first time-frequency resource set is associated with a second time-frequency resource set, the second time-frequency resource set comprising multiple resource units; the first time-frequency resource set belongs to a first resource pool; the first sensing window comprises multiple time-domain resource units, and each time-domain resource unit comprised by the first time-frequency resource set belongs to the multiple time-domain resource units comprised by the first sensing window; when a measurement of the first node U1B on the first time-frequency resource set is larger than the target threshold, the second time-frequency resource set does not belong to the first candidate resource pool; when a measurement of the first node U1B on the first time-frequency resource set is smaller than the target threshold, the second time-frequency resource set belongs to the first candidate resource pool; the target signaling is used by the first node U1B for indicating that a signal occupying that a signal occupying the target time-frequency resource set is the target positioning reference signal; when the first signal is transmitted by the second node U2B, the first signal is the signal occupying the first time-frequency resource set; when the transmission of the first signal is dropped by the second node U2B, the first time-frequency resource set is not occupied by the second node U2B; the target positioning reference signal is used by the third node U3B for determining a position of the third node U3B.

In one embodiment, when the first time-frequency resource set is occupied, the target threshold is a first threshold; when the first time-frequency resource set is unoccupied, the target threshold is a second threshold; the first threshold is greater than the second threshold.

In one embodiment, the first time-frequency resource set is occupied; when the type of the signal occupying the first time-frequency resource set includes positioning reference signal, the target threshold is a third threshold; when the type of the signal occupying the first time-frequency resource set includes non-positioning reference signal, the target threshold is a fourth threshold; the third threshold is less than the fourth threshold.

In one embodiment, when the first time-frequency resource set is occupied, and the type of the signal occupying the first time-frequency resource set includes positioning reference signal, the target threshold is a first threshold; when the first time-frequency resource set is unoccupied, and is instead reserved for a positioning reference signal, the target threshold is a second threshold.

In one embodiment, the first node U1B and the second node U2B are in communication via a PC5 interface.

In one embodiment, the first node U1B and the third node U3B are in communication via a PC5 interface.

In one embodiment, the step marked by the box F0B in FIG. 5B exists.

In one embodiment, the step marked by the box F0B in FIG. 5B does not exist.

In one embodiment, when the first time-frequency resource set is occupied by the second node U2B, the step marked by the box F0B in FIG. 5B exists.

In one embodiment, when the first time-frequency resource set is unoccupied by the second node U2B, the step marked by the box F0B in FIG. 5B does not exist.

In one embodiment, the first signal is a baseband signal.

In one embodiment, the first signal is a radio frequency signal.

In one embodiment, the first signal is a radio signal.

In one embodiment, the first signal is transmitted on a SL-SCH.

In one embodiment, the first signal is transmitted on a PSCCH.

In one embodiment, the first signal is transmitted on a PSSCH.

In one embodiment, the first signal is transmitted on a PUSCH.

In one embodiment, the first signal comprises all or part of a higher layer signaling.

In one embodiment, the first signal comprises all or part of a MAC layer signal.

In one embodiment, the first signal comprises a MAC CE.

In one embodiment, the first signal comprises one or more fields in a MAC CE.

In one embodiment, the first signal comprises all or part of an RRC layer signal.

In one embodiment, the first signal comprises one or more fields in an RRC IE.

In one embodiment, the first signal comprises one or more fields in a PHY layer signaling.

In one embodiment, the first signal comprises a second bit block, the second bit block comprising a positive integer number of bit(s).

In one embodiment, a second bit block is used for generating the first signal, the second bit block comprising a positive integer number of bit(s).

In one embodiment, the second bit block comprises a positive integer number of bit(s), and all or part of bits in the positive integer number of bit(s) comprised by the second bit block are used for generating the first signal.

In one embodiment, the second bit block comprises one Codeword (CW).

In one embodiment, the second bit block comprises one Code Block (CB).

In one embodiment, the second bit block comprises one Code Block Group (CBG).

In one embodiment, the second bit block comprises one Transport Block (TB).

In one embodiment, the first signal is obtained by all or part of bits in the second bit block sequentially through TB-level Cyclic Redundancy Check (CRC) Attachment, Code Block Segmentation, CB-level CRC Attachment, Channel Coding, and Rate Matching, Code Block Concatenation, scrambling, Modulation, Layer Mapping, Antenna Port Mapping and Mapping to Physical Resource Blocks, Baseband Signal Generation, and Modulation and Upconversion.

In one embodiment, the first signal is an output by the second bit block sequentially through a Modulation Mapper, a Layer Mapper, Precoding, a Resource Element Mapper and Multicarrier Symbol Generation.

In one embodiment, the Channel Coding is based on a polar code.

In one embodiment, the Channel Coding is based on a LDPC code.

In one embodiment, the first signal comprises a third sequence.

In one embodiment, the third sequence is used for generating the first signal.

In one embodiment, the third sequence is a pseudo-random sequence.

In one embodiment, the third sequence is a low-PAPR sequence.

In one embodiment, the third sequence is a Gold sequence.

In one embodiment, the third sequence is an M sequence.

In one embodiment, the third sequence is a ZC sequence.

In one embodiment, the first signal is obtained by the third sequence through Sequence Generation, Discrete Fourier Transform (DFT), Modulation and Resource Element Mapping, and Wideband Symbol Generation.

In one embodiment, a target receiver of the target signaling includes the third node in the present disclosure.

In one embodiment, the third node includes a UE.

In one embodiment, the third node includes a base station.

In one embodiment, the third node includes a core network.

In one embodiment, the third node is a SMLC.

In one embodiment, the third node is an E-SMLC.

In one embodiment, the third node is a SLP.

In one embodiment, the target signaling is transmitted through the User Plane.

In one embodiment, the target signaling is transmitted through the Control Plane.

In one embodiment, the target signaling comprises all or part of a higher layer signaling.

In one embodiment, the target signaling comprises all or part of an RRC layer signaling.

In one embodiment, the target signaling comprises one or more fields in an RRC IE.

In one embodiment, the target signaling comprises a PC5-RRC signaling.

In one embodiment, the target signaling comprises one or more fields in a PC5-RRC signaling.

In one embodiment, the target signaling comprises all or part of a MAC layer signal.

In one embodiment, the target signaling comprises one or more fields in a MAC CE.

In one embodiment, the target signaling comprises one or more fields in a PHY layer signaling.

In one embodiment, the target signaling comprises one or more fields in a piece of SCI.

In one embodiment, the target signaling comprises a piece of SCI.

In one embodiment, a channel occupied by the target signaling includes a PSCCH.

In one embodiment, a channel occupied by the target signaling includes a PSSCH.

In one embodiment, the target signaling indicates the target time-frequency resource set.

In one embodiment, the target signaling comprises a positive integer number of field(s), and the target time-frequency resource set is one of the positive integer number of field(s) comprised by the target signaling.

In one embodiment, the target time-frequency resource set is used for generating the target signaling.

In one embodiment, the target signaling comprises a third bit block, the third bit block comprises a positive integer number of bit(s), and the positive integer number of bit(s) comprised by the third bit block is(are) used for indicating the target time-frequency resource set.

In one embodiment, the target time-frequency resource set is used for scrambling the target signaling.

In one embodiment, the target time-frequency resource set is used for generating a scrambling sequence for the target signaling.

In one embodiment, the target positioning reference signal is used for determining the geographical position of the third node U3B.

In one embodiment, the target positioning reference signal is used for determining relative geographical positions of the third node U3B and the first node U1B.

In one embodiment, the target positioning reference signal is used for acquiring the geographical position of the third node U3B through the positioning method of Observed Time Difference Of Arrival (OTDOA).

In one embodiment, the target positioning reference signal is used for acquiring relative geographical positions of the third node U3B and the first node U1B through the positioning method of OTDOA.

In one embodiment, the target positioning reference signal is used for acquiring the geographical position of the third node U3B through the positioning method of Sidelink Time Difference Of Arrival (SL-TDOA).

In one embodiment, the target positioning reference signal is used for acquiring relative positions of the third node U3B and the first node U1B through the positioning method of SL-TDOA.

In one embodiment, the target positioning reference signal is used for acquiring the geographical position of the third node U3B through the positioning method of Angle-of-Departure (SL AoD).

In one embodiment, the target positioning reference signal is used for acquiring relative positions of the third node U3B and the first node U1B through the positioning method of SL AoD.

In one embodiment, the target positioning reference signal is used for acquiring the geographical position of the third node U3B through the positioning method of Angle-of-Arrival (SL AoA).

In one embodiment, the target positioning reference signal is used for acquiring relative positions of the third node U3B and the first node U1B through the positioning method of SL AoA.

In one embodiment, the relative positions of the third node U3B and the first node U1B comprise a straight-line distance between the third node U3B and the first node U1B.

In one embodiment, the relative positions of the third node U3B and the first node U1B comprise a geographical distance between the third node U3B and the first node U1B.

In one embodiment, the relative positions of the third node U3B and the first node U1B comprise a straight-line distance between the third node U3B and the first node U1B and an angle formed between a line from the third node U3B to the first node U1B and the reference direction.

In one embodiment, the relative positions of the third node U3B and the first node U1B comprise a geographical distance between the third node U3B and the first node U1B and an angle formed between a line from the third node U3B to the first node U1B and the reference direction.

In one embodiment, the geographical position of the third node U3B comprises the longitude and latitude of the third node U3B.

In one embodiment, the geographical position of the third node U3B comprises the height of the third node U3B.

In one embodiment, the geographical position of the third node U3B comprises the height of the third node U3B relative to horizontal plane.

Embodiment 6A

Figure 6A:
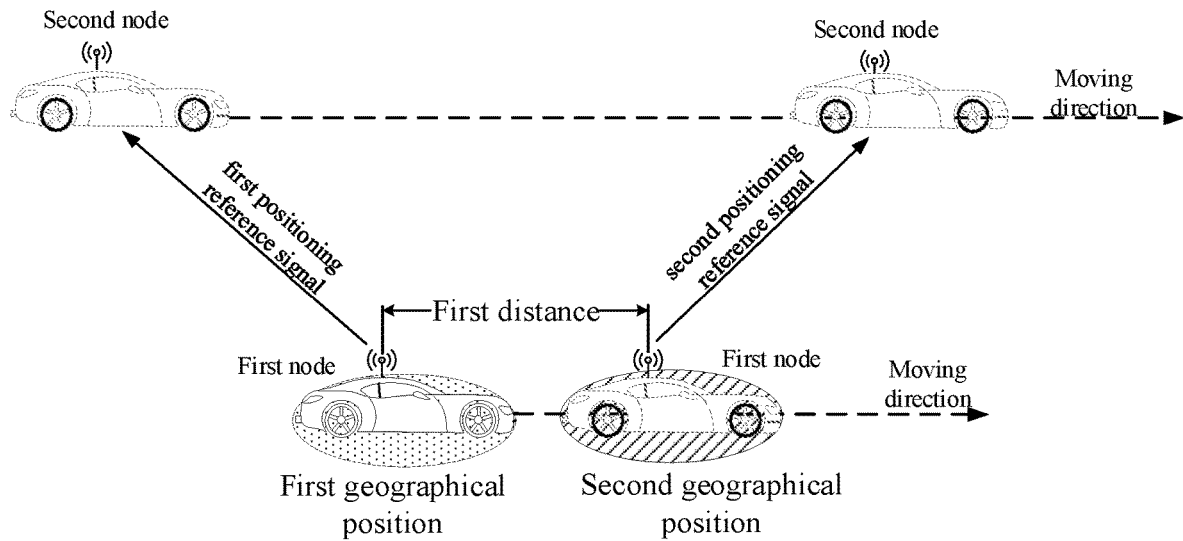
FIG. 6A illustrates a schematic diagram of relations between a first geographical position, a second geographical position and a first distance according to one embodiment of the present disclosure.

Embodiment 6A illustrates a schematic diagram of relations between a first geographical position, a second geographical position and a first distance according to one embodiment of the present disclosure, as shown in FIG. 6A. In FIG. 6A, the dot-filled ellipse represents the first geographical position in the present disclosure, while the slash-filled ellipse represents the second geographical position in the present disclosure; the broken lines represent moving directions of the first node and the second node.

In Embodiment 6A, the first geographical position is a geographical position where the first node is located when transmitting the first positioning reference signal; the second geographical position is a geographical position where the first node is located when transmitting the second positioning reference signal; the first distance is a distance between the first geographical position and the second geographical position.

In one embodiment, the first geographical position comprises longitude and latitude.

In one embodiment, the second geographical position comprises longitude and latitude.

In one embodiment, the first geographical position comprises a geodesic distance in longitude between a position where the first node is located and a geographical coordinate origin (0,0) and a geodesic distance in latitude between the position where the first node is located and the geographical coordinate origin (0,0).

In one embodiment, the second geographical position comprises a geodesic distance in longitude between a position where the first node is located and a geographical coordinate origin (0,0) and a geodesic distance in latitude between the position where the first node is located and the geographical coordinate origin (0,0).

In one embodiment, the first geographical position comprises a geodesic distance in longitude between a position where the first node is located when transmitting the first positioning reference signal and a geographical coordinate origin (0,0) and a geodesic distance in latitude between the position where the first node is located when transmitting the first positioning reference signal and the geographical coordinate origin (0,0).

In one embodiment, the second geographical position comprises a geodesic distance in longitude between a position where the first node is located when transmitting the second positioning reference signal and a geographical coordinate origin (0,0) and a geodesic distance in latitude between the position where the first node is located when transmitting the second positioning reference signal and the geographical coordinate origin (0,0).

In one embodiment, the first geographical position comprises a geodesic distance in longitude between a position where the first node is located when transmitting the first positioning reference signal and a geographical coordinate origin (0,0) and a geodesic distance in latitude between the position where the first node is located when transmitting the first positioning reference signal and the geographical coordinate origin (0,0); the second geographical position comprises a geodesic distance in longitude between a position where the first node is located when transmitting the second positioning reference signal and a geographical coordinate origin (0,0) and a geodesic distance in latitude between the position where the first node is located when transmitting the second positioning reference signal and the geographical coordinate origin (0,0).

In one embodiment, the first geographical position is different from the second geographical position.

In one embodiment, the first geographical position is different from the second geographical position in longitude.

In one embodiment, the first geographical position is different from the second geographical position in latitude.

In one embodiment, the first geographical position is different from the second geographical position in longitude; the first geographical position and the second geographical position are the same in latitude.

In one embodiment, the first geographical position and the second geographical position are the same in longitude; the first geographical position is different from the second geographical position in latitude.

In one embodiment, the first geographical position is different from the second geographical position in longitude; the first geographical position is different from the second geographical position in latitude.

In one embodiment, the longitude of the first geographical position is a geodesic distance in longitude between a position where the first node is located when transmitting the first positioning reference signal and a geographical coordinate origin (0,0).

In one embodiment, the latitude of the first geographical position is a geodesic distance in latitude between the position where the first node is located when transmitting the first positioning reference signal and the geographical coordinate origin (0,0).

In one embodiment, the longitude of the second geographical position is a geodesic distance in longitude between a position where the first node is located when transmitting the second positioning reference signal and a geographical coordinate origin (0,0).

In one embodiment, the latitude of the second geographical position is a geodesic distance in latitude between the position where the first node is located when transmitting the second positioning reference signal and the geographical coordinate origin (0,0).

In one embodiment, the definition of the geographical coordinate origin (0,0) is given by referring to the World Geodetic System 84 model (WGS84 model).

In one embodiment, the first geographical position is measured in meters (m).

In one embodiment, the first geographical position is measured in kilometers (km).

In one embodiment, the second geographical position is measured in meters (m).

In one embodiment, the second geographical position is measured in kilometers (km).

In one embodiment, the first distance is a distance between the first geographical position and the second geographical position.

In one embodiment, the first distance is a straight-line distance between the first geographical position and the second geographical position.

In one embodiment, the first distance is a geographical coordinate distance between the first geographical position and the second geographical position.

In one embodiment, the first distance is obtained by extracting a root of a sum of squares of a difference between the first geographical position and the second geographical position in longitude and a difference between the first geographical position and the second geographical position in latitude.

In one embodiment, the first distance is a product of a moving speed of the first node and a first time interval, with the first time interval being a difference between a time at which the first node transmits the first positioning reference signal and a time at which the first node transmits the second positioning reference signal.

In one embodiment, the first distance is measured in meters (m).

In one embodiment, the first distance is measured in kilometers (km).

Embodiment 6B

Figure 6B:
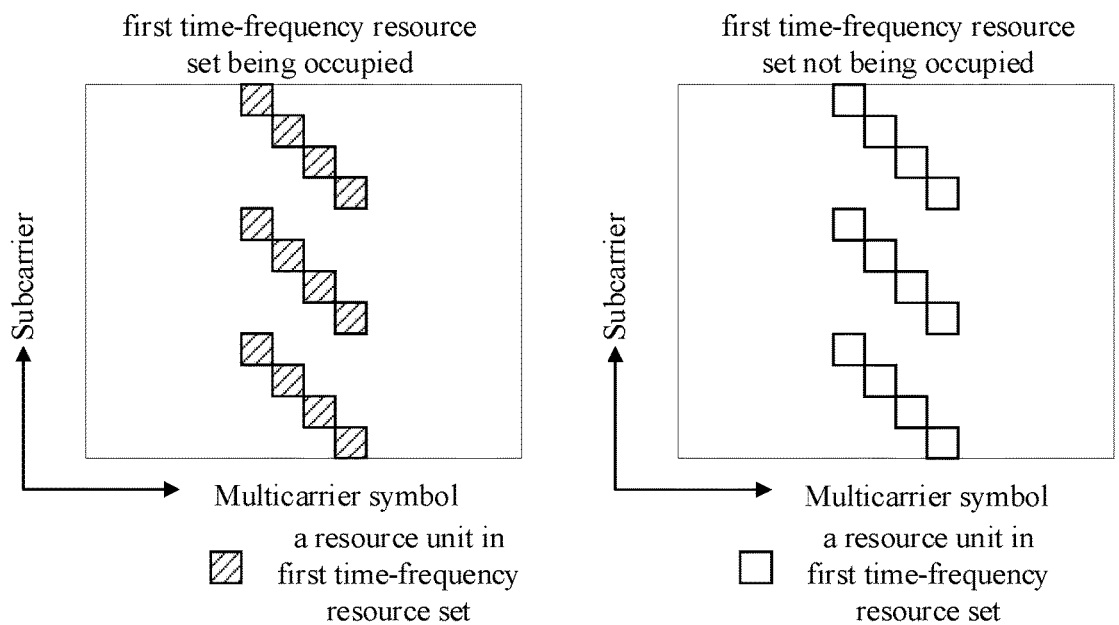
FIG. 6B illustrates a schematic diagram of occupancy of a first time-frequency resource set according to one embodiment of the present disclosure.

Embodiment 6B illustrates a schematic diagram of occupancy of a first time-frequency resource set according to one embodiment of the present disclosure, as shown in FIG. 6B. In FIG. 6B, the large rectangular box represents a time-frequency resource block in a first resource pool in the present disclosure, the horizontal axis represents multicarrier symbol and the vertical axis represents subcarrier; each small square represents one of multiple resource units comprised by the first time-frequency resource set in the present disclosure; the slash-filled boxes indicate that the first time-frequency resource set is occupied; and the cross-filled boxes indicate that the first time-frequency resource set is unoccupied.

In Embodiment 6B, when the first time-frequency resource set is occupied, the target threshold is a first threshold; when the first time-frequency resource set is unoccupied, the target threshold is a second threshold; the first threshold is greater than the second threshold.

In one embodiment, the first resource pool comprises a positive integer number of time-frequency resource block(s), and any of the positive integer number of time-frequency resource block(s) comprised by the first resource pool comprises multiple resource units.

In one embodiment, the time-frequency resource block in the first resource pool comprises multiple REs.

In one embodiment, the time-frequency resource block in the first resource pool comprises a slot in time domain and a sub-channel in frequency domain.

In one embodiment, the time-frequency resource block in the first resource pool comprises a positive integer number of multicarrier symbol(s) in time domain, and a positive integer number of PRB(s) in frequency domain.

In one embodiment, the multiple resource units comprised by the first time-frequency resource set belong to the time-frequency resource block in the first resource pool.

In one embodiment, any of the multiple resource units comprised by the first time-frequency resource set is one of the multiple resource units comprised by the time-frequency resource block in the first resource pool.

In one embodiment, at least one of the multiple resource units comprised by the time-frequency resource block in the first resource pool does not belong to the multiple resource units comprised by the first time-frequency resource set.

In one embodiment, the occupancy of the first time-frequency resource set comprises at least one of whether the first time-frequency resource set is occupied or a type of a signal occupying the first time-frequency resource set.

In one embodiment, the occupancy of the first time-frequency resource set comprises whether the first time-frequency resource set is occupied.

In one embodiment, the occupancy of the first time-frequency resource set comprises that the first time-frequency resource set is occupied.

In one embodiment, the occupancy of the first time-frequency resource set comprises that the first time-frequency resource set is unoccupied.

In one embodiment, the occupancy of the first time-frequency resource set comprises that the first time-frequency resource set is reserved by a transmitter of the first signaling, and that the transmitter of the first signaling does not transmit any signal on the first time-frequency resource set.

In one embodiment, the occupancy of the first time-frequency resource set comprises that the first time-frequency resource set is reserved by a transmitter of the first signaling, and that a signal transmitted by a transmitter of the first signaling on the first time-frequency resource set has a power of zero.

In one embodiment, the occupancy of the first time-frequency resource set comprises that the first time-frequency resource set is not reserved by a transmitter of the first signaling, and that the transmitter of the first signaling does not transmit any signal on the first time-frequency resource set.

In one embodiment, the first time-frequency resource set being occupied comprises that the transmitter of the first signaling transmits a signal on the first time-frequency resource set.

In one embodiment, the first time-frequency resource set being occupied comprises that the transmitter of the first signaling transmits an SL signal on the first time-frequency resource set.

In one embodiment, the first time-frequency resource set being occupied comprises that the transmitter of the first signaling transmits a UL signal on the first time-frequency resource set.

In one embodiment, the signal transmitted by the transmitter of the first signaling on the first time-frequency resource set includes SCI.

In one embodiment, the signal transmitted by the transmitter of the first signaling on the first time-frequency resource set includes data on a SL-SCH.

In one embodiment, the signal transmitted by the transmitter of the first signaling on the first time-frequency resource set includes an SL PRS.

In one embodiment, the signal transmitted by the transmitter of the first signaling on the first time-frequency resource set includes a PSCCH DMRS.

In one embodiment, the signal transmitted by the transmitter of the first signaling on the first time-frequency resource set includes a PSSCH DMRS.

In one embodiment, the signal occupying the first time-frequency resource set is the signal transmitted by the transmitter of the first signaling on the first time-frequency resource set.

In one embodiment, a first threshold list comprises multiple thresholds, and the first threshold and the second threshold are respectively two thresholds of the multiple thresholds comprised in the first threshold list.

In one embodiment, the first threshold is greater than the second threshold.

In one embodiment, the first threshold is measured in dBm, and the second threshold is measured in dBm.

In one embodiment, the first threshold is measured in dB, and the second threshold is measured in dB.

In one embodiment, the first threshold is measured in W, and the second threshold is measured in W.

In one embodiment, the first threshold is measured in mW, and the second threshold is measured in mW.

In one embodiment, the first threshold is a threshold in [−infinity dBm, −128 dBm, −126 dBm . . . , 0 dBm, infinity dBm].

In one embodiment, the first threshold is equal to (−128+(n−1)*2) dBm, where n is an index of the first threshold in the first threshold list, n being a positive integer between 1 and 65.

In one embodiment, the second threshold is a threshold in [−infinity dBm, −128 dBm, −126 dBm . . . , 0 dBm, infinity dBm].

In one embodiment, the second threshold is equal to (−128+(m−1)*2) dBm, where m is an index of the second threshold in the first threshold list, m being a positive integer between 1 and 65.

In one embodiment, the first threshold is −126 dBm, and the second threshold is −128 dBm.

In one embodiment, the first threshold is −30 dBm, and the second threshold is −34 dBm.

In one embodiment, the first time-frequency resource set is occupied, and the target threshold is the first threshold.

In one embodiment, the first time-frequency resource set is unoccupied, and the target threshold is the second threshold.

In one embodiment, the first time-frequency resource set is reserved by a transmitter of the first signaling, the first signaling does not transmit any signal on the first time-frequency resource set, and the target threshold is the second threshold.

In one embodiment, when the first time-frequency resource set is occupied, parameters of the target positioning reference signal and a priority of a signal occupying the first time-frequency resource set are used to determine the first threshold from the first threshold list.

In one embodiment, when the first time-frequency resource set is unoccupied, parameters of the target positioning reference signal and a priority of a signal occupying the first time-frequency resource set are used to determine the second threshold from the first threshold list.

In one embodiment, when the first time-frequency resource set is occupied, density of time-frequency resources occupied by the target positioning reference signal and a priority of a signal occupying the first time-frequency resource set are used to determine the first threshold from the first threshold list.

In one embodiment, when the first time-frequency resource set is unoccupied, density of time-frequency resources occupied by the target positioning reference signal and a priority of a signal occupying the first time-frequency resource set are used to determine the second threshold from the first threshold list.

In one embodiment, when the first time-frequency resource set is occupied, a priority of the target positioning reference signal and a priority of a signal occupying the first time-frequency resource set are used to determine the first threshold from the first threshold list.

In one embodiment, when the first time-frequency resource set is unoccupied, a priority of the target positioning reference signal and a priority of a signal occupying the first time-frequency resource set are used to determine the second threshold from the first threshold list.

In one embodiment, the priority of the target positioning reference signal is a positive integer.

In one embodiment, the priority of the target positioning reference signal is configured by a higher-layer signaling.

In one embodiment, the priority of the target positioning reference signal is one of P positive integers, P being a positive integer.

In one embodiment, the priority of the target positioning reference signal is a positive integer from 1 to P.

In one embodiment, the priority of the target positioning reference signal is one of P non-negative integers, P being a positive integer.

In one embodiment, the priority of the target positioning reference signal is a non-negative integer from 0 to (P−1).

In one embodiment, the priority of the signal occupying the first time-frequency resource set is a positive integer.

In one embodiment, the priority of the signal occupying the first time-frequency resource set is configured by a higher-layer signaling.

In one embodiment, the priority of the signal occupying the first time-frequency resource set is one of P positive integers, P being a positive integer.

In one embodiment, the priority of the signal occupying the first time-frequency resource set is a positive integer from 1 to P.

In one embodiment, the priority of the signal occupying the first time-frequency resource set is one of P non-negative integers, P being a positive integer.

In one embodiment, the priority of the signal occupying the first time-frequency resource set is a non-negative integer from 0 to (P−1).

In one embodiment, the priority of the signal occupying the first time-frequency resource set is a priority of a signal transmitted on the first time-frequency resource set.

In one embodiment, the priority of the target positioning reference signal is equal to a first non-negative integer, and the priority of a signal occupying the first time-frequency resource set is equal to a second non-negative integer, when the priority of the target positioning reference signal is higher than the priority of the signal occupying the first time-frequency resource set, the first non-negative integer is greater than the second non-negative integer; when the priority of the target positioning reference signal is lower than the priority of the signal occupying the first time-frequency resource set, the first non-negative integer is less than the second non-negative integer; when the priority of the target positioning reference signal is equal to the priority of the signal occupying the first time-frequency resource set, the first non-negative integer is equal to the second non-negative integer.

In one embodiment, the priority of the target positioning reference signal is equal to a first non-negative integer, and the priority of a signal occupying the first time-frequency resource set is equal to a second non-negative integer, when the priority of the target positioning reference signal is higher than the priority of the signal occupying the first time-frequency resource set, the first non-negative integer is less than the second non-negative integer; when the priority of the target positioning reference signal is lower than the priority of the signal occupying the first time-frequency resource set, the first non-negative integer is greater than the second non-negative integer; when the priority of the target positioning reference signal is equal to the priority of the signal occupying the first time-frequency resource set, the first non-negative integer is equal to the second non-negative integer.

In one embodiment, the priority of the target positioning reference signal is equal to a first non-negative integer, and the priority of a signal occupying the first time-frequency resource set is equal to a second non-negative integer, as the monotone increasing manner goes, as long as the priority of the target positioning reference signal is higher than the priority of the signal occupying the first time-frequency resource set, the first non-negative integer is greater than the second non-negative integer, and, as long as the priority of the target positioning reference signal is lower than the priority of the signal occupying the first time-frequency resource set, the first non-negative integer is less than the second non-negative integer.

In one embodiment, the priority of the target positioning reference signal is equal to a first non-negative integer, and the priority of a signal occupying the first time-frequency resource set is equal to a second non-negative integer, as the monotone increasing manner goes, as long as the priority of the target positioning reference signal is higher than the priority of the signal occupying the first time-frequency resource set, the first non-negative integer is less than the second non-negative integer, and, as long as the priority of the target positioning reference signal is lower than the priority of the signal occupying the first time-frequency resource set, the first non-negative integer is greater than the second non-negative integer.

In one embodiment, the phrase that "the first time-frequency resource set is occupied" means that the first time-frequency resource set is occupied by a transmitter of the first signaling.

In one embodiment, the phrase that "the first time-frequency resource set is occupied" means that a transmitter of the first signaling transmits a signal on the first time-frequency resource set.

In one embodiment, the phrase that "the first time-frequency resource set is occupied" means that a transmitter of the first signaling transmits a first signal on the first time-frequency resource set.

In one embodiment, the phrase that "the first time-frequency resource set is not occupied" means that the first time-frequency resource set is unoccupied by a transmitter of the first signaling.

In one embodiment, the phrase that "the first time-frequency resource set is not occupied" means that a transmitter of the first signaling drops transmitting signals on the first time-frequency resource set.

In one embodiment, the phrase that "the first time-frequency resource set is not occupied" means that a transmitter of the first signaling drops transmitting a first signal on the first time-frequency resource set.

In one embodiment, the phrase that "the first time-frequency resource set is not occupied" means that a signal transmitted by a transmitter of the first signaling on the first time-frequency resource set has a power of zero.

In one embodiment, the phrase that "the first time-frequency resource set is not occupied" means that the first time-frequency resource set is reserved by a transmitter of the first signaling, which drops transmitting signals on the first time-frequency resource set.

In one embodiment, the phrase that "the first time-frequency resource set is not occupied" means that the first time-frequency resource set is reserved by a transmitter of the first signaling, which drops transmitting a first signal on the first time-frequency resource set.

In one embodiment, the phrase that "the first time-frequency resource set is not occupied" means that the first time-frequency resource set is reserved by a transmitter of the first signaling, and a signal transmitted by the transmitter of the first signaling on the first time-frequency resource set has a power of zero.

Embodiment 7A

Figure 7A:
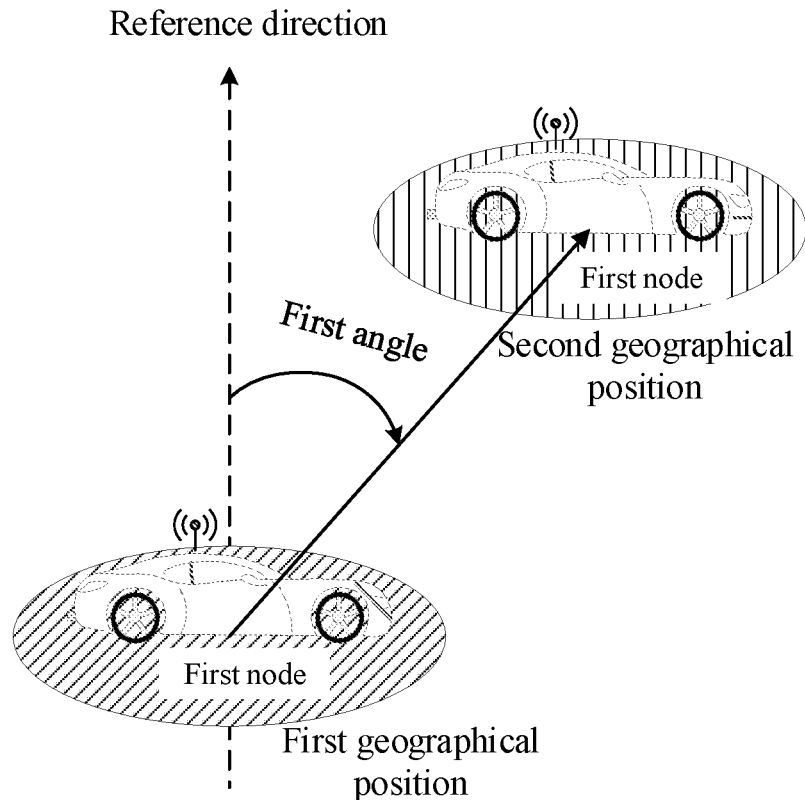
FIG. 7A illustrates a schematic diagram of relations between a reference direction, a line formed between a first geographical position and a second geographical position, and a first angle according to one embodiment of the present disclosure.

Embodiment 7A illustrates a schematic diagram of relations between a reference direction, a line formed between a first geographical position and a second geographical position, and a first angle according to one embodiment of the present disclosure, as shown in FIG. 7A. In FIG. 7A, the dotted-line arrow represents the reference direction, the solid-line arrow represents the straight line from the first geographical position to the second geographical position, and the curved arrow represents the first angle.

In Embodiment 7A, the first information set comprises a first distance and a first angle, the first angle comprising an angle formed between a line from the first geographical position to the second geographical position and the reference direction.

In one embodiment, the reference direction is a due north direction.

In one embodiment, the reference direction is a north-south direction.

In one embodiment, the reference direction is an east-west direction.

In one embodiment, the reference direction is a due north direction on horizontal plane.

In one embodiment, the reference direction is a north-south direction on horizontal plane.

In one embodiment, the reference direction is an east-west direction on horizontal plane.

In one embodiment, the first angle is used for indicating a moving direction of the first node.

In one embodiment, the line formed from the first geographical position to the second geographical position is a moving direction of the first node.

In one embodiment, the first node moves from the first geographical position to the second geographical position.

In one embodiment, the first angle comprises an angle formed between a line from the first geographical position to the second geographical position and the first reference direction.

In one embodiment, the first angle comprises an angle between the moving direction of the first node and the reference direction.

In one embodiment, the first angle is a natural number.

In one embodiment, the first angle is measured in degrees.

In one embodiment, the first information set comprises the first angle.

In one embodiment, the first information set comprises the first distance and the first angle.

In one embodiment, the first information set comprises a positive integer number of pieces of sub-information, and the first distance and the first angle are respectively two pieces of sub-information out of the positive integer number of pieces of sub-information comprised by the first information set.

In one embodiment, the first information set comprises a positive integer number of fields, and the first distance and the first angle are respectively two fields out of the positive integer number of fields comprised by the first information set.

In one embodiment, the first distance and the first angle are used for generating the first information set.

In one embodiment, the first information set comprises a first bit block, the first bit block comprises a positive integer number of bit(s), and the positive integer number of bit(s) in the first bit block is(are) used for indicating the first distance.

In one embodiment, a first bit block comprises a positive integer number of bit(s), and the positive integer number of bit(s) in the first bit block is(are) used for indicating the first angle, and all or part of the positive integer number of bit(s) comprised by the first bit block is(are) used for generating the first information set.

In one embodiment, the first distance is one of the positive integer number of field(s) comprised by the first information set, and the first angle is used for scrambling the first information set.

In one embodiment, the first angle is used for generating a scrambling sequence for the first information set.

Embodiment 7B

Figure 7B:
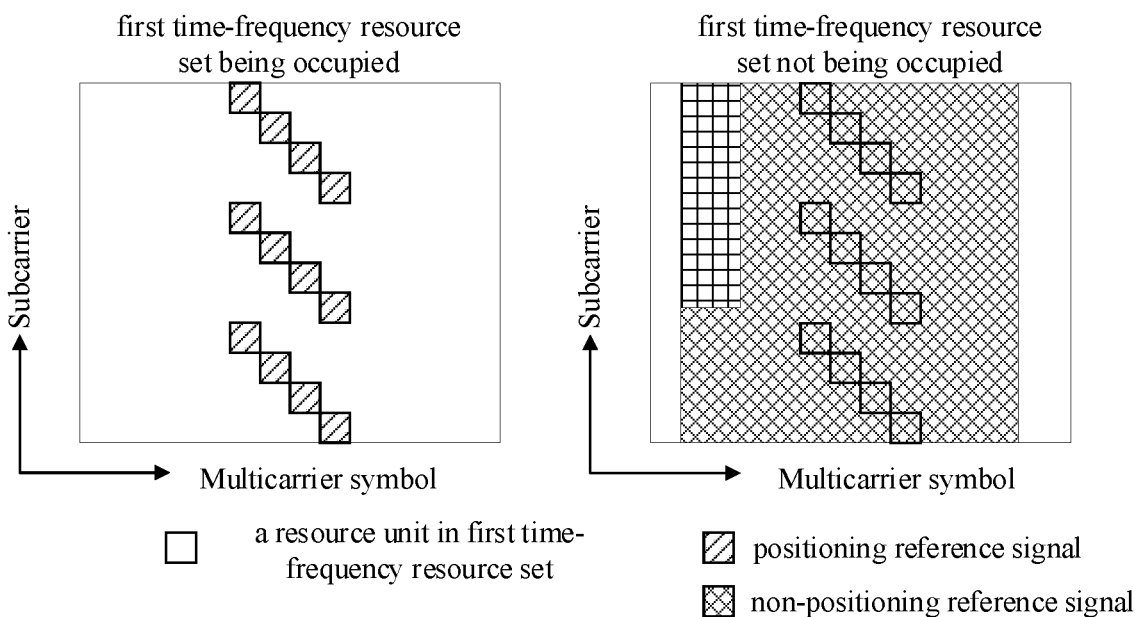
FIG. 7B illustrates a schematic diagram of occupancy of a first time-frequency resource set according to one embodiment of the present disclosure.

Embodiment 7B illustrates a schematic diagram of occupancy of a first time-frequency resource set according to one embodiment of the present disclosure, as shown in FIG. 7B. In FIG. 7B, the large rectangular box represents a time-frequency resource block in a first resource pool in the present disclosure, the horizontal axis represents multicarrier symbol and the vertical axis represents subcarrier; each small square represents one of multiple resource units comprised by the first time-frequency resource set in the present disclosure; the slash-filled boxes indicate that the type of signal occupying the first time-frequency resource set is positioning reference signal; and the cross-filled boxes indicate that the type of signal occupying the first time-frequency resource set is non-positioning reference signal.

In Embodiment 7B, the first time-frequency resource set is occupied by the transmitter of the first signaling; when the type of the signal occupying the first time-frequency resource set includes positioning reference signal, the target threshold is a third threshold; when the type of the signal occupying the first time-frequency resource set includes non-positioning reference signal, the target threshold is a fourth threshold; the third threshold is less than the fourth threshold.

In one embodiment, the occupancy of the first time-frequency resource set comprises the type of the signal occupying the first time-frequency resource set.

In one embodiment, the occupancy of the first time-frequency resource set comprises whether the first time-frequency resource set is occupied and the type of the signal occupying the first time-frequency resource set.

In one embodiment, the type of the signal occupying the first time-frequency resource set includes at least one of positioning reference signal, signal on a control channel, signal on a shared channel, control channel demodulation reference signal, shared channel demodulation reference signal or CSI reference signal.

In one embodiment, the type of the signal occupying the first time-frequency resource set includes at least one of SL PRS, PSCCH, SCI, PSSCH, PSCCH DMRS, PSSCH DMRS or SL CSI-RS.

In one embodiment, the type of the signal occupying the first time-frequency resource set includes at least one of SL PRS, SCI, data on a SL-SCH, PSCCH DMRS, PSSCH DMRS or SL CSI-RS.

In one embodiment, the type of the signal occupying the first time-frequency resource set includes one of SL signal or UL signal.

In one embodiment, the type of the signal occupying the first time-frequency resource set includes positioning reference signal or non-positioning reference signal.

In one embodiment, the type of the signal occupying the first time-frequency resource set is one of multiple signal types.

In one embodiment, the type of the signal occupying the first time-frequency resource set is either of a first signal type and a second signal type.

In one embodiment, the first signal type is one of the multiple signal types.

In one embodiment, the second signal type is one of the multiple signal types.

In one embodiment, the first signal type and the second signal type are respectively two signal types of the multiple signal types.

In one embodiment, one of the multiple signal types includes at least one of positioning reference signal, control channel signal, shared channel signal, control channel demodulation reference signal, shared channel demodulation reference signal or CSI reference signal.

In one embodiment, any of the multiple signal types includes at least one of positioning reference signal, control channel signal, shared channel signal, control channel demodulation reference signal, shared channel demodulation reference signal or CSI reference signal.

In one embodiment, the first signal type includes at least one of positioning reference signal, control channel signal, shared channel signal, control channel demodulation reference signal, shared channel demodulation reference signal or CSI reference signal.

In one embodiment, the second signal type includes at least one of positioning reference signal, control channel signal, shared channel signal, control channel demodulation reference signal, shared channel demodulation reference signal or CSI reference signal.

In one embodiment, the first signal type comprises positioning reference signal, while the second signal type comprises non-positioning reference signal.

In one embodiment, the positioning reference signal comprises an SL PRS.

In one embodiment, the positioning reference signal comprises a DL PRS.

In one embodiment, the positioning reference signal comprises a UL PRS.

In one embodiment, the positioning reference signal comprises a PSCCH DMRS.

In one embodiment, the positioning reference signal comprises a PSSCH DMRS.

In one embodiment, the positioning reference signal comprises an SL CSI-RS.

In one embodiment, the positioning reference signal comprises a UL SRS.

In one embodiment, the non-positioning reference signal comprises a PSCCH.

In one embodiment, the non-positioning reference signal comprises a PSSCH.

In one embodiment, the non-positioning reference signal comprises a PSCCH DMRS.

In one embodiment, the non-positioning reference signal comprises a PSSCH DMRS.

In one embodiment, the non-positioning reference signal comprises an SL CSI-RS.

In one embodiment, a first threshold list comprises multiple thresholds, and the third threshold and the fourth threshold are respectively two thresholds of the multiple thresholds comprised by the first threshold list.

In one embodiment, the third threshold is less than the fourth threshold.

In one embodiment, the third threshold is measured in dBm, and the fourth threshold is measured in dBm.

In one embodiment, the third threshold is measured in dB, and the fourth threshold is measured in dB.

In one embodiment, the third threshold is measured in W, and the fourth threshold is measured in W.

In one embodiment, the third threshold is measured in mW, and the fourth threshold is measured in mW.

In one embodiment, the third threshold is a threshold in [−infinity dBm, −128 dBm, −126 dBm . . . , 0 dBm, infinity dBm].

In one embodiment, the third threshold is equal to (−128+(a−1)*2) dBm, where a is an index of the third threshold in the first threshold list, the a being one of positive integers 1-65.

In one embodiment, the fourth threshold is a threshold in [−infinity dBm, −128 dBm, −126 dBm . . . , 0 dBm, infinity dBm].

In one embodiment, the fourth threshold is equal to (−128+(b−1)*2) dBm, where b is an index of the fourth threshold in the first threshold list, the b being one of positive integers 1-65.

In one embodiment, the third threshold is −128 dBm, and the fourth threshold is −126 dBm.

In one embodiment, the third threshold is −34 dBm, and the fourth threshold is −30 dBm.

In one embodiment, when the type of the signal occupying the first time-frequency resource set is the first signal type, the target threshold is a third threshold; when the type of the signal occupying the first time-frequency resource set is the second signal type, the target threshold is a fourth threshold; the third threshold is less than the fourth threshold.

In one embodiment, when the first time-frequency resource set is occupied, and the type of the signal occupying the first time-frequency resource set includes positioning reference signal, the target threshold is a first threshold; when the first time-frequency resource set is unoccupied, and is instead reserved for a positioning reference signal, the target threshold is a second threshold.

In one embodiment, when the first time-frequency resource set is occupied, and the type of the signal occupying the first time-frequency resource set includes positioning reference signal, the target threshold is a first threshold; when the first time-frequency resource set is reserved for a positioning reference signal, the transmitter of the first signaling does not transmit any signal in the first time-frequency resource set, the target threshold is a second threshold.

In one embodiment, when the first time-frequency resource set is occupied, and the type of the signal occupying the first time-frequency resource set includes positioning reference signal, the target threshold is a third threshold; when the first time-frequency resource set is occupied, and the type of the signal occupying the first time-frequency resource set includes non-positioning reference signal, the target threshold is a fourth threshold; when the first time-frequency resource set is reserved for a positioning reference signal, the transmitter of the first signaling does not transmit any signal in the first time-frequency resource set, the target threshold is a second threshold; the third threshold is less than the second threshold; the second threshold is less than the fourth threshold.

In one embodiment, when the first time-frequency resource set is occupied, and the type of the signal occupying the first time-frequency resource set includes positioning reference signal, the target threshold is a third threshold; when the first time-frequency resource set is occupied, and the type of the signal occupying the first time-frequency resource set includes non-positioning reference signal, the target threshold is a fourth threshold; when the first time-frequency resource set is reserved for a positioning reference signal, a signal transmitted by the transmitter of the first signaling is of a power value of 0, the target threshold is a second threshold; the third threshold is less than the second threshold; the second threshold is less than the fourth threshold.

Embodiment 8A

Figure 8A:
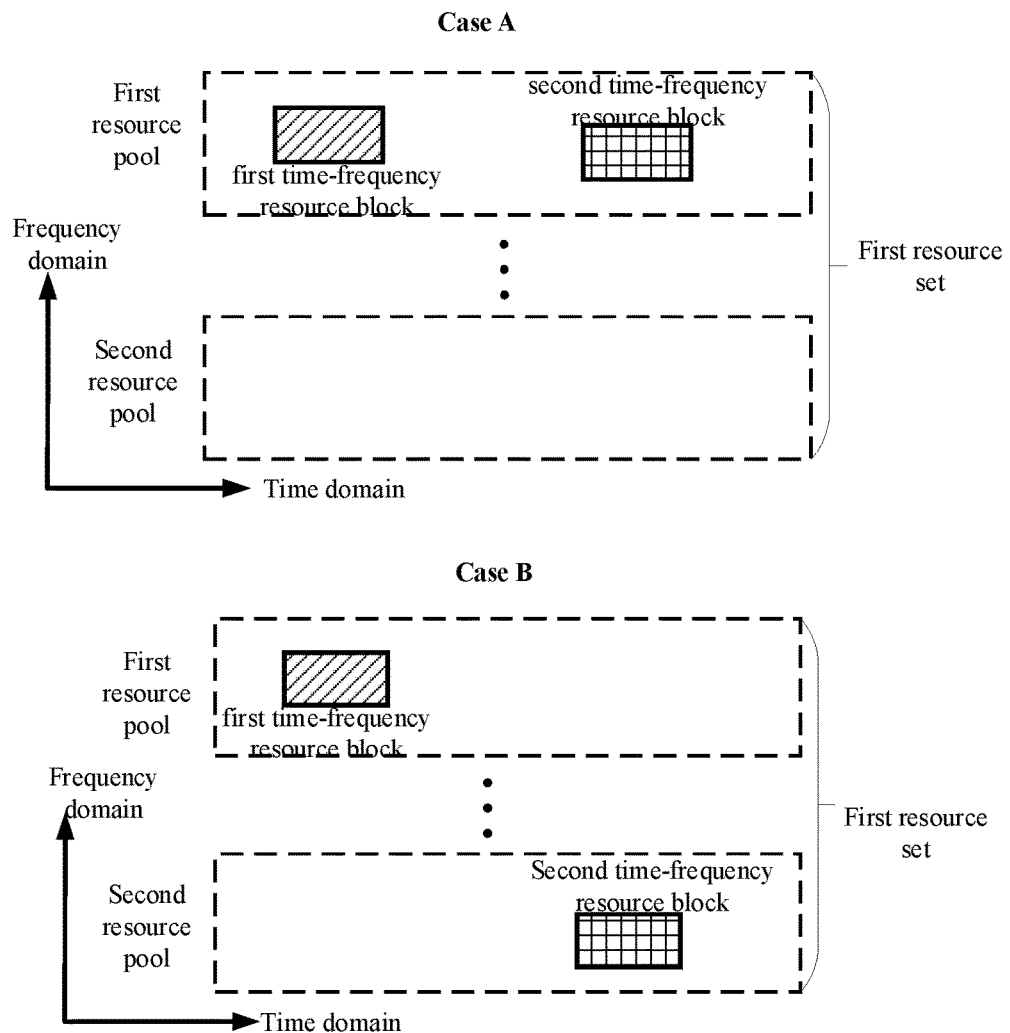
FIG. 8A illustrates a schematic diagram of relations among a first time-frequency resource block, a second time-frequency resource block and a positive integer number of resource pools in a first resource set according to one embodiment of the present disclosure.

Embodiment 8A illustrates a schematic diagram of relations among a first time-frequency resource block, a second time-frequency resource block and a positive integer number of resource pools in a first resource set according to one embodiment of the present disclosure, as shown in FIG. 8A. in FIG. 8A, a dotted-line framed box represents a resource pool in the first resource set in the present disclosure; the rectangle filled with slashes represents a first time-frequency resource block in the present disclosure; and the grid-filled rectangle represents a second time-frequency resource block in the present disclosure.

In Embodiment 8A, the first resource set comprises a first resource pool and a second resource pool; any time-frequency resource block in the first resource set belongs to one of the positive integer number of resource pools comprised of the first resource set; the first time-frequency resource block belongs to a resource pool in the first resource set; and the second time-frequency resource block belongs to a resource pool in the first resource set.

In one embodiment, the first resource set comprises a positive integer number of resource pools, and any one of the positive integer number of resource pools comprised by the first resource set comprises a positive integer number of time-frequency resource block(s).

In one embodiment, a first target resource pool is any resource pool of the positive integer number of resource pools comprised by the first resource set, and the positive integer number of time-frequency resource block(s) comprised by the first target resource pool corresponds (respectively correspond) to a positive integer number of frequency-domain resource block(s).

In one embodiment, a first target resource pool is any resource pool of the positive integer number of resource pools comprised by the first resource set, and the positive integer number of time-frequency resource block(s) comprised by the first target resource pool comprises (respectively comprise) a positive integer number of sub-channel(s) in frequency domain.

In one embodiment, a first target resource pool is any resource pool of the positive integer number of resource pools comprised by the first resource set, and the positive integer number of time-frequency resource block(s) comprised by the first target resource pool comprises (respectively comprise) a positive integer number of PRB(s) in frequency domain.

In one embodiment, a first target resource pool is any resource pool of the positive integer number of resource pools comprised by the first resource set, and the positive integer number of time-frequency resource block(s) comprised by the first target resource pool comprises (respectively comprise) a positive integer number of subcarrier(s) in frequency domain.

In one embodiment, a first target resource pool is any resource pool of the positive integer number of resource pools comprised by the first resource set, and the positive integer number of time-frequency resource block(s) comprised by the first target resource pool comprises (respectively comprise) a positive integer number of time-domain resource block(s) in time domain.

In one embodiment, a first target resource pool is any resource pool of the positive integer number of resource pools comprised by the first resource set, and the positive integer number of time-frequency resource block(s) comprised by the first target resource pool comprises (respectively comprise) a positive integer number of subframe(s) in time domain.

In one embodiment, a first target resource pool is any resource pool of the positive integer number of resource pools comprised by the first resource set, and the positive integer number of time-frequency resource block(s) comprised by the first target resource pool comprises (respectively comprise) a positive integer number of slot(s) in time domain.

In one embodiment, a first target resource pool is any resource pool of the positive integer number of resource pools comprised by the first resource set, and the positive integer number of time-frequency resource block(s) comprised by the first target resource pool comprises (respectively comprise) a positive integer number of multicarrier symbol(s) in time domain.

In one embodiment, any one of the positive integer number (more than one) of time-frequency resource blocks comprised by the first resource set belongs to one of the positive integer number of resource pools comprised by the first resource set.

In one embodiment, the positioning-related parameters respectively adopted by any two time-frequency resource blocks comprised by any of the positive integer number of resource pools comprised by the first resource set are the same.

In one embodiment, the first time-frequency resource block and the second time-frequency resource block are any two time-frequency resource blocks of the positive integer number of time-frequency resource blocks comprised by the first resource set.

In one embodiment, the first time-frequency resource block and the second time-frequency resource block belong to one of the positive integer number of resource pools comprised by the first resource set.

In one embodiment, the first time-frequency resource block and the second time-frequency resource block respectively belong to two resource pools of the positive integer number of resource pools comprised by the first resource set.

In Case A given in Embodiment 8A, the first time-frequency resource block and the second time-frequency resource block both belong to the first resource pool, and the first resource pool is one of the positive integer number of resource pools comprised by the first resource set.

In Case B given in Embodiment 8A, the first time-frequency resource block belongs to the first resource pool, while the second time-frequency resource block belongs to the second resource pool, the first resource pool and the second resource pool respectively being two different resource pools of the positive integer number of resource pools comprised by the first resource set.

In one embodiment, the first resource pool comprises a positive integer number of time-frequency resource block(s), and the second resource pool comprises a positive integer number of time-frequency resource block(s), both the positive integer number of time-frequency resource block(s) comprised by the first resource pool and the positive integer number of time-frequency resource block(s) comprised by the second resource pool belong to the first resource set.

In one embodiment, the first resource pool comprises a positive integer number of time-frequency resource block(s), and the second resource pool comprises a positive integer number of time-frequency resource block(s), the positioning-related parameters adopted by the positive integer number of time-frequency resource block(s) comprised by the first resource pool are the same as the positioning-related parameters adopted by the positive integer number of time-frequency resource block(s) comprised by the second resource pool.

In one embodiment, the first resource pool comprises a positive integer number of time-frequency resource block(s), and the second resource pool comprises a positive integer number of time-frequency resource block(s), the positioning-related parameters adopted by any of the positive integer number of time-frequency resource block(s) comprised by the first resource pool are the same as the positioning-related parameters adopted by any of the positive integer number of time-frequency resource block(s) comprised by the second resource pool.

In one embodiment, the first resource pool and the second resource pool are orthogonal.

In one embodiment, the first resource pool and the second resource pool are Frequency Division Multiplexing (FDM).

In one embodiment, the first resource pool and the second resource pool are overlapping in time domain.

In one embodiment, the first resource pool comprises the first time-frequency resource block and the second time-frequency resource block.

In one embodiment, the first resource pool comprises the first time-frequency resource block, while the second resource pool comprises the second time-frequency resource block.

In one embodiment, the first time-frequency resource block and the second time-frequency resource block are respectively two time-frequency resource blocks of the positive integer number of time-frequency resource blocks comprised by the first resource pool.

In one embodiment, the first time-frequency resource block is one of the positive integer number of time-frequency resource block(s) comprised by the first resource pool, while the second time-frequency resource block is one of the positive integer number of time-frequency resource block(s) comprised by the second resource pool.

In one embodiment, the first signal is used to indicate that the first time-frequency resource block belongs to a resource pool in the first resource set.

In one embodiment, the first signal is used to indicate that the second time-frequency resource block belongs to a resource pool in the first resource set.

In one embodiment, the first signal is used to indicate that the first time-frequency resource block belongs to the first resource pool in the first resource set, and that the second time-frequency resource block belongs to the first resource pool in the first resource set.

In one embodiment, the first signal is used to indicate that the first time-frequency resource block belongs to the first resource pool in the first resource set, and that the second time-frequency resource block belongs to the second resource pool in the first resource set.

In one embodiment, the first signal is used to indicate that both the first time-frequency resource block and the second time-frequency resource block belong to a resource pool in the first resource set.

In one embodiment, the first signal is used to indicate that the first time-frequency resource block and the second time-frequency resource block respectively belong to two resource pools in the first resource set.

In one embodiment, the first signal indicates the first resource pool.

In one embodiment, the first signal indicates the first resource pool and the second resource pool.

In one embodiment, the first signal indicates a time-frequency resource block which is lowest in frequency domain among the positive integer number of time-frequency resource blocks comprised by the first resource pool.

In one embodiment, the first signal indicates a time-frequency resource block which is lowest in frequency domain among the positive integer number of time-frequency resource blocks comprised by the first resource pool and the number of the positive integer number of time-frequency resource blocks comprised by the first resource pool in frequency domain.

In one embodiment, the first signal indicates a time-frequency resource block which is lowest in frequency domain among the positive integer number of time-frequency resource blocks comprised by the second resource pool.

In one embodiment, the first signal indicates a time-frequency resource block which is lowest in frequency domain among the positive integer number of time-frequency resource blocks comprised by the second resource pool and the number of the positive integer number of time-frequency resource blocks comprised by the second resource pool in frequency domain.

Embodiment 8B

Figure 8B:
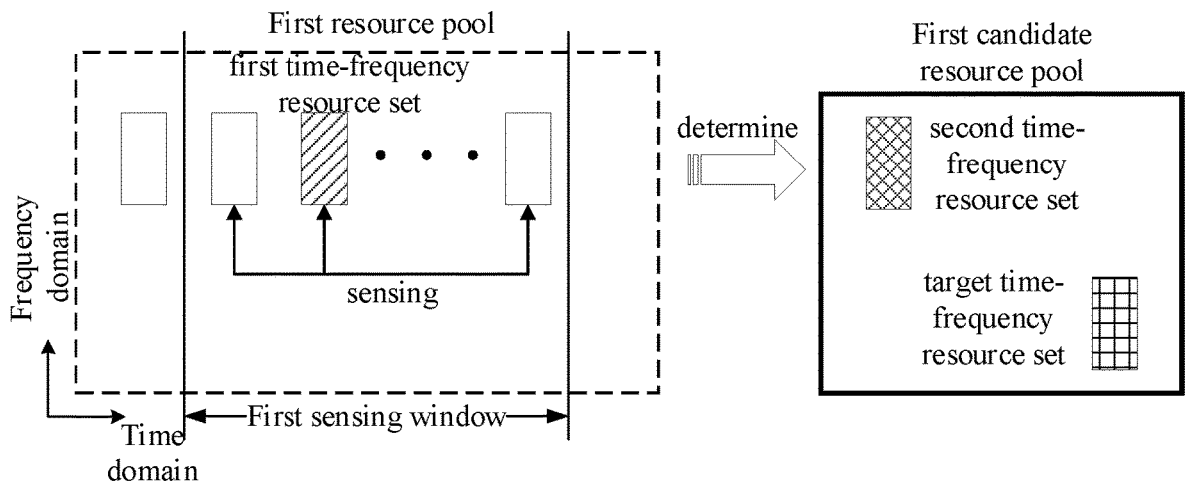
FIG. 8B illustrates a schematic diagram of relations among a first sensing window, a first time-frequency resource set, a second time-frequency resource set and a first candidate resource pool according to one embodiment of the present disclosure.

Embodiment 8B illustrates a schematic diagram of relations among a first sensing window, a first time-frequency resource set, a second time-frequency resource set and a first candidate resource pool according to one embodiment of the present disclosure, as shown in FIG. 8B. In FIG. 8B, the dotted-line framed box represents a first resource pool in the present disclosure; each rectangle enclosed by the box represents a time-frequency resource set in the first resource pool, of which the slash-filled rectangle represents a first time-frequency resource set in the present disclosure; the time domain between two vertical lines is a first time window in the present disclosure; the thick-line framed box represents a first candidate resource pool in the present disclosure; the cross-filled rectangle represents a second time-frequency resource set in the present disclosure; the grid-filled rectangle represents a target time-frequency resource set in the present disclosure.

In Embodiment 8B, the first time-frequency resource set belongs to a first resource pool; the first sensing window comprises multiple time-domain resource units; each time-domain resource unit comprised by the first time-frequency resource set belongs to the multiple time-domain resource units comprised by the first sensing window; when a measurement on the first time-frequency resource set is larger than the target threshold, the second time-frequency resource set does not belong to the first candidate resource pool; when a measurement on the first time-frequency resource set is smaller than the target threshold, the second time-frequency resource set belongs to the first candidate resource pool.

In one embodiment, a measurement on the first time-frequency resource set and the target threshold are jointly used to determine whether the second time-frequency resource set belongs to the first candidate resource pool.

In one embodiment, when a measurement on the first time-frequency resource set is larger than the target threshold, the second time-frequency resource set does not belong to the first candidate resource pool.

In one embodiment, when a measurement on the first time-frequency resource set is equal to the target threshold, the second time-frequency resource set does not belong to the first candidate resource pool.

In one embodiment, when a measurement on the first time-frequency resource set is smaller than the target threshold, the second time-frequency resource set belongs to the first candidate resource pool.

In one embodiment, when a measurement on the first time-frequency resource set is equal to the target threshold, the second time-frequency resource set belongs to the first candidate resource pool.

In one embodiment, the second time-frequency resource set not belonging to the first candidate resource pool includes that the second time-frequency resource set is different from any of the positive integer number of time-frequency resource sets comprised by the first candidate resource pool.

In one embodiment, the second time-frequency resource set not belonging to the first candidate resource pool includes that the second time-frequency resource set is a time-frequency resource set other than the positive integer number of time-frequency resource sets comprised by the first candidate resource pool.

In one embodiment, the second time-frequency resource set belonging to the first candidate resource pool includes that the second time-frequency resource set is the same as one of the positive integer number of time-frequency resource sets comprised by the first candidate resource pool.

In one embodiment, the second time-frequency resource set belonging to the first candidate resource pool includes that the second time-frequency resource set is one of the positive integer number of time-frequency resource sets comprised by the first candidate resource pool.

In one embodiment, the first sensing window is a range of time domain.

In one embodiment, the first sensing window comprises multiple time-domain resource units.

In one embodiment, the first resource pool comprises multiple time-domain resource units.

In one embodiment, the first resource pool comprises multiple time-domain resource units and multiple frequency-domain resource units.

In one embodiment, any time-domain resource unit of the multiple time-domain resource units comprised by the first sensing window is one of the multiple time-domain resource units comprised by the first resource pool.

In one embodiment, the first sensing window comprises all time-domain resource units between a first time-domain resource unit and a second time-domain resource unit.

In one embodiment, the first time-domain resource unit is earlier than the second time-domain resource unit in time domain.

In one embodiment, the first time-domain resource unit and the second time-domain resource unit both belong to the first resource pool.

In one embodiment, any time-domain resource unit between the first time-domain resource unit and the second time-domain resource unit belongs to the first resource pool.

In one embodiment, any time-domain resource unit between the first time-domain resource unit and the second time-domain resource unit is one of multiple time-domain resource units comprised by the first resource pool.

In one embodiment, the multiple time-domain resource units comprised by the first resource pool respectively comprise a positive integer number of slot(s).

In one embodiment, any time-domain resource unit of the multiple time-domain resource units comprised by the first resource pool is a slot.

In one embodiment, the multiple time-domain resource units comprised by the first resource pool respectively comprise a positive integer number of multicarrier symbol(s).

In one embodiment, any time-domain resource unit of the multiple time-domain resource units comprised by the first resource pool comprises multiple multicarrier symbols.

In one embodiment, the multiple time-domain resource units comprised by the first sensing window respectively comprise a positive integer number of slot(s).

In one embodiment, any time-domain resource unit of the multiple time-domain resource units comprised by the first sensing window is a slot.

In one embodiment, the multiple time-domain resource units comprised by the first sensing window respectively comprise a positive integer number of multicarrier symbol(s).

In one embodiment, any time-domain resource unit of the multiple time-domain resource units comprised by the first sensing window comprises multiple multicarrier symbols.

In one embodiment, the phrase of "monitoring the first time-frequency resource set in a first sensing window" comprises a time-frequency tracking of a signal on the first time-frequency resource set.

In one embodiment, the phrase of "monitoring the first time-frequency resource set in a first sensing window" comprises a time-frequency tracking of the first signal on the first time-frequency resource set.

In one embodiment, the phrase of "monitoring the first time-frequency resource set in a first sensing window" comprises coherent-detection-based reception on the first time-frequency resource set, namely, the first node uses the third sequence comprised by the first signal to perform coherent reception on a signal on the first time-frequency resource set and measures signal energy obtained by the coherent reception.

In one embodiment, the phrase of "monitoring the first time-frequency resource set in a first sensing window" comprises coherent-detection-based reception on the first time-frequency resource set, namely, the first node uses the third sequence comprised by the first signal to perform coherent reception on a signal on the first time-frequency resource set and averages received signal energy in time domain to acquire a receiving power.

In one embodiment, the phrase of "monitoring the first time-frequency resource set in a first sensing window" comprises coherent-detection-based reception on the first time-frequency resource set, namely, the first node uses the third sequence comprised by the first signal to perform coherent reception on a signal on the first time-frequency resource set and averages received signal energy in time domain and frequency domain to acquire a receiving power.

In one embodiment, the phrase of "monitoring the first time-frequency resource set in a first sensing window" comprises energy-detection-based reception on the first time-frequency resource set, namely, the first node senses energy of a radio signal on the first time-frequency resource set and averages in time to acquire a signal strength.

In one embodiment, the phrase of "monitoring the first time-frequency resource set in a first sensing window" comprises energy-detection-based reception on the first time-frequency resource set, namely, the first node senses energy of a radio signal respectively on the multiple time-frequency resource sets comprised by the first time-frequency resource set group and then averages in the multiple time-frequency resource sets to acquire a signal strength, the first time-frequency resource set being one of the multiple time-frequency resource sets comprised by the first time-frequency resource set group.

In one embodiment, the phrase of "monitoring the first time-frequency resource set in a first sensing window" comprises coherent-detection-based reception on the first time-frequency resource set, namely, the first node uses the third sequence comprised by the first signal to perform coherent reception on a radio signal on the multiple time-frequency resource sets comprised by the first time-frequency resource set group to acquire a channel quality of the first signal on the first time-frequency resource set group, the first time-frequency resource set being one of the multiple time-frequency resource sets comprised by the first time-frequency resource set group.

In one embodiment, the phrase of "monitoring the first time-frequency resource set in a first sensing window" comprises blind-detection-based reception on the first time-frequency resource set, namely, the first node receives a signal on the multiple time-frequency resource sets comprised by the first time-frequency resource set group and performs decoding, determines whether the decoding is correct according to a CRC bit, to acquire a channel quality of the first signal on the first time-frequency resource set group, the first time-frequency resource set being one of the multiple time-frequency resource sets comprised by the first time-frequency resource set group.

In one embodiment, the measurement on the first time-frequency resource set comprises the signal energy obtained by the coherent-detection-based reception on the first time-frequency resource set.

In one embodiment, the measurement on the first time-frequency resource set comprises the receiving power obtained by the coherent-detection-based reception on the first time-frequency resource set.

In one embodiment, the measurement on the first time-frequency resource set comprises the channel quality obtained by the coherent-detection-based reception on the first time-frequency resource set.

In one embodiment, the measurement on the first time-frequency resource set comprises the signal strength obtained by the energy-detection-based reception on the first time-frequency resource set.

In one embodiment, the measurement on the first time-frequency resource set comprises the channel quality obtained by the blind-detection-based reception on the first time-frequency resource set.

In one embodiment, the measurement on the first time-frequency resource set comprises a Signal to Noise Ratio (SNR).

In one embodiment, the measurement on the first time-frequency resource set comprises a Signal to Interference plus Noise Ratio (SINR).

In one embodiment, the measurement on the first time-frequency resource set comprises an SL SINR.

In one embodiment, the measurement on the first time-frequency resource set comprises a Reference Signal Receiving Power (RSRP).

In one embodiment, the measurement on the first time-frequency resource set comprises an SL RSRP.

In one embodiment, the measurement on the first time-frequency resource set comprises a Layer 1-RSRP (L1-RSRP).

In one embodiment, the measurement on the first time-frequency resource set comprises a Layer 3-RSRP (L3-RSRP).

In one embodiment, the measurement on the first time-frequency resource set comprises a Reference Signal Receiving Quality (RSRQ).

In one embodiment, the measurement on the first time-frequency resource set comprises an SL RSRQ.

In one embodiment, the measurement on the first time-frequency resource set comprises an RSSI.

In one embodiment, the measurement on the first time-frequency resource set comprises an SL Received Signal Strength Indication (RSSI).

In one embodiment, the measurement on the first time-frequency resource set comprises a Channel Quality Indicator (CQI).

In one embodiment, the measurement on the first time-frequency resource set comprises an SL CQI.

Embodiment 9A

Figure 9A:
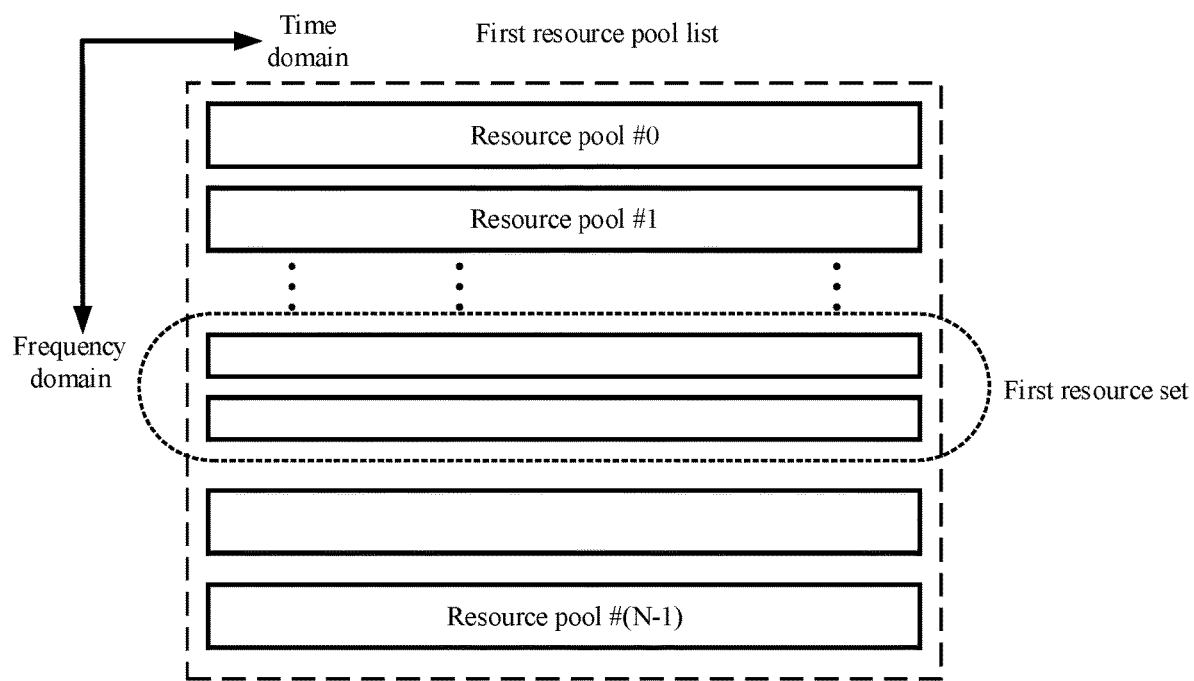
FIG. 9A illustrates a schematic diagram of a relation between a first resource pool list and a first resource set according to one embodiment of the present disclosure.

Embodiment 9A illustrates a schematic diagram of a relation between a first resource pool list and a first resource set according to one embodiment of the present disclosure, as shown in FIG. 9A. In FIG. 9A, each rectangle enclosed by the broken-line framed box represents a resource pool in a first resource pool list in the present disclosure; each rectangle enclosed by the ellipse framed by broken lines represents a resource pool in a first resource set.

In Embodiment 9A, the first resource pool list comprises a positive integer number of resource pools; and the positive integer number of resource pools comprised by the first resource set belong to the first resource pool list.

In one embodiment, the first resource pool list comprises a positive integer number of resource pools, and any of the positive integer number of resource pools comprised by the first resource set comprises a positive integer number of time-frequency resource blocks.

In one embodiment, the first resource pool list comprises a positive integer number of resource pools; and the positive integer number of resource pools comprised by the first resource pool list include the positive integer number of resource pools comprised by the first resource set.

In one embodiment, the first resource pool list comprises a positive integer number of resource pools, and any of the positive integer number of resource pools comprised by the first resource set is one of the positive integer number of resource pools comprised by the first resource pool list.

In one embodiment, a second target resource pool is one of the positive integer number of resource pools comprised by the first resource pool list, and the second target resource pool does not belong to the first resource set.

In one embodiment, a second target resource pool is one of the positive integer number of resource pools comprised by the first resource pool list, and any positioning-related parameter adopted by the second target resource pool is different from any positioning-related parameter adopted by any resource pool in the first resource set.

In one embodiment, a second target resource pool is one of the positive integer number of resource pools comprised by the first resource pool list, and a subcarrier spacing employed by the second target resource pool is different from a subcarrier spacing employed by any resource pool in the first resource set.

In one embodiment, a second target resource pool is one of the positive integer number of resource pools comprised by the first resource pool list, and a CP type employed by the second target resource pool is different from a CP type employed by any resource pool in the first resource set.

In one embodiment, a second target resource pool is one of the positive integer number of resource pools comprised by the first resource pool list, and a center frequency employed by the second target resource pool is different from a center frequency employed by any resource pool in the first resource set.

In one embodiment, the second configuration information is used to indicate the first resource pool list.

In one embodiment, the second configuration information indicates the positive integer number of resource pools comprised by the first resource pool list.

In one embodiment, the second configuration information indicates a first time-frequency resource block comprised by any one of the positive integer number of resource pools comprised by the first resource pool list.

In one embodiment, the second configuration information indicates a time-frequency resource block, which is earliest in time domain, comprised by any one of the positive integer number of resource pools comprised by the first resource pool list.

In one embodiment, the second configuration information indicates a time-frequency resource block, which is lowest in frequency domain, comprised by any one of the positive integer number of resource pools comprised by the first resource pool list.

In one embodiment, the second configuration information indicates a subcarrier spacing (SCS) of subcarriers occupied by any one of the positive integer number of resource pools comprised by the first resource pool list in frequency domain.

In one embodiment, the second configuration information indicates a symbol length of multicarrier symbols occupied by any one of the positive integer number of resource pools comprised by the first resource pool list in time domain.

In one embodiment, the second configuration information indicates a CP type of multicarrier symbols occupied by any one of the positive integer number of resource pools comprised by the first resource pool list in time domain.

In one embodiment, the second configuration information indicates a center frequency of any one of the positive integer number of resource pools comprised by the first resource pool list in frequency domain.

In one embodiment, the second configuration information indicates a reference Point A of any one of the positive integer number of resource pools comprised by the first resource pool list in frequency domain.

In one embodiment, the second configuration information indicates an Absolute Frequency Point A of any one of the positive integer number of resource pools comprised by the first resource pool list in frequency domain.

In one embodiment, the second configuration information indicates an Absolute Radio Frequency Channel Number (ARFCN) of any one of the positive integer number of resource pools comprised by the first resource pool list in frequency domain.

In one embodiment, the second configuration information comprises all or part of a higher-layer signaling.

In one embodiment, the second configuration information comprises all or part of an RRC layer signaling.

In one embodiment, the first configuration information comprises all or part of a MAC layer signaling.

In one embodiment, the first configuration information comprises one or more fields of a PHY layer signaling.

In one embodiment, the second configuration information is transmitted on a Uu interface.

In one embodiment, the second configuration information comprises a SIB.

In one embodiment, the second configuration information comprises configuration information of a sidelink resource pool.

In one embodiment, a channel occupied by the second configuration information includes a PDCCH.

In one embodiment, a channel occupied by the second configuration information includes a PDSCH.

In one embodiment, a transmitter of the second configuration information includes a base station.

In one embodiment, a transmitter of the second configuration information is a higher layer of the first node in the present disclosure.

In one embodiment, the second configuration information is transmitted from a higher layer of the first node to a physical layer of the first node.

In one embodiment, a transmitter of the second configuration information is a higher layer of the second node in the present disclosure.

In one embodiment, the second configuration information is transmitted from a higher layer of the second node to a physical layer of the second node.

In one embodiment, a receiver of the second configuration information is the first node in the present disclosure.

In one embodiment, a receiver of the second configuration information is the second node in the present disclosure.

Embodiment 9B

Figure 9B:
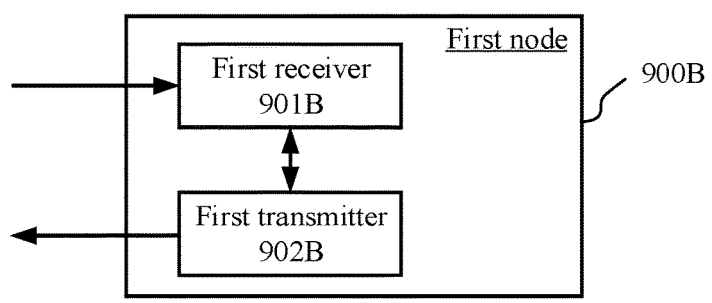
FIG. 9B illustrates a structure block diagram of a processing device used in a first node according to one embodiment of the present disclosure.

Embodiment 9B illustrates a structure block diagram of a processing device used in a first node according to one embodiment of the present disclosure, as shown in FIG. 9B. In Embodiment 9B, a first node processing device 900B is mainly composed of a first receiver 901B and a first transmitter 902B.

In one embodiment, the first receiver 901B comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the first transmitter 902B comprises at least one of the antenna 452, the transmitter/receiver 454, the multi-antenna transmitting processor 457, the transmitting processor 468, the controller/processor 459, the memory 460 or the data source 467 in FIG. 4 of the present disclosure.

In Embodiment 9B, the first receiver 901B receives a first signaling; the first transmitter 902B transmits a target positioning reference signal on a target time-frequency resource set, the target time-frequency resource set comprising multiple resource units; the first signaling is used to indicate occupancy of a first time-frequency resource set, the first time-frequency resource set comprising multiple resource units; parameters of the target positioning reference signal and the occupancy of the first time-frequency resource set are jointly used to determine a target threshold; the occupancy of the first time-frequency resource set comprises at least one of whether the first time-frequency resource set is occupied or a type of a signal occupying the first time-frequency resource set; the target time-frequency resource set belongs to a first candidate resource pool, and the first time-frequency resource set is associated with a second time-frequency resource set, the second time-frequency resource set comprising multiple resource units; the target threshold is used to determine whether the second time-frequency resource set belongs to the first candidate resource pool.

In one embodiment, when the first time-frequency resource set is occupied, the target threshold is a first threshold; when the first time-frequency resource set is unoccupied, the target threshold is a second threshold; the first threshold is greater than the second threshold.

In one embodiment, the first time-frequency resource set is occupied; when the type of the signal occupying the first time-frequency resource set includes positioning reference signal, the target threshold is a third threshold; when the type of the signal occupying the first time-frequency resource set includes non-positioning reference signal, the target threshold is a fourth threshold; the third threshold is less than the fourth threshold.

In one embodiment, when the first time-frequency resource set is occupied, and the type of the signal occupying the first time-frequency resource set includes positioning reference signal, the target threshold is a first threshold; when the first time-frequency resource set is unoccupied, and is instead reserved for a positioning reference signal, the target threshold is a second threshold.

In one embodiment, the first receiver 901B monitors the first time-frequency resource set in a first sensing window; the first receiver 901B determines whether the second time-frequency resource set belongs to the first candidate resource pool; the first time-frequency resource set belongs to a first resource pool; the first sensing window comprises multiple time-domain resource units, and each time-domain resource unit comprised by the first time-frequency resource set belongs to the multiple time-domain resource units comprised by the first sensing window; when a measurement on the first time-frequency resource set is larger than the target threshold, the second time-frequency resource set does not belong to the first candidate resource pool; when a measurement on the first time-frequency resource set is smaller than the target threshold, the second time-frequency resource set belongs to the first candidate resource pool.

In one embodiment, the first transmitter 902B transmits a target signaling; the target signaling is used to indicate that a signal occupying the target time-frequency resource set is the target positioning reference signal.

In one embodiment, the first node processing device 900B is a UE.

In one embodiment, the first node processing device 900B is a relay node.

In one embodiment, the first node processing device 900B is a base station.

Embodiment 10A

Figure 10A:
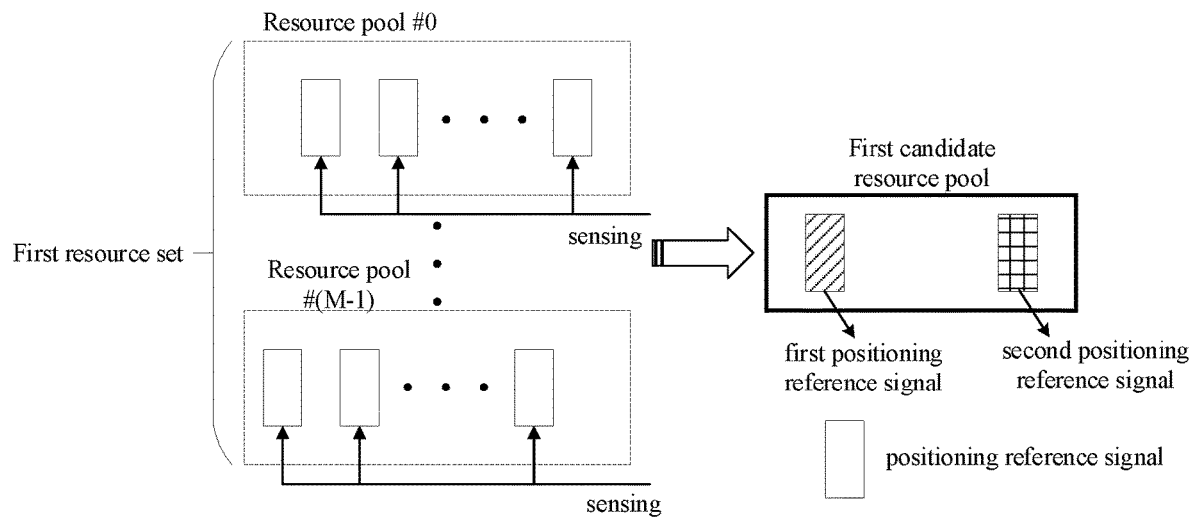
FIG. 10A illustrates a schematic diagram of a relation between a first candidate resource pool and a first resource set according to one embodiment of the present disclosure.

Embodiment 10A illustrates a schematic diagram of a relation between a first candidate resource pool and a first resource set according to one embodiment of the present disclosure, as shown in FIG. 10A. In FIG. 10A, each broken-line framed box represents a resource pool in a first resource set in the present disclosure; a blank rectangle represents a positioning reference signal in the present disclosure; the solid-line framed box represents a first candidate resource pool in the present disclosure, in which the slash-filled rectangle represents a first positioning reference signal in the present disclosure, while the grid-filled rectangle represents a second positioning reference signal in the present disclosure.

In Embodiment 10A, the first candidate resource pool is generated by (respectively) sensing a positive integer number of positioning reference signal group(s) in the positive integer number of resource pool(s) comprised by the first resource set; the first candidate resource pool comprises a positive integer number of time-frequency resource blocks; both the first time-frequency resource block and the second time-frequency resource block belong to the first candidate resource pool.

In one embodiment, any of the positive integer number of positioning reference signal group(s) comprises at least one positioning reference signal.

In one embodiment, the positive integer number of positioning reference signal group(s) is (are respectively) transmitted in the positive integer number of resource pool(s) comprised by the first resource set.

In one embodiment, the positive integer number of positioning reference signal group(s) occupies (respectively occupy) the positive integer number of time-frequency resource block(s) comprised by the first resource set.

In one embodiment, any of the positive integer number of positioning reference signal group(s) occupies a resource pool of the positive integer number of resource pool(s) comprised by the first resource set.

In one embodiment, a first target positioning reference signal group is any one of the positive integer number of positioning reference signal group(s), and the first target positioning reference signal group comprises a positive integer number of positioning reference signal(s).

In one embodiment, the first target positioning reference signal group is transmitted on a positive integer number of time-frequency resource block(s) comprised by one of the positive integer number of resource pool(s) comprised by the first resource set.

In one embodiment, the positive integer number of positioning reference signal(s) comprised by the first target positioning reference signal group is (are respectively) transmitted on a positive integer number of time-frequency resource block(s) comprised by a resource pool in the first resource set.

In one embodiment, the positive integer number of positioning reference signals comprised by the first target positioning reference signal group are respectively transmitted on a positive integer number (more than one) of time-frequency resource blocks comprised by the first resource set.

In one embodiment, the first target positioning reference signal group comprises a positive integer number of first-type target sequence(s), and the positive integer number of first-type target sequence(s) is (are respectively) used for generating the positive integer number of positioning reference signal(s) comprised by the first target positioning reference signal group.

In one embodiment, a positive integer number of first-type target sequences are respectively used for generating the positive integer number of positioning reference signals comprised by the first target positioning reference signal group.

In one embodiment, the positive integer number of positioning reference signal(s) comprised by the first target positioning reference signal group is (are respectively) obtained by the positive integer number of first-type target sequence(s) sequentially through Sequence Generation, Discrete Fourier Transform (DFT), Modulation and Resource Element Mapping, and Wideband Symbol Generation.

In one embodiment, any one of the positive integer number of first-type target sequence(s) is a pseudo-random sequence.

In one embodiment, any one of the positive integer number of first-type target sequence(s) is a low-PAPR sequence.

In one embodiment, any one of the positive integer number of first-type target sequence(s) is a Gold sequence.

In one embodiment, any one of the positive integer number of first-type target sequence(s) is a M sequence.

In one embodiment, any one of the positive integer number of first-type target sequence(s) is a ZC sequence.

In one embodiment, any first-type target positioning reference signal of the positive integer number of first-type target sequence(s) comprises a PRS.

In one embodiment, any first-type target positioning reference signal of the positive integer number of first-type target sequence(s) comprises an SL PRS.

In one embodiment, any first-type target positioning reference signal of the positive integer number of first-type target sequence(s) comprises a DL PRS.

In one embodiment, any first-type target positioning reference signal of the positive integer number of first-type target sequence(s) comprises an SL CSI-RS.

In one embodiment, any first-type target positioning reference signal of the positive integer number of first-type target sequence(s) comprises an SL DMRS.

In one embodiment, any first-type target positioning reference signal of the positive integer number of first-type target sequence(s) comprises an SRS.

In one embodiment, a first target positioning reference signal is one of the positive integer number of positioning reference signal(s) comprised by any positioning reference signal group of the positive integer number of positioning reference signal group(s).

In one embodiment, the first target positioning reference signal is transmitted on a time-frequency resource block in the positive integer number of resource pool(s) comprised by the first resource set.

In one embodiment, the first target positioning reference signal is transmitted on a time-frequency resource block of the positive integer number of time-frequency resource blocks comprised by the first resource set.

In one embodiment, the first target positioning reference signal comprises a first target sequence.

In one embodiment, a first target sequence is used for generating the first target positioning reference signal.

In one embodiment, the first target positioning reference signal is obtained by the first target sequence sequentially through Sequence Generation, Discrete Fourier Transform (DFT), Modulation and Resource Element Mapping, and Wideband Symbol Generation.

In one embodiment, the first target sequence is a Pseudo-Random Sequence.

In one embodiment, the first target sequence is a Low-PAPR Sequence.

In one embodiment, the first target sequence is a Gold sequence.

In one embodiment, the first target sequence is a M sequence.

In one embodiment, the first target sequence is a ZC sequence.

In one embodiment, the first target positioning reference signal comprises a PRS.

In one embodiment, the first target positioning reference signal comprises an SL PRS.

In one embodiment, the first target positioning reference signal comprises a DL PRS.

In one embodiment, the first target positioning reference signal comprises a CSI-RS.

In one embodiment, the first target positioning reference signal comprises an SL CSI-RS.

In one embodiment, the first target positioning reference signal comprises a DMRS.

In one embodiment, the first target positioning reference signal comprises an SL DMRS.

In one embodiment, the first target positioning reference signal comprises an SRS.

In one embodiment, the first target positioning reference signal comprises an SL SRS.

In one embodiment, the first target positioning reference signal comprises a SS/PBCH Block.

In one embodiment, the first target positioning reference signal comprises a S-SS/PSBCH Block.

In one embodiment, at least one positioning reference signal of the positive integer number of positioning reference signal(s) comprised by any one of the positive integer number of positioning reference signal group(s) is an SRS.

In one embodiment, at least one positioning reference signal of the positive integer number of positioning reference signal(s) comprised by any one of the positive integer number of positioning reference signal group(s) is an SL PRS.

In one embodiment, at least one positioning reference signal of the positive integer number of positioning reference signal(s) comprised by any one of the positive integer number of positioning reference signal group(s) is an SL CSI-RS.

In one embodiment, the positive integer number of positioning reference signals comprised by any one of the positive integer number of positioning reference signal group(s) comprise an SL PRS and a UL SRS.

In one embodiment, the phrase of "sensing a positive integer number of positioning reference signal group(s)" comprises performing time-frequency tracking respectively on the positive integer number of positioning reference signal group(s).

In one embodiment, the phrase of "sensing a positive integer number of positioning reference signal group(s)" comprises coherent-detection-based reception, which means that the first node uses the positive integer number of first-type target sequence(s) comprised by the first target positioning reference signal group to perform coherent reception on a radio signal on time-frequency resource block(s) occupied by the positive integer number of positioning reference signal group(s), and then measures a signal energy obtained by the coherent reception.

In one embodiment, the phrase of "sensing a positive integer number of positioning reference signal group(s)" comprises coherent-detection-based reception, which means that the first node uses the positive integer number of first-type target sequence(s) comprised by the first target positioning reference signal group to perform coherent reception on a radio signal on time-frequency resource block(s) occupied by the positive integer number of positioning reference signal group(s), and then averages a received signal energy in time domain to acquire a receiving power.

In one embodiment, the phrase of "sensing a positive integer number of positioning reference signal group(s)" comprises coherent-detection-based reception, which means that the first node uses the positive integer number of first-type target sequence(s) comprised by the first target positioning reference signal group to perform coherent reception on a radio signal on time-frequency resource block(s) occupied by the positive integer number of positioning reference signal group(s), and then averages a received signal energy in time domain and frequency domain to acquire a receiving power.

In one embodiment, the phrase of "sensing a positive integer number of positioning reference signal group(s)" comprises energy-detection-based reception, which means that the first node senses energy of a radio signal on time-frequency resource block(s) occupied by the positive integer number of positioning reference signal group(s), and then averages in time to acquire a signal strength.

In one embodiment, the phrase of "sensing a positive integer number of positioning reference signal group(s)" comprises energy-detection-based reception, which means that the first node senses energy of a radio signal on a time-frequency resource block occupied by the first target positioning reference signal group of the positive integer number of positioning reference signal group(s), and then averages in time to acquire a signal strength.

In one embodiment, the phrase of "sensing a positive integer number of positioning reference signal group(s)" comprises that the first node uses the first target sequence comprised by the first target positioning reference signal to perform coherent reception on a radio signal on a time-frequency resource block occupied by the first target positioning reference signal in the positive integer number of positioning reference signal group(s), thus acquiring a channel quality on the time-frequency resource block occupied by the first target positioning reference signal.

In one embodiment, the phrase of "sensing a positive integer number of positioning reference signal group(s)" comprises blind-detection-based reception, which means that the first node receives a signal on the time-frequency resource block occupied by the first target positioning reference signal in the positive integer number of positioning reference signal group(s) and performs decoding operation, and then determines whether the decoding is correct according to a CRC bit.

In one embodiment, the receiving power comprises a SNR.

In one embodiment, the receiving power comprises a SINR.

In one embodiment, the receiving power comprises a RSRP.

In one embodiment, the receiving power comprises a Layer 1-RSRP (L1-RSRP).

In one embodiment, the receiving power comprises a Layer 3-RSRP (L3-RSRP).

In one embodiment, the signal strength comprises a RSRQ.

In one embodiment, the signal strength comprises a RSSI.

In one embodiment, the channel quality comprises a CQI.

In one embodiment, the channel quality comprises an SL CQI.

In one embodiment, the channel quality comprises a SNR.

In one embodiment, the channel quality comprises an SL SINR.

In one embodiment, the channel quality comprises a RSRP.

In one embodiment, the channel quality comprises a SL RSRP.

In one embodiment, the first candidate resource pool is one of the positive integer number of resource pool(s) comprised by the first resource set.

In one embodiment, the first candidate resource pool comprises a positive integer number of time-frequency resource blocks, and all time-frequency resource blocks in the first candidate resource pool belong to the first resource set.

In one embodiment, the first candidate resource pool comprises a positive integer number of time-frequency resource blocks, and the positive integer number of time-frequency resource blocks comprised by the first resource set include all time-frequency resource blocks in the first candidate resource pool.

In one embodiment, any of the positive integer number of time-frequency resource blocks comprised by the first candidate resource pool is later than a time-frequency resource block occupied by any positioning reference signal group of the positive integer number of positioning reference signal group(s) in time domain.

In one embodiment, any of the positive integer number of time-frequency resource blocks comprised by the first candidate resource pool is later than a time-frequency resource block occupied by a first target positioning reference signal in time domain, the first target positioning reference signal being one of the positive integer number of positioning reference signal(s) comprised by any of the positive integer number of positioning reference signal group(s).

In one embodiment, a first candidate time-frequency resource block is one of the positive integer number of time-frequency resource blocks comprised by the first candidate resource pool, and the first candidate time-frequency resource block corresponds to one of the positive integer number of positioning reference signal group(s).

In one embodiment, a frequency-domain resource occupied by the first candidate time-frequency resource block is the same as a frequency-domain resource occupied by each of the positive integer number of positioning reference signal(s) comprised by one of the positive integer number of positioning reference signal group(s).

In one embodiment, a time-domain resource occupied by the first candidate time-frequency resource block is at a same interval as time-domain resource(s) occupied by the positive integer number of positioning reference signal(s) comprised by one of the positive integer number of positioning reference signal group(s).

In one embodiment, a first candidate time-frequency resource block is one of the positive integer number of time-frequency resource blocks comprised by the first candidate resource pool, and the first candidate time-frequency resource block corresponds to a first positioning reference signal group, the first positioning reference signal group being a positioning reference signal group of the positive integer number of positioning reference signal group(s).

In one embodiment, a frequency-domain resource occupied by the first candidate time-frequency resource block is the same as a frequency-domain resource occupied by each of the positive integer number of positioning reference signal(s) comprised by the first positioning reference signal group.

In one embodiment, a time-domain resource occupied by the first candidate time-frequency resource block is at a same interval as time-domain resource(s) occupied by the positive integer number of positioning reference signal(s) comprised by the first positioning reference signal group.

In one embodiment, a receiving power acquired by sensing the first positioning reference signal group is smaller than a first threshold.

In one embodiment, a signal strength acquired by sensing the first positioning reference signal group is smaller than a first threshold.

In one embodiment, a channel quality acquired by sensing the first positioning reference signal group is smaller than a second threshold.

In one embodiment, the first target positioning reference signal group comprises the first positioning reference signal group.

In one embodiment, the first threshold is measured in dB.

In one embodiment, the first threshold is measured in dBm.

In one embodiment, the first threshold is measured in W.

In one embodiment, the first threshold is measured in mW.

In one embodiment, the second threshold is measured in dB.

In one embodiment, the second threshold is measured in dBm.

In one embodiment, the second threshold is measured in W.

In one embodiment, the second threshold is measured in mW.

In one embodiment, the third threshold is measured in dB.

In one embodiment, the third threshold is measured in dBm.

In one embodiment, the third threshold is measured in W.

In one embodiment, the third threshold is measured in mW.

In one embodiment, the first candidate resource pool comprises the first time-frequency resource block and the second time-frequency resource block.

In one embodiment, the first time-frequency resource block and the second time-frequency resource block are two time-frequency resource blocks of the positive integer number of time-frequency resource blocks comprised by the first candidate resource pool.

In one embodiment, the first node autonomously selects the first time-frequency resource block and the second time-frequency resource block from the positive integer number of time-frequency resource blocks comprised by the first candidate resource pool.

In one embodiment, the first node autonomously determines a time-frequency resource occupied by the first signal out of the positive integer number of time-frequency resource blocks comprised by the first candidate resource pool.

Embodiment 10B

Figure 10B:
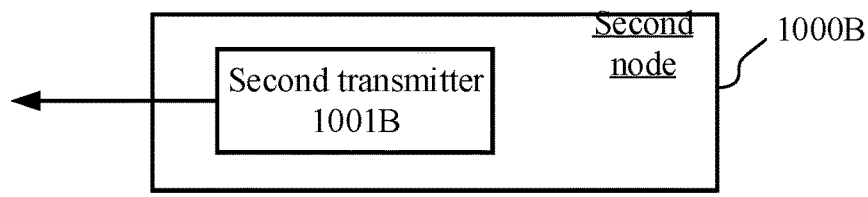
FIG. 10B illustrates a structure block diagram of a processing device used in a second node according to one embodiment of the present disclosure.

Embodiment 10B illustrates a structure block diagram of a processing device used in a second node according to one embodiment of the present disclosure, as shown in FIG. 10B. In FIG. 10B, a second node processing device 1000B is composed by a second transmitter 1001B.

In one embodiment, the second transmitter 1001B comprises at least one of the antenna 420, the transmitter/receiver 418, the multi-antenna transmitting processor 471, the transmitting processor 416, the controller/processor 475 or the memory 476 in FIG. 4 of the present disclosure.

In Embodiment 10B, the second transmitter 1001B transmits a first signaling; the first signaling is used to indicate occupancy of a first time-frequency resource set, the first time-frequency resource set comprising multiple resource units; the occupancy of the first time-frequency resource set is used by a receiver of the first signaling to determine a target threshold; the occupancy of the first time-frequency resource set comprises at least one of whether the first time-frequency resource set is occupied or a type of a signal occupying the first time-frequency resource set; the first time-frequency resource set is associated with a second time-frequency resource set, the second time-frequency resource set comprising multiple resource units; the target threshold is used by a receiver of the first signaling to determine whether the second time-frequency resource set belongs to the first candidate resource pool.

In one embodiment, when the first time-frequency resource set is occupied by the second node 1000B, the target threshold is a first threshold; when the first time-frequency resource set is not occupied, the target threshold is a second threshold; the first threshold is greater than the second threshold.

In one embodiment, the first time-frequency resource set is occupied by the second node 1000B; when the type of the signal occupying the first time-frequency resource set includes positioning reference signal, the target threshold is a third threshold; when the type of the signal occupying the first time-frequency resource set includes non-positioning reference signal, the target threshold is a fourth threshold; the third threshold is less than the fourth threshold.

In one embodiment, when the first time-frequency resource set is occupied by the second node 1000B, and the type of the signal occupying the first time-frequency resource set includes positioning reference signal, the target threshold is a first threshold; when the first time-frequency resource set is unoccupied, and is instead reserved for a positioning reference signal, the target threshold is a second threshold.

In one embodiment, the second transmitter 1001B transmits a first signal or drops transmitting the first signal on the first time-frequency resource set; the first sensing window comprises multiple time-domain resource units, and each time-domain resource unit comprised by the first time-frequency resource set belongs to the multiple time-domain resource units comprised by the first sensing window; the first time-frequency resource set belongs to a first resource pool; when the first signal is transmitted by the second transmitter 1001B, the first signal is the signal occupying the first time-frequency resource set; when the transmission of the first signal is dropped by the second transmitter 1001B, the first time-frequency resource set is not occupied by the second node 1000B.

In one embodiment, the second node 1000B is a UE.

In one embodiment, the second node 1000B is a relay node.

In one embodiment, the second node 1000B is a base station.

Embodiment 11A

Figure 11A:
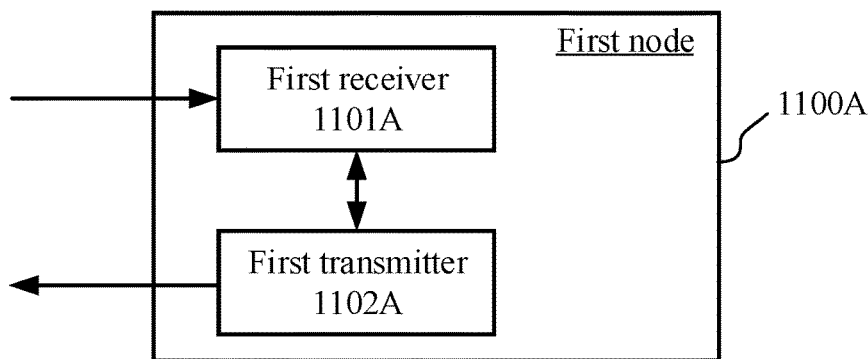
FIG. 11A illustrates a structure block diagram of a processing device used in a first node according to one embodiment of the present disclosure.

Embodiment 11A illustrates a structure block diagram of a processing device used in a first node according to one embodiment of the present disclosure, as shown in FIG. 11A. In Embodiment 11A, a first node processing device 1100A is mainly composed of a first receiver 1101A and a first transmitter 1102A.

In one embodiment, the first receiver 1101A comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the first transmitter 1102A comprises at least one of the antenna 452, the transmitter/receiver 454, the multi-antenna transmitting processor 457, the transmitting processor 468, the controller/processor 459, the memory 460 or the data source 467 in FIG. 4 of the present disclosure.

In Embodiment 11A, the first receiver 1101A receives first configuration information; the first transmitter 1102A transmits a first positioning reference signal on a first time-frequency resource block, transmits a second positioning reference signal on a second time-frequency resource block, and transmits a first information set; the first configuration information is used to indicate a first resource set, the first resource set comprises more than one time-frequency resource block, and any two time-frequency resource blocks comprised by the first resource set adopt same positioning-related parameters; the first time-frequency resource block and the second time-frequency resource block are two time-frequency resource blocks in the first resource set, and the first time-frequency resource block is earlier than the second time-frequency resource block in time domain; the first information set comprises a first distance, and the first distance is a distance from a first geographical position to a second geographical position, of which the first geographical position is where the first node is located when transmitting the first positioning reference signal, and the second geographical position is where the first node is located when transmitting the second positioning reference signal.

In one embodiment, the first information set also comprises a first angle, the first angle including an angle formed between a line from the first geographical position to the second geographical position and a reference direction.

In one embodiment, the first receiver 1101A receives a first signal; the first signal is used to trigger transmission of the first positioning reference signal and transmission of the second positioning reference signal; the first resource set comprises at least one resource pool, and any time-frequency resource block in the first resource set belongs to one resource pool of the at least one resource pool comprised by the first resource set; the first signal is used to determine a resource pool to which the first time-frequency resource block belongs and a resource pool to which the second time-frequency resource block belongs in the first resource set.

In one embodiment, the first receiver 1101A receives second configuration information; the second configuration information is used to indicate a first resource pool list, the first resource pool list comprising at least one resource pool; the at least one resource pool comprised by the first resource set belongs to the first resource pool list.

In one embodiment, the first receiver 1101A generates a first candidate resource pool; the first candidate resource pool is generated by sensing at least one positioning reference signal in the at least one resource pool comprised by the first resource set, and the first candidate resource pool comprises a positive integer number of time-frequency resource blocks, the first time-frequency resource block and the second time-frequency resource block belonging to the first candidate resource pool.

In one embodiment, the first node 1100A is a UE.
In one embodiment, the first node 1100A is a relay node.
In one embodiment, the first node 1100A is a base station.

Embodiment 11B

Figure 11B:
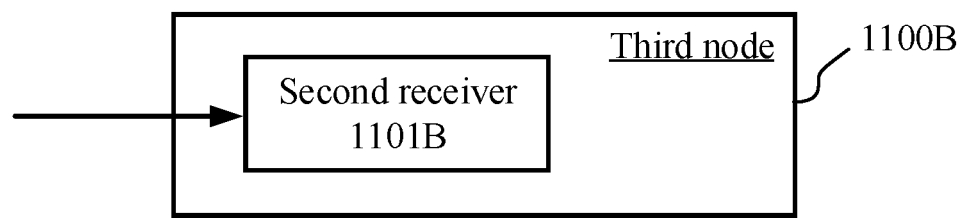
FIG. 11B illustrates a structure block diagram of a processing device used in a third node according to one embodiment of the present disclosure.

Embodiment 11B illustrates a structure block diagram of a processing device used in a third node according to one embodiment of the present disclosure, as shown in FIG. 11B. In FIG. 11B, a third node processing device 1100B is composed of a second receiver 1101B.

In one embodiment, the second receiver 1101B comprises at least one of the antenna 420, the transmitter/receiver 418, the multi-antenna receiving processor 472, the receiving processor 470, the controller/processor or the memory 476 in FIG. 4 of the present disclosure.

In Embodiment 11B, the second receiver 1101B receives a target signaling; and the second receiver 1101B receives a target positioning reference signal on a target time-frequency resource set, the target time-frequency resource set comprising multiple resource units; the target signaling is used to indicate occupancy of a target time-frequency resource set; the occupancy of the target time-frequency resource set comprises that a signal occupying the target time-frequency resource set is the target positioning reference signal; the target time-frequency resource set belongs to a first candidate resource pool; the target positioning reference signal is used to determine a position of the third node 1100B.

In one embodiment, the third node 1100B is a UE.
In one embodiment, the third node 1100B is a relay node.
In one embodiment, the third node 1100B is a base station.

Embodiment 12

Figure 12:
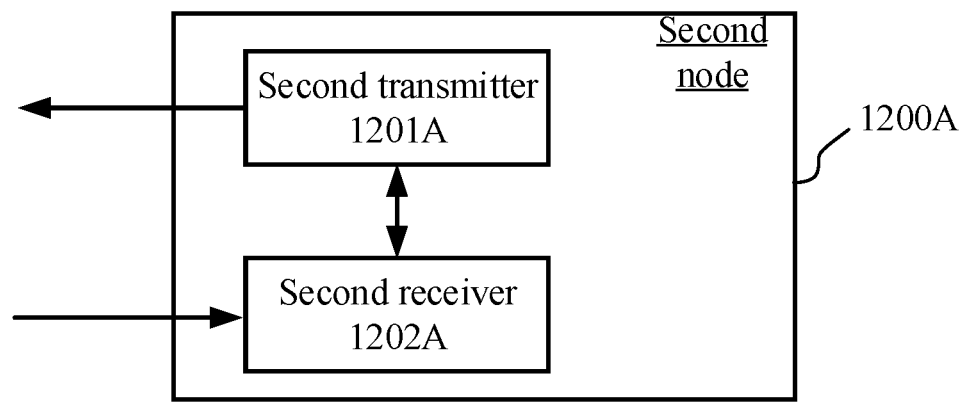
FIG. 12 illustrates a structure block diagram of a processing device used in a second node according to one embodiment of the present disclosure.

Embodiment 12 illustrates a structure block diagram of a processing device used in a second node according to one embodiment of the present disclosure, as shown in FIG. 12. In FIG. 12, a second node processing device 1200A is mainly composed of a second transmitter 1201A and a second receiver 1202A.

In one embodiment, the second transmitter 1201A comprises at least one of the antenna 420, the transmitter/receiver 418, the multi-antenna transmitting processor 471, the transmitting processor 416, the controller/processor 475 or the memory 476 in FIG. 4 of the present disclosure.

In one embodiment, the second receiver 1202A comprises at least one of the antenna 420, the transmitter/receiver 418, the multi-antenna receiving processor 472, the receiving processor 470, the controller/processor 475 or the memory 476 in FIG. 4 of the present disclosure.

In Embodiment 12, the second transmitter 1201A transmits first configuration information; the second receiver 1202A receives a first positioning reference signal on a first time-frequency resource block, receives a second positioning reference signal on a second time-frequency resource block, and receives a first information set; the first configuration information is used to indicate a first resource set, the first resource set comprises more than one time-frequency resource block, and any two time-frequency resource blocks comprised by the first resource set adopt same positioning-related parameters; the first time-frequency resource block and the second time-frequency resource block are respectively two time-frequency resource blocks in the first resource set, and the first time-frequency resource block is earlier than the second time-frequency resource block in time domain; the first information set comprises a first distance, and the first distance is a distance from a first geographical position to a second geographical position, of which the first geographical position is where a transmitter of the first positioning reference signal is located when transmitting the first positioning reference signal, and the second geographical position is where a transmitter of the second positioning reference signal is located when transmitting the second positioning reference signal, the transmitter of the first positioning reference signal and the transmitter of the second positioning reference signal being one and the same.

In one embodiment, the first information set also comprises a first angle, the first angle including an angle formed between a line from the first geographical position to the second geographical position and a reference direction.

In one embodiment, the second transmitter 1201A transmits a first signal; the first signal is used to trigger transmission of the first positioning reference signal and transmission of the second positioning reference signal by a receiver of the first signal; the first resource set comprises at least one resource pool, and any time-frequency resource block in the first resource set belongs to one resource pool of the at least one resource pool comprised by the first resource set; the first signal is used to determine a resource pool to which the first time-frequency resource block belongs and a resource pool to which the second time-frequency resource block belongs in the first resource set.

In one embodiment, the second receiver 1202A receives second configuration information; the second configuration information is used to indicate a first resource pool list, the first resource pool list comprising at least one resource pool; the at least one resource pool comprised by the first resource set belongs to the first resource pool list.

In one embodiment, the second receiver 1202A determines relative positions of the second node 1200A and the first node 1100A; the first candidate resource pool is generated by sensing a positioning reference signal in the at least one resource pool comprised by the first resource set, the first candidate resource pool comprises at least one time-frequency resource block, and both the first time-frequency resource block and the second time-frequency resource block belong to the first candidate resource pool; for a measurement on the first positioning reference signal, a measurement on the second positioning reference signal and the first information set are jointly used to determine relative positions of the second node 1200A and the first node 1100A.

In one embodiment, the second node 1200A is a UE.

In one embodiment, the second node 1200A is a relay node.

In one embodiment, the second node 1200A is a base station.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The first-type communication node in the present disclosure includes but is not limited to mobile phones, tablet computers, notebooks, network cards, low-consumption equipment, enhanced MTC (eMTC) equipment, NB-IoT equipment, vehicle-mounted communication equipment, aircrafts, aeroplanes, unmanned aerial vehicles, telecontrolled aircrafts, etc. The second-type node in the present disclosure includes but is not limited to mobile phones, tablet computers, notebooks, network cards, low-consumption equipment, enhanced MTC (eMTC) equipment, NB-IoT equipment, vehicle-mounted communication equipment, aircrafts, aeroplanes, unmanned aerial vehicles, telecontrolled aircrafts, etc. The UE or terminal in the present disclosure includes but is not limited to mobile phones, tablet computers, notebooks, network cards, low-consumption equipment, enhanced MTC (eMTC) equipment, NB-IoT equipment, vehicle-mounted communication equipment, aircrafts, aeroplanes, unmanned aerial vehicles, telecontrolled aircrafts, etc. The base station or network side equipment includes but is not limited to macro-cellular base stations, micro-cellular base stations, home base stations, relay base station, eNB, gNB, Transmission and Reception Point (TRP), GNSS, relay satellite, satellite base station or airborne base station and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A first node for wireless communications, comprising:
a first receiver, receiving a first signaling; and
a first transmitter, transmitting a target positioning reference signal on a target time-frequency resource set, the target time-frequency resource set comprising multiple resource units;
wherein the first signaling is used to indicate occupancy of a first time-frequency resource set, the first time-frequency resource set comprising multiple resource units; parameters of the target positioning reference signal and the occupancy of the first time-frequency resource set are jointly used to determine a target threshold; the occupancy of the first time-frequency resource set comprises at least one of whether the first time-frequency resource set is occupied or a type of a signal occupying the first time-frequency resource set; the target time-frequency resource set belongs to a first candidate resource pool, and the first time-frequency resource set is associated with a second time-frequency resource set, the second time-frequency resource set comprising multiple resource units; the target threshold is used to determine whether the second time-frequency resource set belongs to the first candidate resource pool.

2. The first node according to claim 1, wherein when the first time-frequency resource set is occupied, the target threshold is a first threshold; when the first time-frequency resource set is unoccupied, the target threshold is a second threshold; the first threshold is greater than the second threshold.

3. The first node according to claim 1, the first time-frequency resource set is occupied; when the type of the signal occupying the first time-frequency resource set includes positioning reference signal, the target threshold is a third threshold; when the type of the signal occupying the first time-frequency resource set includes non-positioning reference signal, the target threshold is a fourth threshold; the third threshold is less than the fourth threshold.

4. The first node according to claim 1, wherein when the first time-frequency resource set is occupied, and the type of the signal occupying the first time-frequency resource set includes positioning reference signal, the target threshold is a first threshold; when the first time-frequency resource set is unoccupied, and is instead reserved for a positioning reference signal, the target threshold is a second threshold.

5. The first node according to claim 1, comprising:
the first receiver monitoring the first time-frequency resource set in a first sensing window;
the first receiver determining whether the second time-frequency resource set belongs to the first candidate resource pool;
wherein the first time-frequency resource set belongs to a first resource pool; the first sensing window comprises multiple time-domain resource units, and each time-domain resource unit comprised by the first time-frequency resource set belongs to the multiple time-domain resource units comprised by the first sensing window; when a measurement on the first time-frequency resource set is larger than the target threshold, the second time-frequency resource set does not belong to the first candidate resource pool; when a measurement on the first time-frequency resource set is smaller than the target threshold, the second time-frequency resource set belongs to the first candidate resource pool.

6. The first node according to claim 1, comprising:
the first transmitter transmitting a target signaling;
wherein the target signaling is used to indicate that a signal occupying the target time-frequency resource set is the target positioning reference signal.

7. A method in a first node for wireless communications, comprising:
receiving a first signaling; and
transmitting a target positioning reference signal on a target time-frequency resource set, the target time-frequency resource set comprising multiple resource units;
wherein the first signaling is used to indicate occupancy of a first time-frequency resource set, the first time-frequency resource set comprising multiple resource units; parameters of the target positioning reference signal and the occupancy of the first time-frequency resource set are jointly used to determine a target threshold; the occupancy of the first time-frequency resource set comprises at least one of whether the first time-frequency resource set is occupied or a type of a signal occupying the first time-frequency resource set; the target time-frequency resource set belongs to a first candidate resource pool, and the first time-frequency resource set is associated with a second time-frequency resource set, the second time-frequency resource set comprising multiple resource units; the target threshold is used to determine whether the second time-frequency resource set belongs to the first candidate resource pool.

8. The method according to claim 7, wherein when the first time-frequency resource set is occupied, the target threshold is a first threshold; when the first time-frequency resource set is unoccupied, the target threshold is a second threshold; the first threshold is greater than the second threshold.

9. The method according to claim 7, wherein the first time-frequency resource set is occupied; when the type of the signal occupying the first time-frequency resource set includes positioning reference signal, the target threshold is a third threshold; when the type of the signal occupying the first time-frequency resource set includes non-positioning reference signal, the target threshold is a fourth threshold; the third threshold is less than the fourth threshold.

10. The method according to claim 7, wherein when the first time-frequency resource set is occupied, and the type of the signal occupying the first time-frequency resource set includes positioning reference signal, the target threshold is a first threshold; when the first time-frequency resource set is unoccupied, and is instead reserved for a positioning reference signal, the target threshold is a second threshold.

11. The method according to claim 7, comprising:
monitoring the first time-frequency resource set in a first sensing window;
determining whether the second time-frequency resource set belongs to the first candidate resource pool;
wherein the first time-frequency resource set belongs to a first resource pool; the first sensing window comprises multiple time-domain resource units, and each time-domain resource unit comprised by the first time-frequency resource set belongs to the multiple time-domain resource units comprised by the first sensing window; when a measurement on the first time-frequency resource set is larger than the target threshold, the second time-frequency resource set does not belong to the first candidate resource pool; when a measurement on the first time-frequency resource set is smaller than the target threshold, the second time-frequency resource set belongs to the first candidate resource pool.

12. The method according to claim 7, comprising:
transmitting a target signaling;
wherein the target signaling is used to indicate that a signal occupying the target time-frequency resource set is the target positioning reference signal.

* * * * *